US011293720B2

(12) United States Patent
Gallery et al.

(10) Patent No.: US 11,293,720 B2
(45) Date of Patent: Apr. 5, 2022

(54) RETICLES, METHODS OF USE AND MANUFACTURE

(71) Applicant: HVRT CORP., Orofino, ID (US)

(72) Inventors: Nathaniel P. Gallery, Lewiston, ID (US); Todd Hodnett, Arthur City, TX (US)

(73) Assignee: HVRT CORP., Orofino, ID (US)

( * ) Notice: Subject to any disclaimer, the term of this patent is extended or adjusted under 35 U.S.C. 154(b) by 0 days.

(21) Appl. No.: 17/143,499

(22) Filed: Jan. 7, 2021

(65) Prior Publication Data

US 2021/0123705 A1 Apr. 29, 2021

Related U.S. Application Data

(63) Continuation of application No. 16/671,431, filed on Nov. 1, 2019, now Pat. No. 10,895,433, which is a continuation of application No. 16/560,021, filed on Sep. 4, 2019, now Pat. No. 10,823,532.

(60) Provisional application No. 62/726,675, filed on Sep. 4, 2018.

(51) Int. Cl.

*F41G 3/08* (2006.01)
*F41G 1/38* (2006.01)
*G02B 23/00* (2006.01)
*G02B 27/32* (2006.01)
*F41G 1/473* (2006.01)

(52) U.S. Cl.

CPC ................ *F41G 1/38* (2013.01); *F41G 3/08* (2013.01); *G02B 23/145* (2013.01); *G02B 27/32* (2013.01); *F41G 1/473* (2013.01)

(58) Field of Classification Search

CPC ... F41G 1/38; F41G 3/08; F41G 1/473; G02B 23/145; G02B 27/32; F42B 39/28; B64D 1/04

USPC .......................................... 42/122, 130, 123

See application file for complete search history.

(56) References Cited

U.S. PATENT DOCUMENTS

| | | | |
|---|---|---|---|
| 912,050 | A | 2/1909 | Wanee |
| 1,006,699 | A | 10/1911 | Straubel |
| 1,107,163 | A | 8/1914 | Grauheding |
| 1,127,230 | A | 2/1915 | Grauheding |
| 1,190,121 | A | 7/1916 | Critchett |
| 1,406,620 | A | 2/1922 | Dear |
| 1,425,321 | A | 8/1922 | Etherington |

(Continued)

FOREIGN PATENT DOCUMENTS

| | | |
|---|---|---|
| CA | 2801641 A1 * | 5/2014 |
| CZ | 20024241 | 8/2004 |

(Continued)

OTHER PUBLICATIONS

H613 (Statutory Invention Registration), Apr. 4, 1989, Stello et al.

(Continued)

*Primary Examiner* — John Cooper
(74) *Attorney, Agent, or Firm* — Casimir Jones, S.C.; Kirk Hogan

(57) ABSTRACT

The present invention relates to target acquisition and related devices, and more particularly to telescopic gunsights and associated equipment used to achieve shooting accuracy at, for example, close ranges, medium ranges and long ranges at stationary and moving targets.

14 Claims, 29 Drawing Sheets
(10 of 29 Drawing Sheet(s) Filed in Color)

(56) References Cited

U.S. PATENT DOCUMENTS 1,428,389 A 9/1922 Miller
1,540,772 A 6/1925 Gibbs
1,708,389 A 4/1929 Karnes
1,851,189 A 3/1932 King
2,094,623 A 10/1937 Stokey
2,150,629 A 3/1939 Mossberg
2,154,454 A 4/1939 Joyce
2,171,571 A 9/1939 Karnes
2,413,600 A 12/1946 Bierman
2,420,273 A 5/1947 West
2,450,712 A 10/1948 Brown
2,464,521 A 3/1949 McCall
2,486,940 A 11/1949 Garber et al.
2,615,252 A 10/1952 Wing
2,806,287 A 9/1957 Sullivan
2,807,981 A 10/1957 Barnes
2,823,457 A 2/1958 Mihalyi
2,891,445 A 6/1959 Staubach
2,949,816 A 8/1960 Weaver
2,952,180 A 9/1960 Estes
2,955,512 A 10/1960 Kollmorgen et al.
3,058,391 A 10/1962 Leupold
3,059,338 A 10/1962 Coeytaux
3,161,716 A 12/1964 Burris et al.
3,190,003 A 6/1965 O'Brien
3,229,370 A 1/1966 Plisk et al.
3,297,389 A 1/1967 Gibson
3,313,026 A 4/1967 Akin, Jr.
3,381,380 A 5/1968 Thomas
3,383,987 A 5/1968 MacMillan
3,386,330 A 6/1968 Burris
3,392,450 A 7/1968 Herter et al.
3,410,644 A 11/1968 Mclendon
3,431,652 A 3/1969 Leatherwood
3,464,770 A 9/1969 Schmidt Horst
3,470,616 A 10/1969 Thompson
3,475,821 A 11/1969 Huddleston
3,492,733 A 2/1970 Leatherwood
3,506,330 A 4/1970 Allen
3,540,256 A 11/1970 Thompson
3,575,085 A 4/1971 McAdam, Jr.
3,638,321 A 2/1972 Eglin
3,682,552 A 8/1972 Hartman
3,684,376 A 8/1972 Lessard
3,694,095 A 9/1972 Louthan
3,743,818 A 7/1973 Marasco et al.
3,744,133 A 7/1973 Fukushima et al.
3,744,143 A 7/1973 Kilpatrick
3,749,494 A 7/1973 Hodges
3,777,404 A 12/1973 Oreck
3,782,822 A 1/1974 Spence
3,785,261 A 1/1974 Ganteaume
3,798,796 A 3/1974 Stauff et al.
3,826,012 A 7/1974 Pachmayr
3,876,304 A 4/1975 Novak
3,885,861 A 5/1975 Farnsworth et al.
3,902,251 A 9/1975 Ross
3,948,587 A * 4/1976 Rubbert .................. G01C 3/04 356/21
3,960,453 A 6/1976 Svensson et al.
3,991,500 A 11/1976 Kershner et al.
4,014,482 A 3/1977 Esker et al.
4,102,053 A 7/1978 Colwell
4,172,662 A 10/1979 Vogel
4,200,355 A 4/1980 Williams, Jr.
4,218,834 A 8/1980 Robertsson
4,247,161 A 1/1981 Unertl, Jr.
4,248,496 A 2/1981 Akin, Jr. et al.
4,255,013 A 3/1981 Allen
4,263,719 A 4/1981 Murdoch
4,285,137 A 8/1981 Jennie
4,385,834 A 5/1983 Maxwell, Jr.
4,389,791 A 6/1983 Ackerman
4,395,096 A 7/1983 Gibson
4,403,421 A 9/1983 Shepherd
4,404,890 A 9/1983 McAlpine
4,408,842 A 10/1983 Gibson
4,458,436 A 7/1984 Bohl
4,497,548 A 2/1985 Burris
4,531,052 A 6/1985 Moore
4,561,204 A 12/1985 Binion
4,577,962 A 3/1986 de Guillenschmidt et al.
4,584,776 A 4/1986 Shepherd
4,616,421 A 10/1986 Forsen
4,618,221 A 10/1986 Thomas
4,627,171 A 12/1986 Dudney
4,671,165 A 6/1987 Heidmann et al.
4,671,771 A 6/1987 LaRussa et al.
4,695,161 A 9/1987 Reed
4,743,765 A 5/1988 Ekstrand
4,777,352 A 10/1988 Moore
4,787,739 A * 11/1988 Thomas .................. G01C 3/22 356/21
4,806,007 A 2/1989 Bindon
4,833,786 A 5/1989 Shores, Sr.
4,843,459 A 6/1989 Perrin et al.
D306,173 S 2/1990 Reese
4,912,853 A 4/1990 McDonnell et al.
4,922,801 A 5/1990 Jaquard et al.
4,936,190 A 6/1990 Pilcher, II
4,948,475 A 8/1990 Doetzer
4,949,089 A 8/1990 Ruszkowski, Jr.
4,957,357 A 9/1990 Barns et al.
4,961,626 A 10/1990 Fournier et al.
4,965,439 A 10/1990 Moore
4,970,589 A 11/1990 Hanson et al.
4,977,677 A 12/1990 Troescher
5,026,158 A 6/1991 Golubic
5,129,309 A 7/1992 Lecuyer
5,157,839 A 10/1992 Beutler
5,171,933 A 12/1992 Eldering
5,181,323 A 1/1993 Cooper
5,194,908 A 3/1993 Lougheed et al.
5,208,417 A 5/1993 Langer et al.
5,208,514 A 5/1993 Bassick
5,223,560 A 6/1993 Cipolli et al.
5,223,650 A 6/1993 Finn
5,275,354 A 1/1994 Minor et al.
5,285,273 A 2/1994 Enoch et al.
5,287,644 A 2/1994 Bolduc
5,320,534 A 6/1994 Thomas
5,375,072 A 12/1994 Cohen
5,408,778 A 4/1995 Goodwin et al.
5,454,168 A 10/1995 Langner
5,456,157 A 10/1995 Lougheed et al.
5,469,414 A 11/1995 Okamura
5,491,546 A * 2/1996 Wascher .................. F41G 1/38 356/20
5,577,733 A 11/1996 Downing
5,581,271 A 12/1996 Kraemer
5,616,903 A 4/1997 Springer
5,631,654 A 5/1997 Karr
5,646,783 A 7/1997 Banury
5,647,558 A 7/1997 Linick
5,657,571 A 8/1997 Peterson
5,672,840 A 9/1997 Sage et al.
5,686,690 A 11/1997 Lougheed et al.
5,702,323 A 12/1997 Poulton
5,771,623 A 6/1998 Pernstich et al.
5,781,505 A 7/1998 Rowland
D397,704 S 9/1998 Reese
5,824,942 A 10/1998 Mladjan et al.
5,838,262 A 11/1998 Kershner et al.
D403,686 S 1/1999 Reese
5,864,481 A 1/1999 Gross et al.
5,887,352 A 3/1999 Kim
5,920,995 A 7/1999 Sammut
5,949,015 A 9/1999 Smith et al.
5,960,576 A 10/1999 Robinson
5,966,859 A 10/1999 Samuels
5,974,940 A 11/1999 Madni et al.
6,000,163 A 12/1999 Gordon
6,025,908 A 2/2000 Houde-Walter
6,032,374 A 3/2000 Sammut

(56) References Cited

U.S. PATENT DOCUMENTS 6,041,508 A 3/2000 David
6,058,921 A 5/2000 Lawrence et al.
6,064,196 A 5/2000 Oberlin et al.
6,174,288 B1 1/2001 Samuels
6,227,667 B1 5/2001 Halldorsson
6,247,259 B1 6/2001 Tsadka et al.
6,252,706 B1 6/2001 Kaladgew
6,269,580 B1 8/2001 Suzuki
6,269,581 B1 8/2001 Groh
6,335,526 B1 1/2002 Horn
6,357,158 B1 3/2002 Smith, III
6,363,223 B1 3/2002 Gordon
D456,057 S 4/2002 Smith, III
6,445,497 B1 9/2002 Adda
6,453,595 B1 9/2002 Sammut
6,499,382 B1 12/2002 Lougheed et al.
6,516,551 B2 2/2003 Gaber
6,516,699 B2 2/2003 Sammut et al.
6,539,661 B2 4/2003 Hope
6,568,092 B1 5/2003 Brien
D475,758 S 6/2003 Ishikawa
6,574,900 B1 6/2003 Malley
6,591,537 B2 7/2003 Smith
6,681,512 B2 1/2004 Sammut
6,729,062 B2 5/2004 Thomas et al.
6,772,550 B1 8/2004 Leatherwood
6,813,025 B2 11/2004 Edwards
6,862,832 B2 3/2005 Barrett
6,871,439 B1 3/2005 Edwards
6,886,287 B1 5/2005 Bell et al.
D506,520 S 6/2005 Timm et al.
D517,153 S 3/2006 Timm et al.
D522,030 S 5/2006 Jenkinson
D532,477 S 11/2006 Zaderey et al.
D536,762 S 2/2007 Timm et al.
7,171,775 B1 2/2007 Lacorte
7,171,776 B2 2/2007 Staley, III
7,185,455 B2 3/2007 Zaderey
D542,879 S 5/2007 Zaderey
D544,511 S 6/2007 Geurts
7,237,355 B2 7/2007 Smith, III
7,325,353 B2 2/2008 Cole et al.
D567,326 S 4/2008 Pride et al.
D567,896 S 4/2008 Pride et al.
7,584,570 B2 9/2009 Smith
7,603,804 B2 10/2009 Zadery et al.
7,685,760 B1 3/2010 Neumaster
D613,363 S 4/2010 Huber
7,705,975 B1 4/2010 Farris
7,712,225 B2 5/2010 Sammut
7,724,416 B2 5/2010 Miller
7,748,155 B2 7/2010 Cole
7,806,331 B2 10/2010 Windauer et al.
7,832,137 B2 11/2010 Sammut
7,836,626 B2 11/2010 Shepherd
7,856,750 B2 12/2010 Sammut et al.
7,937,878 B2 * 5/2011 Sammut .................... F41G 1/38 42/122
7,946,048 B1 5/2011 Sammut
7,946,073 B1 5/2011 Buck
7,946,213 B2 5/2011 Quinn
7,958,643 B1 6/2011 Wu
8,056,281 B2 11/2011 Staley, III
8,109,029 B1 2/2012 Sammut et al.
8,230,635 B2 7/2012 Sammut et al.
8,286,384 B2 10/2012 Zaderey et al.
8,353,454 B2 1/2013 Sammut et al.
D679,776 S 4/2013 Bracken et al.
D679,777 S 4/2013 Bracken et al.
D680,187 S 4/2013 Bracken et al.
8,584,944 B2 11/2013 White et al.
8,656,630 B2 2/2014 Sammut et al.
D703,784 S 4/2014 Smith et al.
8,701,330 B2 4/2014 Tubb
8,707,608 B2 4/2014 Sammut et al.
D704,295 S 5/2014 Hodge et al.
D715,394 S 10/2014 Young et al.
D715,395 S 10/2014 Young et al.
8,893,423 B2 11/2014 Tubb
8,893,971 B1 11/2014 Sammut et al.
8,905,307 B2 12/2014 Sammut et al.
8,959,824 B2 2/2015 Sammut
8,966,806 B2 3/2015 Sammut et al.
8,991,702 B1 3/2015 Sammut et al.
9,068,794 B1 6/2015 Sammut et al.
9,068,799 B1 6/2015 Wu
9,121,672 B2 9/2015 Tubb
9,250,038 B2 2/2016 Sammut et al.
9,255,771 B2 2/2016 Sammut et al.
9,335,123 B2 5/2016 Sammut et al.
9,435,610 B2 * 9/2016 Silvers ...................... F41G 1/38
9,459,077 B2 10/2016 Sammut et al.
9,500,444 B2 11/2016 Sammut et al.
9,574,850 B2 2/2017 Sammut et al.
9,612,086 B2 4/2017 Sammut et al.
9,784,575 B2 10/2017 Senne
D803,973 S 11/2017 Kedairy
9,869,530 B2 1/2018 Sammut et al.
10,042,177 B1 * 8/2018 Pitera ..................... G02B 27/32
10,060,703 B2 8/2018 Sammut et al.
10,197,361 B1 * 2/2019 Wu ........................ G02B 27/34
10,295,307 B2 2/2019 Sammut et al.
10,254,082 B2 4/2019 Sammut et al.
10,451,385 B2 10/2019 Sammut et al.
10,458,753 B2 10/2019 Sammut et al.
10,488,153 B2 11/2019 Sammut et al.
10,488,154 B2 11/2019 Sammut et al.
10,502,529 B2 12/2019 Sammut et al.
10,731,948 B2 8/2020 Sammut et al.
10,823,532 B2 11/2020 Gallery et al.
10,895,433 B2 1/2021 Gallery et al.
10,895,434 B2 1/2021 Sammut et al.
10,948,265 B2 3/2021 Sammut et al.
11,181,342 B2 11/2021 Sammut et al.
2002/0124452 A1 * 9/2002 Sammut ................. G02B 27/32 42/122
2002/0129535 A1 9/2002 Osborn, II
2002/0139030 A1 10/2002 Smith
2003/0145505 A1 8/2003 Kenton
2003/0214415 A1 11/2003 Shaw
2004/0016168 A1 1/2004 Thomas et al.
2004/0020099 A1 2/2004 Osborn, II
2004/0080467 A1 4/2004 Chinthammit
2004/0088898 A1 5/2004 Barrett
2004/0244262 A1 12/2004 Paige
2005/0005495 A1 1/2005 Smith
2005/0021282 A1 1/2005 Sammut
2005/0039370 A1 2/2005 Strong
2005/0213962 A1 9/2005 Gordon
2005/0229468 A1 10/2005 Zaderey et al.
2005/0257414 A1 * 11/2005 Zaderey .................... F41G 1/38 42/122
2006/0048432 A1 3/2006 Staley
2006/0201046 A1 9/2006 Gordon
2006/0219094 A1 10/2006 Padan
2006/0236586 A1 * 10/2006 Zaderey .................... F41G 1/38 42/133
2006/0260171 A1 11/2006 Cole et al.
2007/0022651 A1 * 2/2007 Verdugo ................... F41G 1/38 42/130
2007/0075918 A1 4/2007 Cuprys et al.
2007/0137088 A1 6/2007 Peters et al.
2007/0137090 A1 6/2007 Conescu
2008/0098640 A1 5/2008 Sammut et al.
2008/0202011 A1 8/2008 Shepherd
2008/0218436 A1 9/2008 Lipscomb
2009/0056153 A1 3/2009 Tippett
2009/0183417 A1 7/2009 Smith, III
2009/0199451 A1 8/2009 Zaderey et al.
2009/0200376 A1 8/2009 Peters et al.
2009/0266892 A1 10/2009 Windauer
2010/0060990 A1 3/2010 Wertheim et al.
2010/0275768 A1 11/2010 Quinn
2010/0301116 A1 12/2010 Bennetts et al.

(56) References Cited

U.S. PATENT DOCUMENTS

| | | | | |
|---|---|---|---|---|
| 2011/0030264 | A1 | 2/2011 | Davidson | |
| 2011/0079703 | A1 | 4/2011 | Gunning, III et al. | |
| 2011/0089238 | A1 | 4/2011 | Sammut et al. | |
| 2011/0107649 | A1 | 5/2011 | Buck | |
| 2011/0132983 | A1* | 6/2011 | Sammut | F41G 1/473 235/404 |
| 2011/0296733 | A1 | 12/2011 | York | |
| 2012/0000979 | A1 | 1/2012 | Horvath et al. | |
| 2012/0030988 | A1 | 2/2012 | Windauer | |
| 2012/0159833 | A1 | 6/2012 | Hakanson et al. | |
| 2012/0186130 | A1* | 7/2012 | Tubb | F41G 1/38 42/122 |
| 2012/0298750 | A1 | 11/2012 | McCarthy et al. | |
| 2012/0298751 | A1 | 11/2012 | Finamore | |
| 2013/0033746 | A1 | 2/2013 | Brumfield | |
| 2013/0047485 | A1* | 2/2013 | Tubb | F41G 1/38 42/122 |
| 2013/0070239 | A1 | 3/2013 | Crawford et al. | |
| 2013/0160346 | A1 | 6/2013 | White et al. | |
| 2013/0206836 | A1 | 8/2013 | Paterson et al. | |
| 2014/0059915 | A1* | 3/2014 | Sammut | F41G 1/38 42/122 |
| 2014/0110482 | A1 | 4/2014 | Bay | |
| 2014/0123533 | A1 | 5/2014 | Sammut | |
| 2014/0123534 | A1* | 5/2014 | Hodnett | F41G 1/38 42/122 |
| 2014/0305025 | A1* | 10/2014 | Tubb | F41G 1/38 42/130 |
| 2014/0373424 | A1* | 12/2014 | Silvers | F41G 1/38 42/122 |
| 2015/0176949 | A1 | 6/2015 | Varshneya et al. | |
| 2015/0276346 | A1* | 10/2015 | Hamilton | G02B 27/32 42/123 |
| 2015/0362288 | A1* | 12/2015 | Sammut | F41G 1/38 235/404 |
| 2016/0084617 | A1* | 3/2016 | Lyren | F41G 3/323 42/135 |
| 2017/0241742 | A1* | 8/2017 | Davidson | F41G 1/38 |
| 2017/0268850 | A1 | 9/2017 | Sammut et al. | |
| 2018/0003463 | A1 | 1/2018 | Sammut et al. | |
| 2018/0224243 | A1 | 8/2018 | Sammut et al. | |
| 2019/0017783 | A1 | 1/2019 | Sammut et al. | |
| 2019/0072364 | A1* | 3/2019 | VanBecelaere | F41G 1/345 |
| 2019/0145734 | A1* | 5/2019 | Morell | G02B 27/32 42/122 |
| 2019/0226808 | A1* | 7/2019 | Gallery | F41G 3/2611 |
| 2019/0257618 | A1* | 8/2019 | Mikroulis | F41G 1/473 |
| 2019/0285386 | A1* | 9/2019 | Burt | F41G 11/004 |
| 2020/0018566 | A1* | 1/2020 | Tubb | F41G 1/38 |
| 2020/0049455 | A1* | 2/2020 | Hamilton | F41G 3/06 |
| 2020/0132415 | A1* | 4/2020 | Gallery | G02B 23/145 |
| 2021/0123706 | A1 | 4/2021 | Sammut et al. | |

FOREIGN PATENT DOCUMENTS

| | | |
|---|---|---|
| DE | 3401855 | 7/1985 |
| DE | 3834924 | 4/1990 |
| DE | 20008101 | 8/2000 |
| EP | 0147329 | 7/1985 |
| EP | 1443354 | 8/2004 |
| GB | 517390 | 1/1940 |
| GB | 2094950 | 9/1982 |
| GB | 2294133 | 4/1996 |
| JP | 55036823 | 3/1980 |
| WO | WO 1996001404 | 1/1996 |
| WO | WO 1997037193 | 10/1997 |
| WO | WO 1998040688 | 9/1998 |
| WO | WO 2002103274 A2 | 12/2002 |
| WO | WO 2006060007 A1 | 6/2006 |
| WO | WO 20110132831 | 11/2010 |
| WO | WO 2013002856 | 1/2013 |
| WO | WO 2013106280 | 7/2013 |
| WO | WO 20141010262 | 7/2014 |
| WO | WO 20200112197 | 6/2020 |

OTHER PUBLICATIONS

"Horus Vision Scopes," Rifle Sporting Firearms Journal, pp. 20-24, No. 206, Mar. 2003, 6 pages.

"http://www.aircav.com/cobra/ballistic.html", printed Dec. 30, 2011, Ballistics, discussion of ballistics, interior, exterior, aerial, terminal and dispersion. 7 pages.

"http://www.hnsa.org/doc/firecontrol/partc.htm", printed Dec. 30, 2011, Fire Control Fundamentals Part C, Exterior Ballistics Part C, "The Projectile in Flight-Exterior Ballistics",pp. 1-26. 26 pages.

1996 Price List for Premier Reticles, 2 pages.

Barrett Firearms Mfg, Inc., 50 Scope Reticle, SR001, Oct. 30, 1986, 1 page.

Advertisement—"Accurate Hits from 100 to 1,000 Yards", 1 page.

Advertisement—Angle Cosine Indicator—Sniper Tools Design Company, http://www.snipertools.com/article.htm Oct. 14, 2004, 3 pages.

Advertisement—2003 New Products, Circle 132, 1 page.

Advertisement—CheyTac Associates, Advanced Ballistic Computer (ABC), 1 page.

Advertisement—CheyTac Technology Over Tradition, Technical White Papers, 2001-2003, 18 pages.

Advertisement—Custom "Sammut" (Patent Pending) Long Range; Custom Ammunition/ Berger Bullets, Ballistic Program, Data & Loading Instructions, Harris Gunworks, Inc.—Precision Shooting, 1997 Newsletter #2, 4 pages.

Advertisement—Digital Hunter, 2005, 1 page.

Advertisement—Eye of the Falcon Horus Vision, a Trag User's Manual for Palm-OS (2004), 13 pages.

Advertisement—Eye of the Falcon Horus Vision, PDA Users Manual (2002), 5 pages.

Advertisement—Guns & Weapons for Law Enforcement, Jul. 2003, p. 10, 1 page.

Advertisement—Guns & Weapons for Law Enforcement, Jul. 2003, p. 36, 1 page.

Advertisement—Harris Custom Rifle Barrels—Custom Barrels for Dedicated and Discriminating Shooters, WesHarris Barrelwork, 1 page.

Advertisemen13 Horus Vision Introduces the All-New Rifle Scope Featuring the Horus Vision Reticle Aiming System Technology (2001), 5 pages.

Advertisement—Horus Vision Rifle Scope 4x—16x Rifle Scope, Hand-Held ATRAG1P Module, TRAGIS5 Digital Aiming System, Rifle Shooter, FN SPR-4 (Nov./Dec. 2003), 6 pages.

Advertisement—Law and Order, Oct. 2003, p. 124, 1 page.

Advertisement—Perry-Systems, 2002, 5 pages.

Advertisement—Precision Shooting, 1 page.

Advertisement—Precision Shooting, Apr. 1999, p. 74, 1 page.

Advertisement—Precision Shooting, Apr. 2001, 2 pages.

Advertisement—Precision Shooting, Aug. 2003, p. 31, 2 pages.

Advertisement—Precision Shooting, Aug. 2003, p. 97 2 pages.

Advertisement—Precision Shooting, Dec. 1999, 2 pages.

Advertisement—Precision Shooting, Dec. 2001, p. 36, 1 page.

Advertisement—Precision Shooting, Feb. 2000, 2 pages.

Advertisement—Precision Shooting, Feb. 2004, 2 pages.

Advertisement—Precision Shooting, Jun. 2000, p. 77, 2 pages.

Advertisement—Precision Shooting, May 2002, 1 page.

Advertisement—Precision Shooting, Sep. 2000, 2 pages.

Advertisement—Rifle, p. 201, 1 page.

Advertisement—S.W.A.T. Magazine 2003 Archives, May Issue. 1 page.

Advertisement—Sammut Reticle/Schmidt & Bender Custom Optics, Tactical Shooter, vol. 2, No. 5 (Jun. 1999), 3 pages.

Advertisement—Shooters of the New Millennium—Horus Vision Trag 1S2 Digital Ballistics, 2 pages.

Advertisement—Special Weapons p. 98 (2003) 1 page.

Advertisement—The Varmint Hunter Magazine, Oct. 2002, Issue 44, p. 152, 1 page.

Advertisement—Understanding Firearm Ballistics—Rinker, 1 page.

Advertisement—Unleash the Power of Your Scope—Horus Vision Introduces the Horus Vision Digital Aiming System Technology (2003), 1 page.

Advertisement—Using Only Your Scope . . . Your Point-of-Impact is Guesswork, 1 page.

(56) References Cited

OTHER PUBLICATIONS

Aerodynamic Jump Caused by the Wind, http://bisonballistics.com/system/uploaded_files/9/original/aerodynamic_jump_target.png, Bison Ballistics, printed Dec. 30, 2011. 1 page.
Ballistic Plex—Buris Savvy Optics, 1 page.
BW Optic—Y Tac Reticle—Precision European Optics, dated Aug. 3, 2004, 4 pages.
Chung, Gregory K. W. K., Nagashima, Sam O., Delacruz, Girlie C., Lee, John J., Wainess, Richard and Baker, Eva L., Review of Rifle Marksmanship Training Research, Cresst Report 783, The National Center for Research on Evaluation, Standards, and Student Testing, Jan. 2011, 105 pages.
Cutshaw, Charlie, "DPMS Panther LR .308: Long Range Accurate and Reliable at a Price that Can't Be Beat," Special Weapons, pp. 50-55 (2004), 7 pages.
Cutshaw, Charlies, "The Ed Brown Custom M702 Tactical Rifle," The Accurate Rifle, vol. 6, No. 9, pp. 38-42 (Oct. 2003) 5 pages.
Davis, American Rifleman, Mar. 1989, 1 page.
Defendants' Amended Answer to Complaint and Amended Counterclaims submitted in United States District Court, Northern District of California, San Francisco Division Case No. 3:13-cv-05460-BLF-HRL on May 19, 2014, 12 pages.
Deutsch Optik Catalog, Summer 1997, one page discussing relative *merits of optical* v. *laser rangefinders*, 2 pages.
Fortier, David, "Horus—The Avenger System," S.W.A.T., pp. 24-29 (May 2003), 7 pages.
Gottfredson, Jacob, "Optics—Sammut Custom Reticle: A Sighting System for the Long-Range Specialist," Tactic Shooter, vol. 3, No. 9, pp. 34-39 (Oct. 2000) 8 pages.
Gottfredson, Jacob, "The .338 Edge By Defensive Edge," The Accurate Rifle, vol. 6, No. 9, pp. 38-42 (Oct. 2003). At Least One IDS Cites As: Gottfredson, Jacob, "The .338 Edge By Defensive Edge," The Accurate Rifle, vol. 5, No. 14-21 (Oct. 2003) 9 pages.
Gun World, pp. 15-16 (Jan. 2003) 1 page.
Johnson, Richard F., Statistical Measures of Marksmanship, USARIEM Technical Note TN-01/2, U.S. Army Research Institute of Environmental Medicine, Feb. 2001, 27 pages.
Jonathan M. Weaver, Jr., LTC, USA Ret., Infantry, System Error Budgets, Target Distributions and Hitting Performance Estimates for General-Purpose Rifles and Sniper Rifles of 7.62x51 mm and Larger Calibers, AD-A228 398, TR-461, AMSAA, May 1990, 175 pages.
Kent, R.H. and E.J. McShane, An Elementary Treatment of the Motion of a Spinning Projectile About it's Center of Gravity, Aberdeen Proving Grounds ("APG"), MD, BRL Memorandum Report No. 85, Apr. 1944, 37 pages.
Leupold Ballistic Reticle System: Varmint Hunter's Reticle, Effective Jan. 1, 2004, 1 page.
Leupold® America's Optics Authority®: Ballistics Aiming System®, 24 pages.
Leupold® Tactical Optics: Using the Tactical Reticle System-Mil Dot/TMR®/SPRTM/CMR2, TM Usage Instructions, 36 pages.
Leupold®: Ballistics Reticle Supplement, 5 pages.
Military Handbook: Range Facilities and Miscellaneous Training Facilities Other than Buildings, http://www.everyspec.com, MIL-HDBK-1027/3A, Jan. 31, 1989, 148 pages.
Military Specification: Propellants for Small Arms Ammunition, http://www.everyspec.com, MIL-P-3984J Amendment 3, Jun. 12, 2000, 11 pages.
Military Specification: Rifle, 7.62MM, Sniper w/Day Optical Sight and Carrying Cases, M24, http://www.everyspec.com, MIL-R-71126 (AR), Sep. 24, 1992, 53 pages.
New fire-control computers entering Army service—Janes International Defense Review—first posted to http:// idr.janes.com-Aug. 21, 2003, 1 page.
Northwinds Flags, RFC-USBR Windrose, https://sites.google.com/a/wildblue.net/northwind-flags/home/Wind-Rose-2.jpg, printed Dec. 30, 2011, 1 page.
Pejsa, Art, "The Quiet Revolution in Precision Rifle Ballistics," The Varmint Hunter Magazine, Issue 50, pp. 78, 96, 105 (Apr. 2004) 4 pages.
Performance Specification: Rifle, 7.62MM; Semi-Automatic Sniper System (SASS)-M110, MIL-PRF-32316 (W/ Amendment 1), Oct. 5, 2009, 34 pages.
Polacek, Don, "Inside Product News—Leupold Illuminated Reticle Scopes," Rifle Sporting Firearms, Issue 186 (Nov. 1999), 1 page.
Polacek, Don, "Inside Product News," p. 78, 1 page.
Precision Shooting, pp. 71-72 (Jun. 2003), 2 pages.
Press Release: Horus Vision Reticle Aiming System Eliminates Guesswork, The Varmint Hunter Magazine, Issue 44 (Oct. 2002), p. 152, 1 page.
Rifle Marksmanship M16A1, M16A2/3, M16A4, and M4 Carbine, C 4, FM 3-22.9, Department of the Army, Sep. 13, 2006, 116 pages.
Rifle Shooter FN SPR-4, pp. 52-53, Nov./Dec. 2003, 4 pages.
Sammut, Dennis J., "The Long Shot: A First Person Account," Accurate Rifle, vol. 3, No. 10, pp. 53-58 (Nov. 2000)—Drafted May 1, 2000, 7 pages.
Schatz, The Long Range Rifle System That Never Was, Tactical Shooter, Feb. 2000, pp. 28-33, 9 pages.
SWFA Brochure—pp. 11, 15, 16, 42., 5 pages.
Smith, T.D., TDS Tri-Factor, "A Clear Shot; A Clear Kill," 1992. 21 pages.
The Accurate Rifle, pp. 40-41 (Oct. 2003), 2 pages.
Tradoc Bulletin 3 on the Soviet RPG-7 Antitank Grenade Launcher (Nov. 1976), 43 pages.
U.S. Army FM-23-10, Sniper Training, United States Army Infantry School ATSH-INS3, Fort Benning, GA 31905-5596, Aug. 1994, 327 pages.
USMC MCWP 3-15.3 (formerly FMFM 1-3B), Sniping, PCN 143 000118 00, Doctrine Division (C42) U.S. Marine Corps Combat Development Command, 2 Broadway Street Suite 210 Quantico, VA 22134-5021, May 2004, 203 pages.
van Zwoll, Wayne, "It's a Wide-Open Field," Guns & Ammo, pp. 62-67 (May 2003), 7 pages.
van Zwoll, Wayne, "Varmint Scopes: High-Power Optics Let You Look Rodents in the Eye," Rifle Shooter, pp. 22-25 (Jul./Aug. 2003), 5 pages.
Von Wahlde, Raymond & Metz, Dennis, Sniper Weapon Fire Control Error Budget Analysis, U.S. Army ARL-TR-2065, Aug., 1999-arl.army.mil, pp. 1-75, 85 pages.
Y-Tac Reticle Diagram, 1 page.
Defendant Leupold & Stevens, Inc.'S Disclosure of Invalidity and Noninfringement Contentions No. 3:17-cv-01153-AC Jan. 8, 2018. 31 pages.
Defendant Leupold & Stevens, Inc.'S Amended Disclosure of Invalidity and Non-Infringement Contentions No. 3:17-cv-01153-AC Apr. 17, 2018. 23 pages.
2002 Premier Reticles, Ltd. Pricing and Information. LEUPOLD008162—LEUPOLD008182, 21 pages.
U.S. Army Human Engineering Laboratory, Sights for Light AntiTank Weapons, Technical Memorandum 11-76 ("TM 11-76") Apr. 1976. LEUPOLD008185—LEUPOLD008411, 227 pages.
War Department, Auxiliary Fire-Control Instruments (Field Glasses, Eyeglasses, Telescopes, and Watches—Technical Manual TM 9-575 ("TM 9-575") May 4, 1942. LEUPOLD007803-LEUPOLD007827, 25 pages.
War Department, Telescope Mounts M21 and M23; Panoramic Telescopes M5A3 and M12A2; Range Quadrant M4; Elbow Telescope m16; and Instrument Light M5—TM 9-1551 ("TM 9-1551") May 4, 1942. LEUPOLD008412—LEUPOLD008471, 60 pages.
Department of the Army, 90 MM Recoilless Rifle, M67—FM 23-11 ("FM 23-11") Jul. 1965. LEUPOLD007732-LEUPOLD007802, 71 pages.
Department of the Army, Operation and Organizational Maintenance Cal. 50 Spotting Rifle M8C 106-MM Rifles M40A1 and M40A1C; 105-MM Rifle Mounts T173 and M79; and Tripod T26—Technical Manual, TM9-1000-205-12 ("TM9-1000-205-12") Mar. 1959. LEUPOLD010065- LEUPOLD010067, 3 pages.
Michael Haugen, User Guide For Mil-Dot Equipped Optics ("Mil-Dot User Guide") 2002. LEUPOLD008653—LEUPOLD008670, 18 pages.

(56) References Cited

OTHER PUBLICATIONS

D. Andrew Kopas, Handbook of Standard Reticle Patterns by Manufacturer ("2009 Reticle Handbook") Issued Oct. 22, 05, updated Jan. 3, 2009 Version 5. LEUPOLD008691-LEUPOLD008757, 67 pages.
Dale A. Kopas, Catalogue of Standard Reticle Patterns by Manufacturer ("2005 Reticle Handbook") Issued Oct. 22, 05, updated Dec. 15, 05. LEUPOLD007692—LEUPOLD007731, 40 pages.
Department of the Army, Elementary Optics and Application to Fire Control Instruments—TM 9-258 ("1977 Army Manual") Dec. 1977. LEUPOLD007830-LEUPOLD008056, 227 pages.
Bushnell, Bushnell 1969 Dealer Catalogue LEUPOLD008671-LEUPOLD008686, 16 pages.
1997 Premier Reticles, Ltd. Price List LEUPOLD008183—LEUPOLD008184, 2 pages.
Bushnell, Bushnell Bore Sighter 1969. LEUPOLD008687—LEUPOLD008690, 4 pages.
Barrett, Barrett Reticle, 1986. LEUPOLD010068, 1 page.
Type 97/99 Sniper Rifle and Reticle ("Type 97/99 Reticle") 1930s LEUPOLD010077-LEUPOLD010096, 20 pages.
Sherman Firefly Reticle,~1950s LEUPOLD010069, 1 page.
Leupould, CMR-W Grid Reticle, 2012. LEUPOLD007653, 1 page.
Horus, Horus Reticles include H1, H2, H3, H4, H5, H12, H19, H21, H25, H31, H39, H45, H48, H70, and other reticles and/or prototypes sold, offered for sale, or manufactured by Horus and associated entities. Pre-2005. LEUPOLD009797—LEUPOLD009853, 52 pages.
Extended European Search Report issued in corresponding European Application No. 13735677.0, dated Jun. 25, 2015, 10 pages.
International Search Report issued in corresponding Application No. PCT/US2013/020534 dated Mar. 1, 2013, 18 pages.
Extended European Search Report issued in corresponding European Application No. 14738047.1, dated Aug. 19, 2016, 12 pages.
International Search Report issued in corresponding Application No. PCT/US2014/10881 dated Dec. 9, 2014, 17 pages.
Hawks, 2006 Leupold VX-III with Custom Ballistically Matched Reticle, 4 pages.
Ballistic Calculator (http://gundata.org/ballistic-calculator).

* cited by examiner

FIG. 3

| Gun | 270 Win | 0.260 | 6.5 Creed | 0.243 | 0.243 | 30-06 |
|---|---|---|---|---|---|---|
| DM | G1 .482 | G1 .56 | G1 .623 | G1 .372 | G1 .405 | G1 .475 |
| MV | 2840fps | 2750fps | 2700fps | 2960fps | 2960fps | 2800fps |
| BW | 150gr | 130gr | 143gr | 100gr | 100gr | 165gr |
| Manufacturer | Hornady | | Hornady | Winchester | Hornady | Nosler |
| Bullet | SP Interlock | | ELD-X | | BTSP | Accubond |
| Product Line | Custom | | | | | Trophy Grade |
| 100 | -0.98 | -1.03 | -1.06 | -0.92 | -0.9 | -1.01 |
| 200 | -0.64 | -0.66 | -0.67 | -0.62 | -0.6 | -0.66 |
| 300 | 0 | 0 | 0 | 0 | 0 | 0 |
| 400 | 0.77 | 0.78 | 0.79 | 0.77 | 0.74 | 0.79 |
| 500 | 1.66 | 1.65 | 1.66 | 1.68 | 1.6 | 1.69 |
| 600 | 2.68 | 2.62 | 2.62 | 2.73 | 2.59 | 2.71 |

| | | | | | | | |
|---|---|---|---|---|---|---|---|
| 30-06 | 30-06 | 7mm-08 | 7mm-08 | 7mm-08 | 6.5-284 Norma | 0.243 | 300 Ultra |
| G1 .525 | G1 .470 | G1 .373 | G1 .574 | G1 .485 | G1 .488 | G1 .376 | G1 .650 |
| 2800fps | 2850fps | 3005fps | 2770fps | 2825fps | 2900fps | 3100fps | 2910fps |
| 168gr | 168gr | 120gr | 150gr | 140gr | 130gr | 90gr | 220gr |
| Nosler | Barnes | Barnes | Hornady | Nosler | Nosler | Nosler | Hornady |
| ABLR | TTSX BT | TTSX BT | ELD-X | Accubond | Accubond | Accubond | ELD-X |
| Trophy LR | VOR-TX | VOR-TX | Precision Hunter | Trophy Grade | Trophy Grade | Trophy Grade | Precision Hunter |
| -0.99 | -0.96 | -0.88 | -1 | -0.98 | -0.9 | -0.79 | -0.83 |
| -0.64 | -0.63 | -0.59 | -0.64 | -0.64 | -0.6 | -0.55 | -0.55 |
| 0 | 0 | 0 | 0 | 0 | 0 | 0 | 0 |
| 0.76 | 0.76 | 0.74 | 0.76 | 0.77 | 0.72 | 0.69 | 0.66 |
| 1.63 | 1.63 | 1.62 | 1.61 | 1.64 | 1.55 | 1.5 | 1.39 |
| 2.59 | 2.61 | 2.63 | 2.55 | 2.63 | 2.47 | 2.44 | 2.19 |

| | | | | | | | | |
|---|---|---|---|---|---|---|---|---|
| 300 Ultra | 300 Ultra | 300WM | 300WM | 0.243 | 22-250 Rem | 6.5-284 Norn | 7mm Rem Mag | 7mm Rem M |
| G1 .485 | G1 .661 | 190SMK | G1 .533 | G1 .331 | G1 .255 | G1 .530 | G1 .631 | G1 .616 |
| 3180fps | 2920fps | 3050fps | 3079fps | 3350fps | 3680fps | 2965fps | 2940fps | 2880fps |
| 180gr | 210gr | 190gr | 190gr | 80gr | 55gr | 129gr | 162gr | 168gr |
| Hornady | Nosler | | Berger | Barnes | Hornady | Nosler | Hornady | Nosler |
| GMX | ABLR | | | TTSX BT | V-MAX | ABLR | ELD-X | ABLR |
| Custom | Trophy LR | | Classic Hunter | VOR-TX | Varmint Express | Trophy LR | Precision Hunter | Trophy LR |
| -0.67 | -0.82 | -0.75 | -0.73 | -0.64 | -0.52 | -0.82 | -0.81 | -0.87 |
| -0.47 | -0.55 | -0.51 | -0.5 | -0.47 | -0.42 | -0.55 | -0.54 | -0.57 |
| 0 | 0 | 0 | 0 | 0 | 0 | 0 | 0 | 0 |
| 0.59 | 0.65 | 0.62 | 0.61 | 0.61 | 0.57 | 0.67 | 0.65 | 0.68 |
| 1.36 | 1.37 | 1.33 | 1.3 | 1.35 | 1.3 | 1.42 | 1.37 | 1.44 |
| 2.01 | 2.16 | 2.11 | 2.07 | 2.21 | 2.19 | 2.26 | 2.16 | 2.28 |

| | | | | | | |
|---|---|---|---|---|---|---|
| 17 Rem | 300WM | 7mm-08 | 30-06 | 300WM | 270 Win | 280 Ackley Improv |
| G1 .183 | G1 0.717 | G1 .486 | G1 .415 | G1 .597 | G1 .591 | G1 .631 |
| 4200fps | 3802fps | 2950fps | 3080fps | 2870fps | 2850fps | 2850fps |
| 20gr | 230gr | 139gr | 150gr | 190gr | 150gr | 162gr |
| Nosler | Berger | Hornady | Hornady | Nosler | Nosler | Hornady |
| FB Tipped | Hybrid Target OTM | SST | SST | ABLR | ABLR | ELD-X |
| Varmageddon | | Superperformance | Superperformance | Trophy LR | Trophy LR | Precision Hunter |
| -0.4 | -0.92 | -0.86 | -0.78 | -0.89 | -0.91 | -0.9 |
| -0.36 | -0.6 | -0.57 | -0.54 | -0.58 | -0.59 | -0.59 |
| 0 | 0 | 0 | 0 | 0 | 0 | 0 |
| 0.55 | 0.7 | 0.7 | 0.67 | 0.69 | 0.71 | 0.69 |
| 1.31 | 1.47 | 1.49 | 1.45 | 1.47 | 1.5 | 1.47 |
| 2.34 | 2.31 | 2.38 | 2.33 | 2.32 | 2.37 | 2.31 |

FIG. 3 cont.

| 7mm Rem M | 22-250 Rem | 0.223 | 0.308 | 0.308 |
|---|---|---|---|---|
| G1 .450 | G1 .231 | G1 .305 | G1 .525 | G1 .447 |
| 3000fps | 3425fps | 3100fps | 2750fps | 2840fps |
| 150gr | 64gr | 55gr | 168gr | 165gr |
| Barnes | Nosler | Nosler | Nosler | Hornady |
| TTSX BT | nded Performan | E-tip | ABLR | SST |
| VOR-TX | Trophy Grade | Trophy Grade | Trophy LR | Superformance |
| -0.83 | -0.72 | -0.97 | -1.04 | -0.99 |
| -0.56 | -0.53 | -0.6 | -0.67 | -0.64 |
| 0 | 0 | 0 | 0 | 0 |
| 0.89 | 0.73 | 0.77 | 0.8 | 0.79 |
| 1.48 | 1.69 | 1.7 | 1.7 | 1.69 |
| 2.39 | 2.88 | 2.82 | 2.7 | 2.7 |

| Gun | 0.223 | 0.223 | 0.223 | 0.223 | 7mm-08 | 0.308 |
|---|---|---|---|---|---|---|
| DM | G1 .255 | G1 .31 | G1 .255 | G1 .31 | G1. 392 | G1 .552 |
| MV | 3240fps | 3000fps | 3240fps | 3000fps | 2840fps | 2600fps |
| BW | 55gr | 62gr | 55gr | 62gr | 139gr | 178gr |
| Manufacturer | Hornady | Federal | Hornady | Federal | Hornady | Hornady |
| Bullet | V-MAX | | V-MAX | | SP Interlock | ELD-X |
| Product Line | Varmint Express | Fusion | Varmint Express | Fusion | American Whitetail | Precision Hunter |
| 100 | -0.82 | -0.95 | -0.82 | -0.95 | -1.03 | -1.21 |
| 200 | -0.58 | -0.64 | -0.58 | -0.64 | -0.87 | -0.75 |
| 300 | 0 | 0 | 0 | 0 | 0 | 0 |
| 400 | 0.78 | 0.82 | 0.78 | 0.82 | 0.83 | 0.89 |
| 500 | 1.76 | 1.82 | 1.76 | 1.82 | 1.79 | 1.89 |
| 600 | 2.98 | 3.01 | 2.98 | 3.01 | 2.91 | 3 |

|  | MOA | Wind 1 | Wind 2 |
|---|---|---|---|
| 400 yd | 3.71 | 1.75 | 3.5 |
| 500 yd | 7.11 | 2.27 | 4.53 |
| 600 yd | 10.86 | 2.85 | 5.64 |

EXTEND TO EDGE BOTH SIDES
SCALED TO 38 BOTH SIDES
LINE REPEATS AT LINE 20 AND 30 EXTEND TO EDGE BOTH SIDES
DETAIL M
SCALE 2 : 1.75

| Caliber | Zero Height Above Center | Zero Range | Height Above Aiming Point |
|---|---|---|---|
| 6.5 (140gr) & 5.56 (62gr) | 1.0 MRAD | 100m | 3.9" |
| 7.62 (175gr) | 1.7 MRAD | 100m | 6.7" |
| 5.56 (62gr) | 0.1 MRAD | 25m | .1" |

FIG. 25
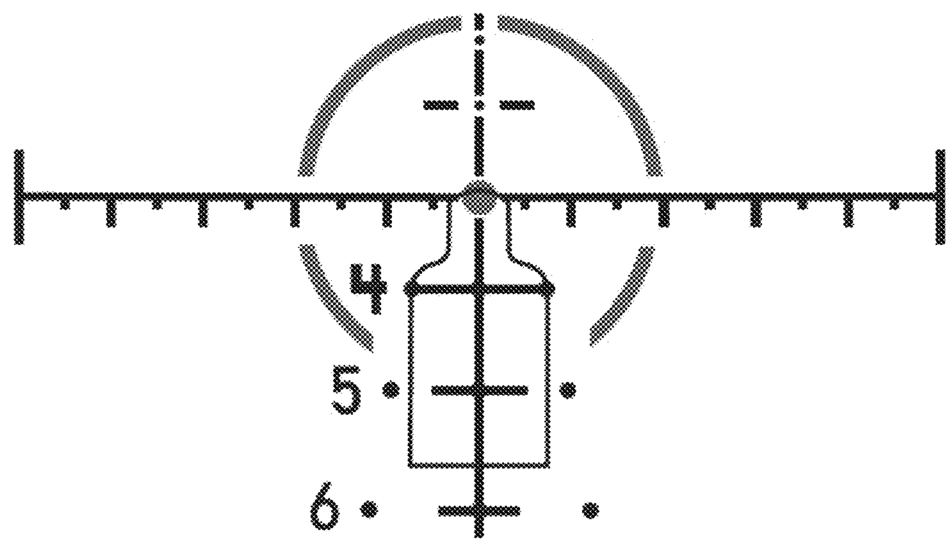
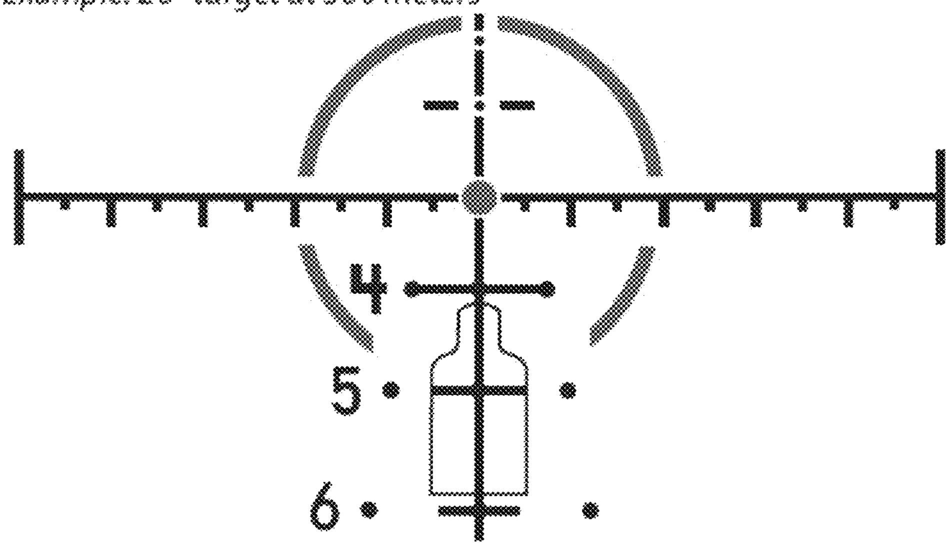

| Caliber | Wind Dot Value |
|---|---|
| 5.56 (62gr) | 6 MPH |
| 7.62 (175gr) | 8 MPH |
| 6.5 (140gr) | 10 MPH |

RETICLES, METHODS OF USE AND MANUFACTURE

This application is a continuation of U.S. patent application Ser. No. 16/671,431, filed Nov. 1, 2019, which is a continuation of U.S. patent application Ser. No. 16/560,021, filed Sep. 4, 2019, now U.S. Pat. No. 10,823,532 issued Nov. 3, 2020, which claims priority to U.S. Provisional Patent Application Ser. No. 62/726,675, filed Sep. 4, 2018, the disclosure of which is herein incorporated by reference in its entirety.

FIELD OF THE INVENTION

The present invention relates to target acquisition and related devices, and more particularly to telescopic gunsights and associated equipment used to achieve shooting accuracy at, for example, close ranges, medium ranges and long ranges at stationary and moving targets.

BACKGROUND OF THE INVENTION

All shooters, whether they are police officers, soldiers, Olympic shooters, sportswomen and sportsmen, hunters, plinkers or weekend enthusiasts have one common goal: hitting their target accurately and consistently. Accuracy and consistency in shooting depend in part on the skill of the shooter and on the construction of the firearm and projectile. At long ranges, the skill of the shooter and the consistency of the ammunition are often not enough to insure that the shooter will hit the target. As range increases, other factors can affect the flight of the bullet and the point of impact down range.

One of these factors is "bullet drop." "Bullet drop" is caused by the influence of gravity on the moving bullet, and is characterized by a bullet path which curves toward earth over long ranges. Therefore to hit a target at long range, it is necessary to elevate the barrel of the weapon, and the aiming point, to adjust for bullet drop. Other factors, such as wind, Magnus effect (i.e., a lateral thrust exerted by wind on a rotating bullet whose axis is perpendicular to the wind direction), projectile design, projectile spin, Coriolis effect, and the idiosyncrasies of the weapon or projectile can change the projectile's path over long range. Such effects are generally referred to as "windage" effects. Therefore, for example, to hit a target at long range, it may be necessary to correct for windage by moving the barrel of the weapon slightly to the left or the right to compensate for windage effects. Thus, for example, in order to hit a target at long range, the shooter should see the target, accurately estimate the range to the target, estimate the effect of bullet drop and windage effects on the projectile, and use this information to properly position the barrel of the firearm prior to squeezing the trigger.

Accordingly, the need exists for a target acquisition device having a reticle which permits a skilled shooter to rapidly and accurately identify the range to any target of known or estimable size, no matter how large or small, and to make fast and accurate adjustment for projectile drop and windage.

Different projectiles have different properties at different ranges. Accordingly, a user may wish to use a first projectile for a first purpose and a second projectile for a second purpose. Conventional telescopic gunsights and reticles are calibrated for use with a single projectile and a single firearm. For example, a combination of a single projectile, a single firearm and a single telescopic gunsight is calibrated by adjusting the elevation and windage of the telescopic gunsight to strike a target at 100 yards, or at 100 meters. Such gunsights can provide accurate shooting under the prescribed conditions, but become less effective when the prescribed conditions are not met.

SUMMARY OF THE INVENTION

The present invention relates to target acquisition and related devices, and more particularly to telescopic gunsights and associated equipment used to achieve shooting accuracy at, for example, close ranges, medium ranges and long ranges at stationary and moving targets. Certain further and illustrative embodiments of the invention are described below. The present invention is not limited to these embodiments.

Provided herein are reticles, optical devices (e.g., telescopic gunsights) using such reticles, shooting system using such optical devices, and virtual and other simulated systems employing such reticles. The reticles provided enhanced features for aiding a shooter in hitting a desired target.

In some embodiments, telescopic gunsights and reticles are provided that allow a user to use the same telescopic gunsight and reticle for two or more different projectiles, each with different properties, with accuracy from, for example, 0 to 600 yards or meters and beyond, by providing a single reticle with two or more different aiming points for striking a target at a particular distance (e.g., 100 yards or 100 meters) for the two or more different projectiles, and shared aiming points for striking a target at longer ranges (e.g., 300, 400, 500, and 600 yards or meters and beyond) for two or more different projectiles.

In one embodiment, the present invention provides a reticle for use in any target acquisition device, fixed power scope or a variable power telescopic gunsight, image amplification device, or other aiming device. In some embodiments, the present invention provides a reticle comprising one or more of or each of: a first horizontal cross-hair; a first vertical cross-hair that intersects the first horizontal cross-hair; an aiming point specific to a first projectile on the first vertical cross-hair above the intersection of the first horizontal cross-hair and the first vertical cross-hair; an aiming point specific to a second projectile on the first vertical cross-hair above the aiming point specific to the first projectile wherein the first projectile and the second projectile differ in one or more of caliber, ballistic coefficient, muzzle velocity, weight, manufacturer and construction; and two or more aiming points (e.g., unevenly spaced) on the first vertical cross-hair below the intersection of the first horizontal cross-hair and the first vertical cross-hair, wherein the two or more aiming points on the first vertical cross-hair below the intersection of the first horizontal cross-hair and the first vertical cross-hair are aiming points at predetermined target ranges that are shared between the first projectile and the second projectile.

In some embodiments, the aiming point specific to the first projectile on the first vertical cross-hair above the intersection of the first horizontal cross-hair and the first vertical cross-hair is an aiming point for a range of 100 yards (or other desired distance) to a target and the aiming point specific to a second projectile on the first vertical cross-hair above the aiming point specific to the first projectile is an aiming point for a range of 100 yards (or other desired distance) to a target. In some embodiments, the intersection of the first horizontal cross-hair and the first vertical cross-hair is an aiming point for a range of 300 yards (or other desired distance) to a target. In some embodiments, a first of the two or more unevenly spaced aiming points on the first vertical cross-hair below the intersection of the first horizontal cross-hair and the first vertical cross-hair is an aiming point for a range of 400 yards (or other desired distance) to a target, a second of the two or more unevenly spaced aiming points on the first vertical cross-hair below the first of the two or more unevenly spaced aiming points is an aiming point for a range of 500 yards (or other desired distance) to a target, and a third of the two or more unevenly spaced aiming points on the first vertical cross-hair below the second of the two or more unevenly spaced aiming points is an aiming point for a range of 600 yards (or other desired distance) to a target.

In some embodiments, the reticle further comprises one or more or each of: two or more evenly spaced second vertical cross-hairs on the first horizontal cross-hair; two or more evenly spaced second horizontal cross-hairs on the first vertical cross-hair below the intersection of the first horizontal cross-hair and the first vertical cross-hair; two or more lead markings to the user's left of the two or more the evenly spaced second horizontal cross-hairs; and two or more lead markings to the user's right and/or left of the two or more evenly spaced second horizontal cross-hairs.

In some embodiments, the two or more lead markings to the user's left of the two or more evenly spaced second horizontal cross-hairs, and/or two or more lead markings to the user's right of the two or more evenly spaced second horizontal cross-hairs are provided and are evenly spaced. In other embodiments, the distance between the two or more evenly spaced lead markings to the user's left of the two or more evenly spaced second horizontal cross-hairs, and the two or more evenly spaced lead markings to the user's right of the two or more evenly spaced second horizontal cross-hairs increases with the distance of the evenly spaced second horizontal cross-hairs below the intersection of the first horizontal cross-hair and the first vertical cross-hair (e.g., evenly spaced lead marking associated with second crosshair X are separated from each other by a distance Y and evenly spaced lead marking associated with a second crosshair Z below the second crosshair X are separated from each other by a distance greater than Y).

Cross-hairs made be solid lines or may be dashed or dotted lines or lines made of any desired combination of symbols that form a line. Two crosshairs may intersect at a gap in one or both crosshairs (i.e., the portions of one or both crosshairs that meet at the intersection may be a portion of the line having a gap).

In some embodiments, a reticle comprises a gap at the intersection of any two crosshairs (e.g., a gap at the intersection of the first horizontal cross-hair and the first vertical cross-hair). In some embodiments, the gap comprises a marking (e.g., a dot) centered within the gap. In further embodiments, a reticle comprises at least two gaps and a marking centered within at least one gap on the first vertical cross-hair above the intersection of the first horizontal cross-hair and the first vertical cross-hair wherein the marking indicates a range of 100 yards or 100 meters to a target.

In some embodiments, a reticle comprises two or more evenly spaced second vertical cross-hairs on the first horizontal cross-hair that contact the first horizontal cross-hair or intersect the first horizontal cross-hair. In further embodiments, the two or more evenly spaced second vertical cross-hairs on the first horizontal cross-hair alternate in length along the first horizontal cross-hair (e.g., alternate between such that a every other second vertical cross-hair is either long or short relative to its immediate neighbor).

In some embodiments, the lengths of the two or more evenly spaced second vertical cross-hairs on the first horizontal cross-hair, the distance of the evenly spaced second horizontal cross-hairs on the first vertical cross-hair below the intersection of the first horizontal cross-hair and the first vertical cross-hair, and the distance of the two or more unevenly spaced aiming points on the first vertical cross-hair below the intersection of the first horizontal cross-hair and the first vertical cross-hair are dimensioned in milliradians (Mils) or in minute of angle (MOA) or any other desired unit. In particular embodiments, the lengths and the distances correspond to a predetermined dimension of a target at a predetermined range.

In some embodiments, at least one of the two or more second horizontal cross-hairs is an uninterrupted straight line (i.e., a line containing no gaps). In other embodiments, at least one of the two or more second horizontal cross-hairs is an interrupted straight line (e.g., a line made of dashes, dots, or other features separated by spaces). In other embodiments, at least one interrupted second horizontal cross-hair comprises markings. In further embodiments, at least one interrupted second horizontal cross-hair comprises one or more lead markings. In still further embodiments, at least one the second horizontal cross-hair comprises an interrupted line and an uninterrupted line.

In some embodiments, two or more lead markings are selected from a group consisting of a solid dot, a hollow dot, a cross, an x, a line, a number, and a line comprising two or more numbers. In some embodiments, two or more lead markings are calibrated for the velocity of movement of a target, properties of a projectile, properties of a firearm, and/or properties of the environment. In certain embodiments, the properties of the environment comprise altitude, wind speed, wind direction, and wind angle.

In some embodiments, the first horizontal cross-hair is a line. In certain embodiments, the line is a straight line. In other embodiments, the straight line is an uninterrupted straight line. In particular embodiments, the first horizontal cross-hair has a predetermined thickness. In further embodiments, the predetermined thickness is a single thickness along the length of the first horizontal cross-hair.

In some embodiments, the first vertical cross-hair is a line. In certain embodiments, the line is a straight line. In other embodiments, the straight line is an uninterrupted straight line. In further embodiments, the first vertical cross-hair has a predetermined thickness. In still further embodiments, the predetermined thickness is a single thickness along the length of the first vertical cross-hair. In particular embodiments, the horizontal cross-hair and the first vertical cross-hair physically cross at an intersection point.

In some embodiments, the at least one of the two or more second horizontal cross-hairs is a predetermined thickness. In certain embodiments, the predetermined thickness is a single thickness along the length of the at least one of the two or more second horizontal cross-hairs.

In some embodiments, the present invention provides a target acquisition device (e.g., a riflescope), comprising a housing, an objective lens mounted in one end of the housing, an ocular lens mounted in the opposite end of the housing, and a reticle as described above or herein.

In some embodiments, the present invention provides a method for shooting a target comprising: aiming a target acquisition device comprising a reticle as described above or herein; and firing a device associated with the target acquisition device.

In some embodiments, the present invention provides a method of manufacturing a reticle as described above or herein comprising: placing markings on a disc or wafer. In some embodiments, the markings are placed by etching, placements of wires, generation of illuminated elements, or other suitable approaches. In some embodiments, the patterns are projected onto the reticle. In some embodiments, the position of the aiming point specific to a first projectile and the position of the aiming point specific to a second projectile are positioned on the reticle at distances above the first horizontal cross-hair selected such that at least one aiming point positioned on the first vertical cross-hair below the first horizontal cross-hair accurately direct the shooter to hit a target at a given distance (e.g., 400 yards) regardless of whether the aiming device is shot with the first or second projectiles. In some embodiments, two or more such aiming points are positioned on the first vertical cross-hair below the first horizontal cross-hair that correspond to distances (e.g., 400 yards, 500 yards, 600 yards, etc.) useful for either the first or second projectile.

In some embodiments, the present invention provides software (e.g., ballistics software), calculators, or other computing devices comprising or utilizing information associated with a reticle described above or herein. In some embodiments, the software, calculators, or other computing devices calculate an aiming solution for such reticle, display a reticle (e.g., an electronic display; in an eyepiece or other component of a riflescope, etc.), and/or project an aiming point on a reticle. In some embodiments, the software, calculators, or other computing devices are part of a virtual reality, augmented reality, or other simulation system used for entertainment, training, practice, or to enhance a real-life shooting scenario.

In some embodiments, software is provided that allows a user to identify a zero point on a reticle carried by a target acquisition device to employ that target acquisition device accurately with one or more different calibers. For example, in some embodiments, provided herein is a method for selecting a zero point for a target acquisition device comprising a reticle, the method comprising: a) having a target acquisition device comprising a reticle, the reticle comprising: i) a first horizontal cross-hair intersecting a first vertical cross-hair; and ii) a plurality of unevenly spaced second horizontal cross-hairs intersecting said first vertical cross-hair below said first horizontal cross-hair; and b) using software to select a zero point on said first vertical cross-hair above said first horizontal cross-hair for a selected shooting caliber, wherein said software is configured to identify the zero point for a plurality of different calibers such that the plurality of unevenly spaced second horizontal cross-hairs provide accurate ballistic drop coefficient lines for hitting a target at a plurality of distances represented by the second horizontal cross-hairs (e.g., aiming points on three or more BDC lines may be used to hit a target within three inches of the expected impact point for two or more different calibers by having the software identify the zero point for each respective caliber). In some embodiments, a uniform scale is provided on the first vertical cross-hair above the first horizontal cross-hair to readily allow the user to locate the zero-point identified by the software for a particular caliber.

Further provided herein are reticles (and target acquisition and other devices comprising such reticles) that provide rapid ranging features. For example, in some embodiments, the reticles comprise: a) a first vertical cross-hair; b) a first horizontal cross-hair intersecting said first vertical cross-hair; c) a plurality of second horizontal cross-hairs intersecting said first vertical cross-hair below said first horizontal cross-hair; and d) a plurality of range markings, comprising indicia, positioned above or below said first vertical cross-hair at a plurality of defined distances, the indicia indicating a range to target when a target fills the space between an individual range marking and the first vertical cross-hair. In some embodiments, the range markings comprise range bars, although any other useful shape may be employed. In some embodiments, the indicia for an individual range marking is a number corresponding to one of said second horizontal cross-hairs (e.g., a number 4 corresponding to a horizontal line labeled 4 (e.g., 400 yards, meters, etc.). More than one set of such range markings may be provided to allow a user to select a set corresponding to a particular target size (e.g., a first set for a 10-inch target and a second set for a 20-inch target). For example, in some embodiments, the reticle further comprises a second set of range markings, the second set of range markings, comprising indicia, positioned above or below said first vertical cross-hair at a plurality of second defined distances, the indicia indicating a range to target when a target fills the space between an individual range marking and said first vertical cross-hair, wherein the second defined distances are different than the defined distances.

BRIEF DESCRIPTION OF THE DRAWINGS

The patent or application file contains at least one drawing executed in color. Copies of this patent or patent application publication with color drawings will be provided by the Office upon request and payment of the necessary fee.

A better understanding of the invention and its advantages will be apparent from the detailed description taken in conjunction with the accompanying drawings in which:

FIG. 3 shows exemplary dual caliber reticle calculations for placement of zeroing and aiming point markings on reticles for a variety of projectile pairs.

FIG. 25 is a user's view of a reticle of an embodiment of the present invention with a 20 inch target at 400 meters, and at 500 meters.

DETAILED DESCRIPTION OF THE INVENTION

Figure 1:
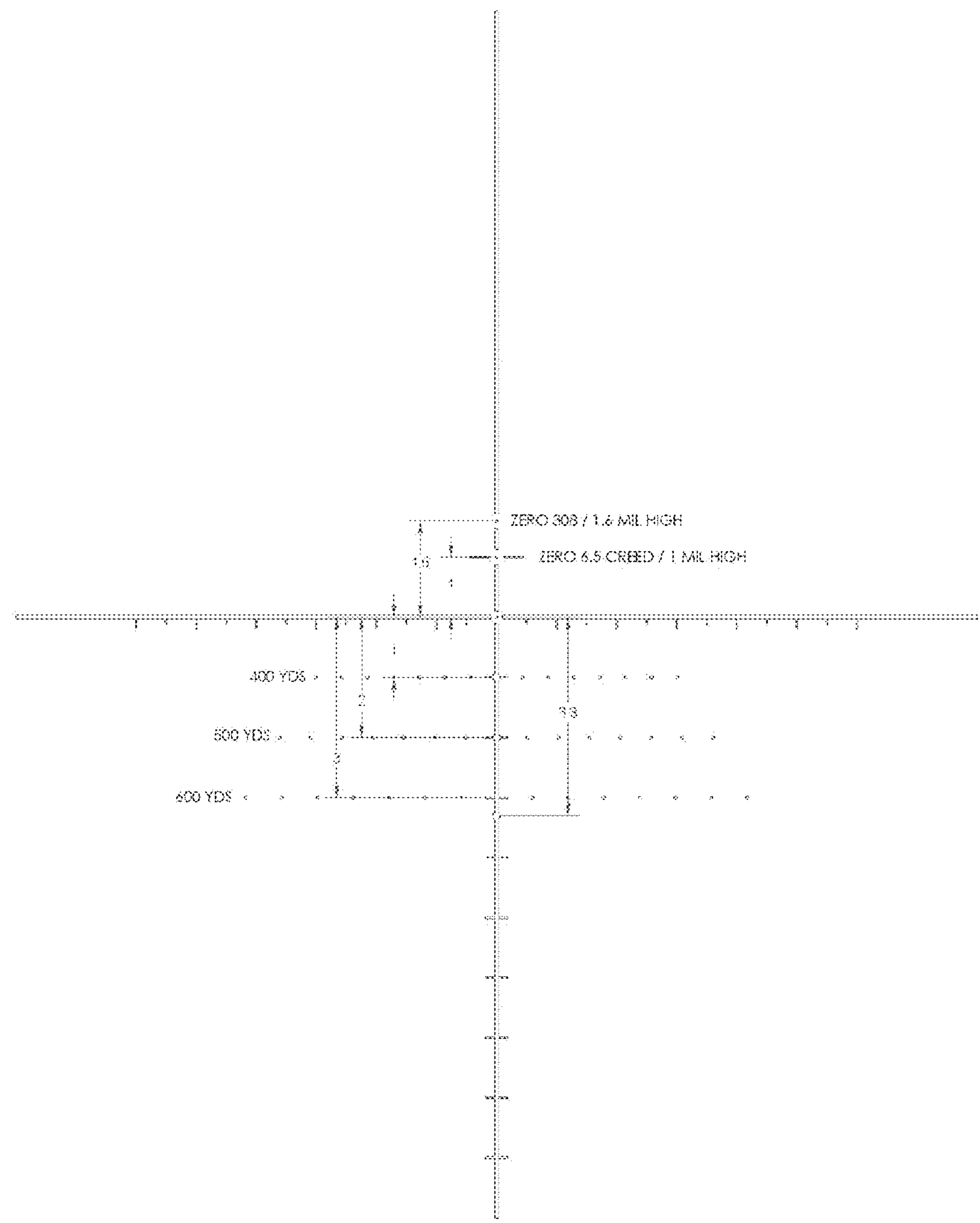
FIG. 1 is a user's view of a reticle of an embodiment of the present invention, showing the markings as viewed within a telescopic gunsight with rangefinder markings between at least one pair of second horizontal cross-hairs, wherein the reticle comprises a first horizontal cross-hair, a first vertical cross-hair that intersects the first horizontal cross-hair, an aiming point specific to a first projectile (a 6.5 Creed projectile) on the first vertical cross hair above the intersection of the first horizontal cross-hair and the first vertical cross-hair, an aiming point specific to a second projectile (a .308 projectile) on the first vertical cross-hair above the aiming point specific to the first projectile, aiming points on the first vertical cross-hair below the intersection of the first horizontal cross-hair and the first vertical cross-hair, wherein the aiming points on the first vertical cross-hair below the intersection of the first horizontal cross-hair and the first vertical cross-hair are aiming points at predetermined target ranges that are shared between the first projectile and the second projectile, lead markings, a plurality of second horizontal cross-hairs intersecting the first vertical cross-hair below the first horizontal cross-hair, wherein the plurality of second horizontal cross-hairs are evenly spaced relative to each other along the first vertical cross-hair, evenly spaced wind dots, and a plurality of second vertical cross-hairs on said first horizontal cross-hair.

The present invention relates to reticles and target acquisition and related devices, and more particularly to telescopic gunsights and associated equipment used to achieve shooting accuracy at, for example, close ranges, medium ranges and long ranges at stationary and moving targets.

In one embodiment, the present invention provides a reticle for use in any target acquisition device, fixed power scope or a variable power telescopic gunsight, image amplification device, or other aiming device. In some embodiments, the reticle comprises a substantially transparent disc, although the present invention is not limited to the use of disc shaped reticles, or to substantially transparent reticles, or to electronically generated reticles. In some embodiments, the reticle has an optical center and an edge for mounting said reticle in a housing (e.g., between an objective lens and the ocular lens of a scope), one or more aiming points positioned on said reticle, wherein the aiming points are formed, for example, by a first vertical cross-hair intersecting a first horizontal cross-hair intersecting said first vertical cross-hair to form an upper right sector (e.g., quadrant), an upper left sector, a lower right sector, and a lower left sector or by one or more second horizontal cross-hairs or other markings on or near the first vertical cross-hair.

The cross-hairs may be of any length, any width, and may comprise contiguous lines or may have gaps (e.g., dashed or dotted lines). In some embodiments, the second horizontal and vertical cross-hairs comprise intersecting continuous lines. In other embodiments, the second horizontal and vertical cross-hairs comprise intersecting discontinuous lines. In further embodiments, the cross-hairs comprise a pillar connecting, for example, the cross-hair to the circumference of the reticle with a line of different thickness. In some embodiments, at least one intersecting cross-hair crosses beyond at least one other cross-hair. In other embodiments, at least one intersecting cross-hair contacts but does not cross at least one other cross-hair. In further embodiments, first and second cross-hairs comprise triangles, circles, squares, straight lines, curved lines, arcs, solid dots, hollow dots, numbers, letters, crosses, stars, solid shapes, hollow shapes, or shapes in silhouette in a linear or curvilinear orientation to one another.

In one embodiment, unique markings (e.g., numbers) identify at least some of the second cross-hairs or other markings appearing on the reticle. In a further embodiment, the first horizontal cross-hair intersects that first vertical cross-hair at the optical center of the reticle. In another embodiment, the first horizontal cross-hair intersects that first vertical cross-hair below the optical center of the reticle. In a further embodiment, the first horizontal cross-hair intersects the first vertical cross-hair above the optical center of the reticle. In a yet further embodiment, a plurality of second horizontal cross-hairs are evenly spaced at predetermined distances along the first vertical cross-hair. In another embodiment, at least some of the second horizontal cross-hairs are unevenly spaced at predetermined distances along the first vertical cross-hair. In some embodiments, at least some of the second horizontal cross-hairs are evenly spaced and at least some of the second horizontal cross-hairs are unevenly spaced (e.g., BDC spacing) at predetermined distances along the first vertical cross-hair. In a still further embodiment, two or more second vertical cross-hairs are evenly spaced at predetermined distances along at least some of the second horizontal cross-hairs. In another embodiment, at least some of the second vertical cross-hairs are unevenly spaced at predetermined distances along the first horizontal cross-hair. In some embodiments, at least some of the second vertical cross hairs are evenly spaced at predetermined distances along the first and/or second horizontal cross-hairs, and at least some of the second vertical cross-hairs are unevenly spaced at predetermined distances along the first and/or second horizontal cross-hairs. In certain embodiments, the second vertical cross intersect one or more horizontal cross-hairs, contact one or more horizontal cross hairs, or are in proximity to one or more horizontal cross-hairs. In yet another embodiment, the reticle additionally includes range-finding markings on the reticle. The range finding markings may be in one of the sectors formed by the first vertical and horizontal cross-hairs, or may be on the first vertical or horizontal cross-hairs, or on the second vertical or horizontal cross-hairs. In some embodiments, the first or second cross-hairs themselves are used as range-finder markings. Examples of crosshair styles and configurations that may be applied in combination with the dual caliber features described herein include those described in U.S. Pat. Nos. 9,869,530, 9,612,086, 9,574,850, 9,500,444, 9,459,07, 9,335,123, 9,255,771, 9,250,038, 9,068,794, 8,991,702, 8,966,806, 8,959,824, 8,905,307, 8,893,971,8, 707,608, 8,656,630, 8,353,454, 8,230,635, 8,109,029, 7,946, 048, 7,937,878, 7,856,750, 7,832,137, 7,712,225, 6,681,512, 6,516,699, 6,453,595, 6,032,374, and 5,920,995, each of which is herein incorporated by reference in its entirety.

In still further embodiments, the reticle is optionally illuminated for day use, for twilight use, for night use, for use in low or absent ambient light, or for use with or without night vision. In yet a further embodiment, illuminated dots at, for example, even or odd Mil Radian spacing are separately illuminated in the shooter's field of vision.

In a further embodiment, reticles are constructed from an optically transparent wafer or electronically generated disc having an optical center that coincides with a center of a field of vision when the wafer is mounted in a scope. The reticles of the present invention may be made of any suitable material. The reticles may have any suitable markings that permit use as described above and elsewhere herein. The markings may be generated by any means, including, but not limited to, engravings, etchings, projections, wires, digital or analog imaging, raised surfaces (e.g., made of any desired material), etc. The reticles may be used in any type of device where there is use for second or multiple aiming points. The reticles may be used in conjunction with one or more additional components that facilitate or expand use (e.g., ballistic calculators, devices that measure exterior factors, meteorological instruments, azimuth indicators, compasses, chronographs, distance ranging devices, etc.).

In one embodiment, the present invention provides an improved target acquisition device using the reticles of the present invention. In some embodiments, the target acquisition device has one or more of a housing, an objective lens mounted in one end of the housing, and an ocular lens mounted in the opposite end of the housing. In some embodiments, the target acquisition device is a fixed power telescopic gunsight, or a variable power telescopic gunsight. When optics are mounted in the housing to permit the power to be varied along a predetermined range, the reticle is most preferably mounted between the objective lens and the variable power optics, although all configurations are contemplated by the present invention. The reticle may be configured in a target acquisition device in any desired focal plane (e.g., first focal plane, second focal plane, or a combination of both), or incorporated into a fixed power telescopic gunsight. In a further embodiment, the reticles of the present invention are incorporated for use in, for example, electronic target acquisition and aiming devices.

While the reticles of the present invention find use in long-range target acquisition devices they can be used with equal effectiveness at close and medium ranges. In one embodiment, the reticles of the present invention are adapted for use in a mid-range telescopic gunsight, or close-range telescopic gunsight, or other device.

In some embodiments, a ballistics calculator or ballistics software is used to assist a shooter in selecting an aiming point for firing a weapon. In some embodiments, the ballistics calculator is used to project an aiming point on the reticle. In some embodiments, the ballistics calculator is used to project, illuminate, or otherwise display one or more markings (e.g., crosshairs, aiming points, etc.) on a reticle. In some embodiments, the ballistics calculator receives or employs information regarding one or more of: external/environmental field conditions (e.g., date, time, temperature, relative humidity, target image resolution, barometric pressure, wind speed, wind direction, hemisphere, latitude, longitude, altitude), firearm information (e.g., rate and direction of barrel twist, internal barrel diameter, internal barrel caliber, and barrel length), projectile information (e.g., projectile weight, projectile diameter, projectile caliber, projectile cross-sectional density, one or more projectile ballistic coefficients, projectile configuration, propellant type, propellant amount, propellant potential force, primer, and muzzle velocity of the cartridge), target acquisition device and reticle information (e.g., type of reticle, power of magnification, first, second or fixed plane of function, distance between the target acquisition device and the barrel, the positional relation between the target acquisition device and the barrel, the range at which the telescopic gunsight was zeroed using a specific firearm and cartridge), information regarding the shooter (e.g., the shooter's visual acuity, visual idiosyncrasies, heart rate and rhythm, respiratory rate, blood oxygen saturation, muscle activity, brain wave activity, and number and positional coordinates of spotters assisting the shooter), and the relation between the shooter and target (e.g., the distance between the shooter and target, the speed and direction of movement of the target relative to the shooter, or shooter relative to the target (e.g., where the shooter is in a moving vehicle), and direction from true North), and the angle of the rifle barrel with respect to a line drawn perpendicularly to the force of gravity.

In some embodiments, the output of a ballistics program is selected to produce aiming point information for a specific target at a known range, or multiple targets at known or estimable ranges. In a further embodiment, the target acquisition device is a conventional telescopic gunsight comprising a reticle of the present invention in which the scope is adjusted to hit a target at range by rotating horizontal and vertical adjustment knobs a calculated number of "clicks."

In some embodiments, the reticle is configured for use in day light illumination. In some embodiments, the reticle is configured for use in low light illumination.

In some embodiments, reticles of the present invention comprise a first horizontal cross-hair, a first vertical cross-hair that intersects said first horizontal cross-hair, and one or more or each of: two or more mil lines of graduated length on said first horizontal cross-hair, two or more mil lines of graduated length on said first vertical cross-hair, two or more offset mil lines subtending the gap between the third and the fourth mil lines on the first horizontal cross-hair and the first vertical cross-hair to the left, to the right, and above the intersection of the first horizontal cross-hair and the first vertical cross-hair, two or more range markings along the first vertical cross-hair below the intersection of the first horizontal cross-hair and the first vertical cross-hair, two or more wind markings to the left and to the right of the first vertical cross-hair below the intersection of the first horizontal cross-hair and the first vertical cross-hair, two or more simultaneously visible second horizontal cross-hairs at predetermined distances on said first vertical cross-hair, and two or more simultaneously visible second vertical crosshairs at predetermined distances on said simultaneously visible second horizontal cross-hairs, wherein an intersection of at least one of said two or more simultaneously visible second vertical cross-hairs and at least one of said two or more simultaneously visible second horizontal cross-hairs provides an aiming point.

In some embodiments, the two or more mil lines of graduated length on the first horizontal cross-hair and the two or more mil lines of graduated length on the first vertical cross-hair are graduated in length in a replicated pattern. In further embodiments, the two or more mil lines of graduated length on the first horizontal cross-hair and the two or more mil lines of graduated length on the first vertical cross-hair are successively 0.5 mils, 0.6 mils, 0.7 mils, 0.8 mils and 0.9 mils in length in a pattern that is replicated thereafter along the first horizontal cross-hair and the first vertical cross-hair.

In some embodiments, the two or more offset mil lines subtending the gap between the third and the fourth mil lines on the first horizontal cross-hair and the first vertical cross-hair to the left, to the right and above the intersection of the first horizontal cross-hair and the first vertical cross-hair are offset in a V-shape. In other embodiments, the two or more offset mil lines subtending the gap between the third and the fourth mil lines on the first horizontal cross-hair and the first vertical cross-hair to the left, to the right and above the intersection of the first horizontal cross-hair and the first vertical cross-hair are successively spaced at 3.5, 3.6, 3.7, 3.8 and 3.9 mils.

In some embodiments, the two or more range markings along the first vertical cross-hair below the intersection of the first horizontal cross-hair and the first vertical cross-hair comprise a gap. In other embodiments, the gap corresponds to a predetermined dimension of a target at a predetermined range. In further embodiments, the two or more range markings along the first vertical cross-hair below the intersection of the first horizontal cross-hair and the first vertical cross-hair comprise an oval. In still further embodiments, the longest diameter of the oval corresponds to a predetermined dimension of a target at a predetermined range.

In some embodiments, the two or more wind markings to the left and to the right of the first vertical cross-hair below the intersection of the first horizontal cross-hair and the first vertical cross-hair are selected from a group consisting of a dot, a cross, an uninterrupted line, an interrupted line, a number and a line comprising two or more numbers. In other embodiments, the two or more wind markings to the left and to the right of the first vertical cross-hair below the intersection of the first horizontal cross-hair and the first vertical cross-hair are calibrated for the velocity of a target, properties of a projectile, properties of a firearm, or properties of the environment. In further embodiments, the properties of the environment comprise density altitude, wind speed, wind direction, and wind angle. Further embodiments comprise velocity-of-a-target-markings above or below the first horizontal cross-hair. In some embodiments, the wind markings to the left and to the right of the first vertical cross-hair are arranged in vertically curvilinear lines.

In some embodiments, at least one of the two or more second horizontal cross-hairs is shorter in length than the first horizontal cross-hair. In still other embodiments, at least one of two or more second vertical cross-hairs on at least one second horizontal cross-hair is an uninterrupted straight line. In some embodiments, at least one of the two or more second vertical cross-hairs is a predetermined thickness. In some embodiments, the predetermined thickness is single thickness along the at least one of the two or more second vertical cross-hairs. In other embodiments, at least one of the two or more second vertical cross-hairs is shorter in length than the first vertical cross-hair. In some embodiments, a plurality of the two or more second vertical cross-hairs are evenly spaced. In certain embodiments, the two or more wind markings are evenly spaced on at least one of said two or more simultaneously visible second horizontal cross-hairs. In other embodiments, the two or more wind markings are evenly spaced at intervals that differ between at least two of said two or more simultaneously visible second horizontal cross-hairs. In still further embodiments, rangefinder markings and the wind markings are identified by numbers. Some embodiments comprise a zero aiming point at the intersection of the first vertical cross-hair and the first horizontal cross-hair. Certain embodiments comprise a zero aiming point above the intersection of the first horizontal cross-hair and the first vertical cross-hair. Other embodiments comprise at least one simultaneously visible straight line second horizontal cross-hair on the first vertical cross-hair above the first horizontal cross-hair.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, memory chip, magnetic tape and servers for streaming media over networks.

As used herein, the terms "processor" and "central processing unit" or "CPU" are used interchangeably and refer to a device that is able to read a program from a computer memory (e.g., ROM or other computer memory) and perform a set of steps according to the program.

In some embodiments, systems and methods are implemented in hardware or software (including firmware, resident software, micro-code, etc.) or in combined software and hardware, for example as a "circuit," "module," "component," or "system." In certain embodiments, aspects of the invention are provided in the form of a computer program product embodied in one or more computer readable media having computer readable program code embodied thereon. Any combination of one or more computer readable media may be used. The computer readable media may be a computer readable signal medium or a computer readable storage medium. For example, a computer readable storage medium may be, but need not be limited to, an electronic, magnetic, optical, electromagnetic, or semiconductor system, apparatus, or device, or any suitable combination of the foregoing. Other examples of computer readable storage medium include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Computer readable storage medium may comprise any tangible medium that may contain or store a program for use by or in connection with an instruction execution system, apparatus, or device. A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. Program code embodied on a computer readable signal medium may be transmitted using any appropriate medium, including but not limited to wireless, wireline, optical fiber cable, RF, or any suitable combination thereof.

Computer program code for carrying out operations for aspects of the systems and methods may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts described herein.

In some embodiments, the computer programs provide a shooting simulation on a display. In some embodiments, systems and methods of the present invention comprise a network, a simulation administrator connected to the network, and a user device connected to the network. In specific embodiments, the simulation administrator connected to the simulation database for data storage includes, for example, target data, firearm data, and environment data. In certain embodiments, the network is a local area network. In other embodiments, the network is a wide area network including, for example, the Internet, or a combination thereof.

In some embodiments, the simulation administrator comprises a processor, a network interface connected to the processor, and memory connected to the processor. A simulation application is stored in the memory and executed by the processor. The simulation application comprises, for example, a ballistic solution application, and a statistics application that monitors, for example, user performance. In a further embodiment, a position application communicates with a position tracker connected to a controller to detect the position of the controller for the simulation application. A statistics application communicates with a database to retrieve relevant data and generate reports according to desired simulation criteria, such as selected firearms and cartridges, environments, target characteristics, and shooter characteristics for the simulation application. In particular embodiments, the simulation application generates and projects a ballistic solution projectile trajectory.

As used herein, the term "firearm" refers to any device that propels an object or projectile, for example, in a controllable flat fire, line of sight, or line of departure, for example, handguns, pistols, rifles, shotgun slug guns, muzzleloader rifles, single shot rifles, semi-automatic rifles and fully automatic rifles of any caliber direction through any media. As used herein, the term "firearm" also refers to a remote, servo-controlled firearm wherein the firearm has auto-sensing of both position and directional barrel orientation. The shooter is able to position the firearm in one location, and move to a second location for target image acquisition and aiming. As used herein, the term "firearm" also refers to chain guns, belt-feed guns, machine guns, and Gattling guns. As used herein, the term firearm also refers to high elevation, and over-the-horizon, projectile propulsion devices, for example, artillery, mortars, canons, tank canons or rail guns of any caliber.

As used herein, the term "internal barrel caliber" refers to the diameter measured across the lands inside the bore, or the diameter of the projectile. As used herein, the term "internal barrel diameter" refers to a straight line passing through the center of a circle, sphere, etc. from one side to the other and the length of the line used in ballistics to describe the bore of the barrel.

As used herein, the term "cartridge" refers, for example, to a projectile comprising a primer, explosive propellant, a casing and a bullet, or, for example, to a hybrid projectile lacking a casing, or, for example, to a muzzle-loaded projectile, compressed gas or air-powered projectile, or magnetic attraction or repulsion projectile, etc. In one embodiment of the present invention, the projectile travels at subsonic speed. In a further embodiment of the present invention, the projectile travels at supersonic speed. In a further embodiment of the present invention, the shooter is able to shift between subsonic and supersonic projectiles without recalibration of the scope, with reference to range cards specific to the subsonic or supersonic projectile.

As used herein, the term "target acquisition device" refers to an apparatus used by the shooter to select, identify or monitor a target. The target acquisition device may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the target acquisition device may be unaltered, or it may be enhanced, for example, by magnification, amplification, subtraction, superimposition, filtration, stabilization, template matching, or other means finding use in the present invention. In some embodiments, the target image presented to the shooter by the target acquisition device is compared to a database of images stored, for example, on a medium that is readable by the ballistics calculator system of the present invention. In this fashion, the ballistics calculator system performs a match or no-match analysis of the target or targets. The target selected, identified or monitored by the target acquisition device may be within the line of sight of the shooter, or tangential to the sight of the shooter, or the shooter's line of sight may be obstructed while the target acquisition device presents a focused image of the target to the shooter. The image of the target acquired by the target acquisition device may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method.

As used herein, the term "lens" refers to an object by means of which light rays, thermal, sonar, infrared, ultraviolet, microwave or radiation of other wavelength is focused or otherwise projected to form an image. It is well known in the art to make lenses from either a single piece of glass or other optical material (such as transparent plastic) which has been conventionally ground and polished to focus light, or from two or more pieces of such material mounted together, for example, with optically transparent adhesive and the like to focus light. Accordingly, the term "lens" as used herein is intended to cover a lens constructed from a single piece of optical glass or other material, or multiple pieces of optical glass or other material (for example, an achromatic lens), or from more than one piece mounted together to focus light, or from other material capable of focusing light. Any lens technology now known or later developed finds use with the present invention. For example, any lens based on digital, hydrostatic, ionic, electronic, magnetic energy fields, component, composite, plasma, adoptive lens, or other related technologies may be used. Additionally, moveable or adjustable lenses may be used.

Reticles of the present invention are typically (but not necessarily) constructed using optical material, such as optical glass or plastic, or similar transparent material, and takes the form of a disc or wafer with substantially parallel sides. The reticle may, for example, be constructed from wire, spider web, nano-wires, an etching, or may be analog or digitally printed, or may be projected (for example, on a surface) by, for example, a mirror, video, holographic projection, or other suitable means on one or more wafers of material. In one embodiment, illuminated reticles are etched, with the etching filled in with a reflective material, for example, titanium oxide, that illuminates when a light or diode powered by, for example, a battery, chemical or photovoltaic source, is rheostatically switched on compensating for increasing (+) or decreasing (−) light intensity. In a further embodiment, the illuminated reticle is composed of two or more wafers, each with a different image, for example, one image for daylight viewing (that is, a first reticle), and one image for night viewing (that is, a second reticle). In a still further embodiment, if the shooter finds it undesirable to illuminate an entire reticle, since it might compromise optical night vision, the second reticle illuminates a reduced number of dots or lines. In yet another embodiment, the illuminated first and second reticles are provided in any color. In a further embodiment, the illuminated reticle of the shooter's aiming device is identical to one or more spotter target acquisition devices such that the spotting device independently illuminates one or both of the reticles.

In a further embodiment, the illuminated reticles of the present invention are used in, for example, low light or no light environments using rheostat-equipped, stereoscopic adaptive binoculars. With one eye, the shooter looks through a target acquisition device equipped with an aiming reticle of the present invention. With the opposite eye, the shooter observes the target using a night vision device, for example, the PVS 14 device. When the reticle and night vision device of the binocular are rheostatically illuminated, and the binocular images are properly aligned, the reticle of the target acquisition device is superimposed within the shooter's field of vision upon the shooter's image of the target, such that accurate shot placement can be made at any range in low light or no light surroundings.

In one embodiment, the reticle of the present invention is electronically projected on a viewing screen comprising the shooter's image of the target. As used herein, the term "image" refers to data representation of a physical object or space. In another embodiment, an electronic image receptor receives an image from lenses made of, for example, plastic, glass or other clear material. In a further embodiment, the electronic image receptor is permanently affixed to the target acquisition device. In a further embodiment, two or more electronic image receptors are simultaneously or sequentially available to the shooter for acquisition of different spectral images including, for example, IR, thermal, visible light, ultra-violet light (UV), radiation including X-ray, gamma ray, isotope and particle radiation, microwave, night vision, radar, vibrational receptors including ultra-sound, sound pulse, sonar, seismic vibrations, magnetic resonance, gravitational receptors, broadcast frequencies including radio wave, television and cellular receptors, etc. In an additional embodiment, the electronic image receptor is a replaceable component of the target acquisition device. In some embodiments, the reticle of the present invention is a thick or thin line-weight reticle.

In one embodiment, the electronic image is projected from the shooter's target image acquisition device to a ballistics calculator processing unit by, for example, physical cable, IR, Bluetooth™, radio wave, cellular connections, laser pulse, optical, 802.11b or other wireless transmission using, for example, protocols such as html, SML, SOAP, X.25, SNA, etc., and may be encrypted for security. The processing unit may be any sort of computer, for example, ready-built or custom-built, running an operating system. In further embodiments, manual data is input to the processing unit through voice recognition, touch screen, keyboard, buttons, knobs, mouse, pointer, joystick, or analog or digital devices. In a further embodiment, the reticle of the present invention is electronically projected on a viewing screen comprising one or more spotter's image of the target. In a still further embodiment, the electronic image of the spotter's target image acquisition device is projected to the ballistics calculator by, for example, cable, IR, Bluetooth™, or other wireless transmission. In a further embodiment, viewing screens of the ballistics calculator system comprising, for example, aiming points, ghost rings and targeting data are projected on one or more shooter's and one or more spotter's viewing screens. In some embodiments the visual display includes LCD, CRT, holographic images, direct corneal projection, large screen monitors, heads up display, and ocular brain stimulus. In other embodiments, the display is mounted, for example, on the scope, in portable head gear, on glasses, goggles, eye wear, mounted on the firearm, or in a portable display standing apart from the firearm.

In some embodiments, the shooter is able to use the processing unit of the ballistics calculator system to electronically select the color of the reticle or image, and, through electronic enhancement of the target image, for example, to defeat mirage, to increase or decrease the brightness and contrast of the reticle, to increase or decrease the brightness and contrast resolution of the target image, to stabilize the image, to match the image with an electronic library of stored images, to electronically amplify the target image through pixel replication or any other form of interpolation, to sharpen edge detection of the image, and to filter specific spectral elements of the image. In other embodiments, image types can be combined by the processing unit of a ballistic calculating system to assist in resolving images, for example, performing digital combinations of visible spectrum with thermal imaging, overlapping ultraviolet images with X-ray images, or combining images from an IR scope with night optics. The processing unit gathers all data on, for example, target size, angles and locations of spotters and shooters, and constructs an accurate position of the target in relation to the shooter. In a further embodiment, the ballistics calculator displays the electronic image observed by the shooter's or spotter's target image acquisition devices. In a further embodiment, after the firearm is discharged the targeting grid of the electronic target image acquisition device and ballistics calculator system is adjusted so that the point of impact is matched to the targeting grid, thereby establishing a rapid zero aiming point. In yet another embodiment, firearm and telescopic aiming device are zeroed electronically.

In one embodiment, the target acquisition device is not mounted on a firearm. An advantage of not having the target acquisition device image receptor be mounted on the scope or firearm is that much larger, more powerful and more sensitive imaging components can be deployed, making it easier to acquire better images without burdening the shooter with additional bulk and weight. In addition, a stand-apart image receptor is not exposed to recoil from the firearm. In the stand-apart ballistics calculating system shooters, spotters and other interested parties view the target via a target image acquisition device, for example, a thermal imaging device, that projects an image on a video monitor or glasses, goggles, an eye-piece, a contact lens, a headset, or on the retina of the viewer. In some embodiments, the image receptor is in a spotting scope beside the firearm. In another embodiment, the image receptor is mounted on a nearby firearm. In a further embodiment, the image receptor is at a separate location, or remote site. In a further embodiment, the image receptor is in an airborne vehicle, drone, or satellite. In a further embodiment, the image is available as previously stored information. In another embodiment, the one or more shooters use multiple or composite image receptors.

In one embodiment of the present invention, the reticle is projected on glasses, goggles, an eye-piece, a contact lens, a headset, or on the retina of the shooter. In another embodiment, the reticle is superimposed on any suitable image of the target, for example an optical image, a thermal image, an ultrasonic image, a sonar image, a radar image, a night vision image, a magnetic image, an infrared image, an enhanced image of any kind, or a holographic projected electronic image. In still further embodiment, the reticle is superimposed on the intended target and the aiming point is illuminated by a laser. Where the markings on a reticle are generated or moveable, in some embodiments, the markings may be modified to account for changes in the environment and/or desired function. For example, the position, size, spacing of cross-hairs, etc. may be automatically or manually adjusted to improve function.

In an additional embodiment, the reticle is provided with a circumscribing ring visible through the target acquisition device, to aid in centering the eye relative to the target acquisition device. This ring helps reduce shooting inaccuracy caused by the misalignment of the shooter's line of sight through the target acquisition device. The ring assures a repeatable check weld to the firearm that is beneficial to repeatable shooting. By providing a visual component to align the reticle within the target acquisition device, the shooter is able to produce more accurate and more repeatable results. In one embodiment, the reticle of the present invention further comprises a substantially transparent disc having an optical center and an edge for mounting said disc, and a ring positioned optically between said optical center and said edge, said ring spaced from said edge and circumscribing said optical center and one or more aiming points, whereby said ring can be visually centered in a field of view for aligning a line of sight through the target acquisition device. In some embodiments, the ring-equipped reticle allows the shooter to rapidly discriminate the ring in the target acquisition device's field of view. The shooter thereby naturally and subconsciously focuses on the center of the ring. In further embodiments, a central dot is used for finer or more precise targeting as time allows. As used herein, a "central dot" refers to any geometric shape, for example, a circle, a square, a cross, or a diamond. In some embodiments, the central dot is solid. In other embodiments, the central dot is hollow. In further embodiments, the central dot is indicated by interrupted lines.

In some embodiments, the reticles of the present invention comprise two or more rings. In further embodiments, at least one ring is within another ring. In still further embodiments, a circumscribing ring is differentially illuminated from at least one component of the reticle. In some embodiments, the ring diameter is suitable for use at a near, an intermediate or a distant target. More accurate results can be achieved if a shooter centers the reticle while looking through the target acquisition device. However, aligning the user's eye with the optical center of the target acquisition device is not always easy. The present invention can also be provided with a "ghost ring." The ghost ring is a visible ring which has as its center the optical center of the scope, and which circumscribes the markings on the reticle. The ghost ring aids shooters by helping them align their sight with respect to the target acquisition device and reticle. By insuring that the ghost ring is centered within the field of view of the target acquisition device, the reticle will likewise be centered. In additional embodiments, the ring-equipped reticle gives the shooter the ability to rapidly acquire and engage targets at very close distances to plus or minus 300 yards. When a target is spotted, and time is of the essence, the central ring that encases all or part of the reticle gives the shooter the ability to quickly discriminate the object to be targeted. In some embodiments the ring is designed with a thick line, for example a line that subtends, or covers, 5 MOA at 100 yards. In other embodiments, a thinner line is employed compatible with, for example, specific target acquisition devices, further magnification powers, weapons of choice, or assigned missions. In some embodiments, the area subtended by the ring is selected depending on targeting and weapon requirements. In further embodiments, the area of the ring on an electronic reticle is selected by programming the ballistics calculator system.

In some embodiments, the ring is partitioned into 4 equal quadrants by horizontal and vertical cross-hairs. In other embodiments, the quadrants bounded by horizontal and vertical cross-hairs are unequal in area. In another embodiment, the ring is a geometric shape, for example an oval or diamond, positioned at the center of the optical field of view. In other embodiments, the ring is a geometric shape, for example an oval or a diamond, located at the point that the horizontal and vertical cross-hairs physically intersect. In specific embodiments, the ring may take any geometric shape for example, a circle, a rhombus, a diamond, a triangle, and the like. In still other embodiments, the ring is a geometric shape, for example an oval or a diamond, located at the point that interrupted horizontal and vertical cross-hairs intersect if linearly projected. In some embodiments, the geometric shape of the ring subtends 5 MOA at exactly 100 yards. In one embodiment, the geometric shape of the ring is continuous. In another embodiment, the geometric shape of the ring is interrupted (e.g., composed of dashed or dotted lines). In yet further embodiments, the size and shape of the ring is selected depending on the mission, weapon and type of ammunition.

To use a target acquisition device and reticle of the present invention, it is suggested that the shooter becomes familiar with the characteristics of the firearm, projectile and ammunition to be used. The target acquisition device and reticle can be calibrated to work with almost any type of firearm, for example, handguns, pistols, rifles, shotgun slug guns, muzzleloader rifles, single shot rifles, semi-automatic rifles and fully automatic rifles of any caliber, air rifles, air pistols, chain guns, belt-feed guns, machine guns, and Gattling guns, to high elevation or over the horizon projectile devices, artillery, mortars, or canons or rail guns of any caliber. The target acquisition device and reticle can be calibrated to work with any type of ammunition, for example, a projectile comprising a primer, powder, a casing and a bullet, a hybrid projectile lacking a casing, a muzzle-loaded projectile, gas or air-powered projectile, or magnetic projectile.

In some embodiments, reticles of the present invention comprise lead markings. In some embodiments, lead markings on the reticle are used to aid the shooter in determining the direction and rate of movement of the target in relation to the shooter in order to target a moving object. As used herein, "rate of movement" refer to a unit of distance traveled per unit time. Any unit of distance and any unit of time are suitable for indicating rate of movement. In some embodiments, units of distance include, for example, inches, feet, yards, miles, centimeters, meters, or kilometers. In some embodiments, units of time include, for example, milliseconds, seconds, minutes, hours, days, weeks, months or years. Lead markings may occupy any position in relation to first and second vertical or horizontal cross-hairs. In some embodiments, lead markings occupy positions, for example, above a cross-hair, below a cross-hair, upon a cross-hair, between cross-hairs, or at the end of a cross-hair.

In one embodiment, "lead markings" or "wind markings" are evenly spaced. In other embodiments, lead markings are unevenly spaced. In further embodiments, lead markings are spaced according to average rates of movement. In some embodiments, lead markings are projected on the reticle by a ballistics calculator system. In other embodiments, projected lead markings are spaced on the reticle by a ballistics calculator system to account, for example, for the target's distance from the shooter, the target's direction of movement, the target's velocity of movement, the target's rate of acceleration, the reaction time of the shooter, or the lock time of the firearm.

As used herein, "lead markings" may take any shape or configuration. In some embodiments, lead markings may be, for example, triangles, circles, squares, straight lines, curved lines, arcs, dots, numbers, letters, crosses, stars, solid shapes, or shapes in silhouette. Lead markings may be any color, in some embodiments, for example, black, white, red or blue in color. In other embodiments lead markings serve more than one purpose serving, for example, as identification markings or range-finding markings as well as lead markings. In one embodiment, the lead markings are along at least one of the first cross-hairs. In another embodiment, the lead markings are along at least one of the second cross-hairs. In yet another embodiment, the lead markings are along at least one first cross-hair, and at least one second cross-hair. In a further embodiment, the plurality of lead markings comprises at least three lead markings. In further embodiments, the lead markings are second vertical cross-hairs on a first and/or second horizontal cross-hair. In one embodiment, lead markings are arcs along a first and/or second horizontal cross-hair. In another embodiment, lead markings are solid circles along a first and/or second horizontal cross-hair. In still another embodiment, lead markings are solid triangles along a first and/or second horizontal cross-hair.

In some embodiments, reticles of the present invention comprise refined mil markers, speed-shooting features, moving target holds, speed-shooting wind markings and holdover crosses. In some embodiments, reticles of the present invention provide refined mil markings at one or more locations on the reticle for measuring targets and milling distances. In further embodiments, these mil markers are arranged in clusters throughout the reticle, thereby providing fast intuitive measuring guides in 0.1, 0.2, 0.5 and 1.0 mil increments. For example, in some embodiments, the reticles of the present invention provide clusters of refined mil-markers arranged in bird-flock shaped chevron patterns. These bird-flock chevrons allow refined milling of targets at 0.1, 0.2, 0.3, 0.4 and 0.5 mils. In still further embodiments, such clusters are embedded within the reticle's first horizontal and first vertical cross-hair. In certain embodiments, three bird-flock clusters of refined mil markers are embedded into first horizontal and vertical cross-hairs of the present invention. Each cluster may be comprised of five 0.1 mil increments, enabling rapid measuring from 0.1 to 0.5 mils. However, the locations of the markings an appear on any desired location on the reticles, including above or below the first horizontal cross-hair and to the left and/or right of the first vertical cross-hair.

In some embodiments, the reticle's first horizontal and vertical cross-hairs are intersected by hash marks (i.e., hack marks or second vertical cross-hairs) at 1-mil increments. In further embodiments, the lengths of the hash marks lengthens from 0.5 mils, to 0.6, to 0.7, 0.8, and 0.9 mils in order. This pattern then repeats itself. In further embodiments, the repeating pattern of expanding lengths provides a mechanism for precisely measuring targets along the reticle's two first cross-hairs, but does not appear along the portion of the reticle's first vertical cross-hair contained within the aiming grid. In some embodiments, reticles of the present invention comprise first horizontal and vertical cross-hairs that are incremented with repeating patterns of hash marks. In further embodiments, the larger of the hash marks are spaced at 1.0 mil increments. In certain embodiments, the 1.0 mil increments are subdivided by a repeating pattern of smaller hash marks. The smaller repeating pattern provides fast milling at 0.2, 0.5, 0.8 and 1.0 mil increments in a pattern that repeats throughout the reticle's first horizontal and vertical cross-hairs above the 10.0 mil drop line. In some embodiments, the pattern does not occur within the aiming grid.

Figure 2:
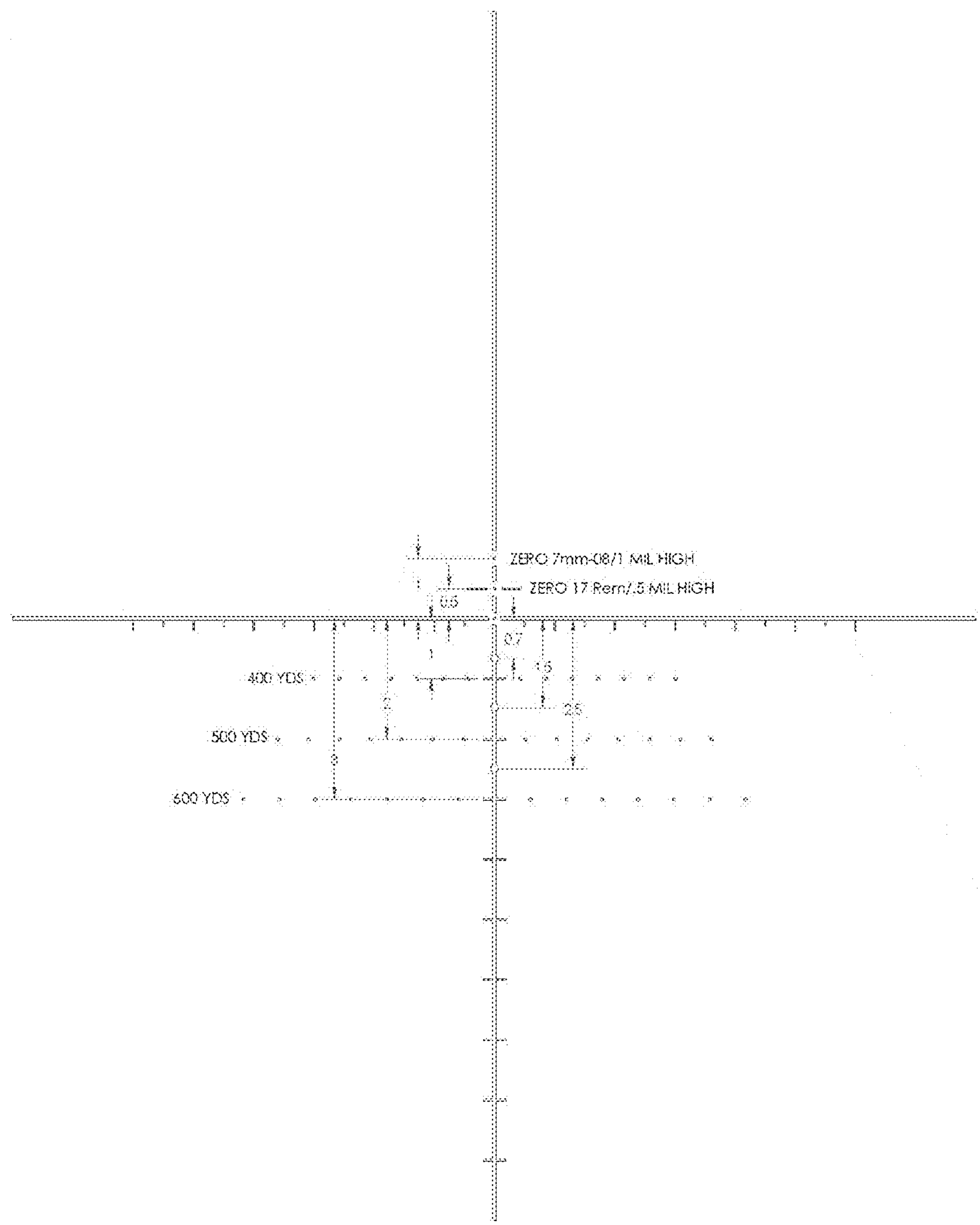
FIG. 2 is a user's view of a reticle of an embodiment of the present invention, showing the markings as viewed within a telescopic gunsight with rangefinder markings between at least one pair of second horizontal cross-hairs, wherein the reticle comprises a first horizontal cross-hair, a first vertical cross-hair that intersects the first horizontal cross-hair, an aiming point specific to a first projectile (a .17 Rem projectile) on the first vertical cross hair above the intersection of the first horizontal cross-hair and the first vertical cross-hair, an aiming point specific to a second projectile (a 7 mm-08 projectile) on the first vertical crosshair above the aiming point specific to the first projectile, aiming points on the first vertical cross-hair below the intersection of the first horizontal cross-hair and the first vertical cross-hair, wherein the aiming points on the first vertical cross-hair below the intersection of the first horizontal cross-hair and the first vertical cross-hair are aiming points at predetermined target ranges that are shared between the first projectile and the second projectile, lead markings, a plurality of second horizontal cross-hairs intersecting the first vertical cross-hair below the first horizontal cross-hair, wherein the plurality of second horizontal cross-hairs are evenly spaced relative to each other along the first vertical cross-hair, evenly spaced wind dots, and a plurality of second vertical cross-hairs on said first horizontal cross-hair.
Figure 4:
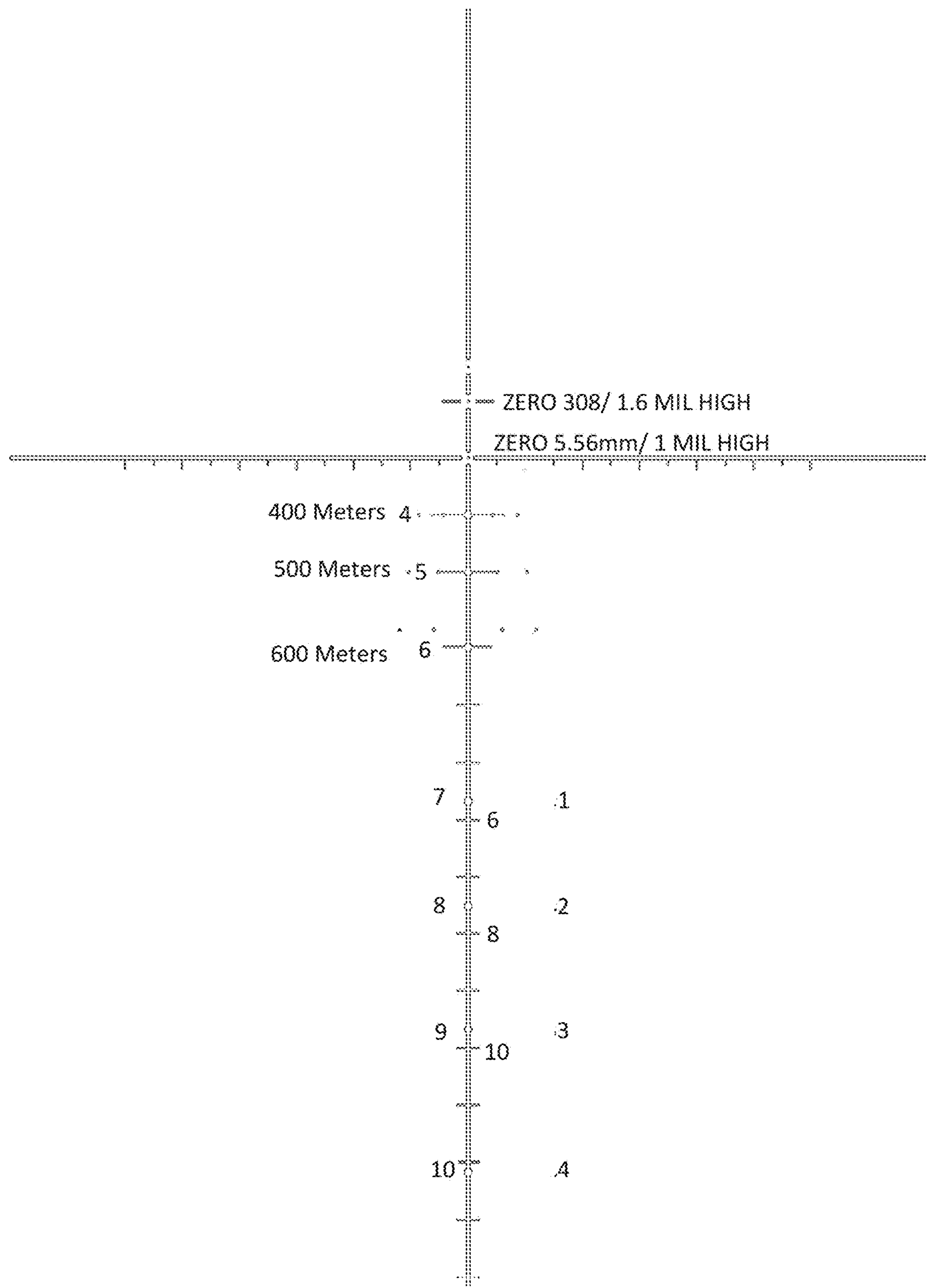
FIG. 4 is a user's view of a reticle of an embodiment of the present invention, showing the markings as viewed within a telescopic gunsight with rangefinder markings between at least one pair of second horizontal cross-hairs, wherein the reticle comprises a first horizontal cross-hair, a first vertical cross-hair that intersects the first horizontal cross-hair, an aiming point specific to a first projectile (a 5.56 mm projectile) on the first vertical cross hair above the intersection of the first horizontal cross-hair and the first vertical cross-hair, an aiming point specific to a second projectile (a .308 projectile) on the first vertical cross-hair above the aiming point specific to the first projectile, aiming points on the first vertical cross-hair below the intersection of the first horizontal cross-hair and the first vertical cross-hair, wherein the aiming points on the first vertical cross-hair below the intersection of the first horizontal cross-hair and the first vertical cross-hair are aiming points at predetermined target ranges that are shared between the first projectile and the second projectile, lead markings, a plurality of second horizontal cross-hairs intersecting the first vertical cross-hair below the first horizontal cross-hair, wherein the plurality of second horizontal cross-hairs are evenly spaced relative to each other along the first vertical cross-hair, evenly spaced wind dots, and a plurality of second vertical cross-hairs on said first horizontal cross-hair.
Figure 5:
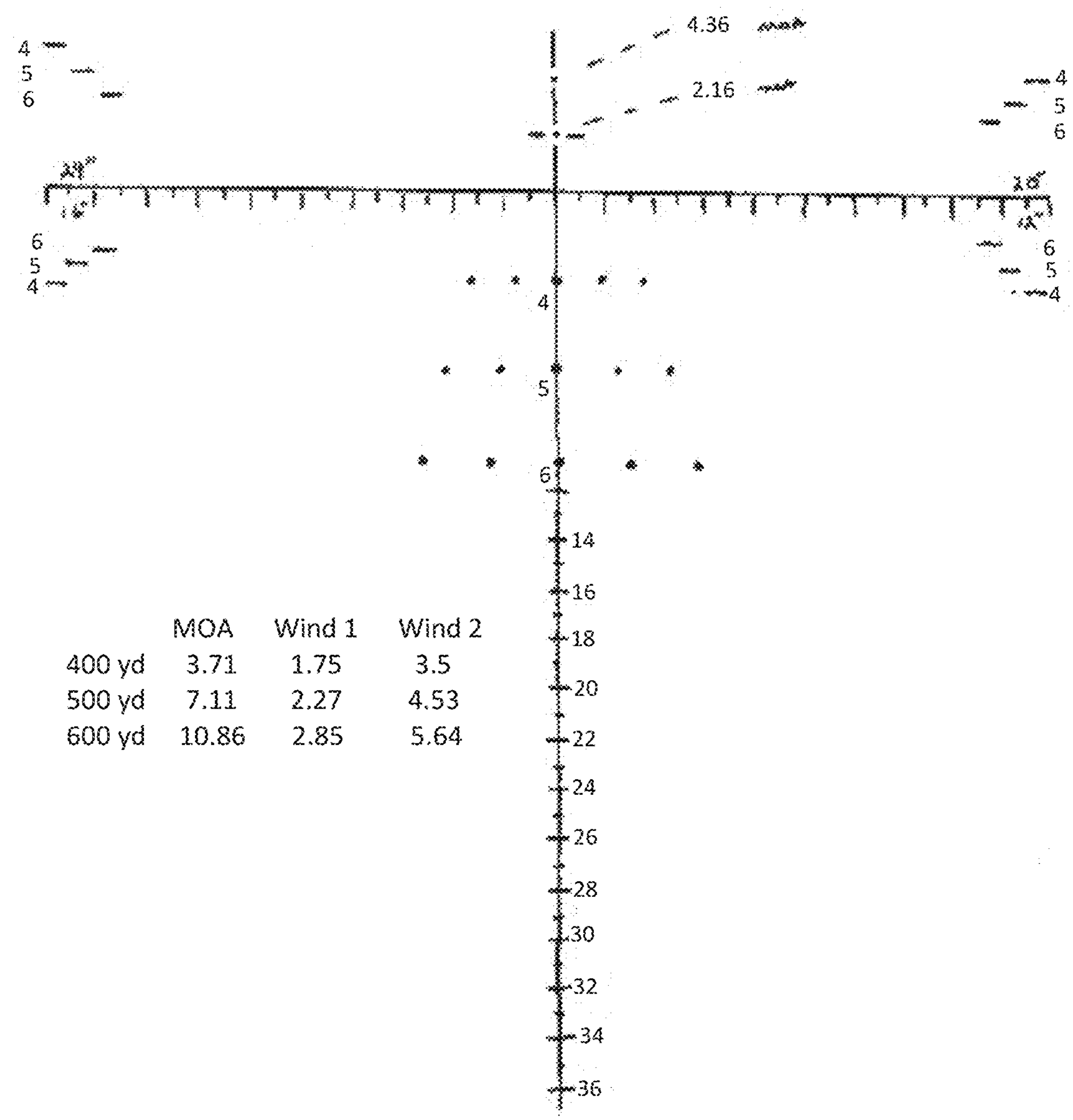
FIG. 5 is a user's view of a reticle of an embodiment of the present invention comprising a first horizontal cross-hair, a first vertical cross-hair, two or more evenly spaced second vertical cross-hairs that contact said first horizontal cross-hair, two or more second horizontal cross-hairs on said first vertical cross-hair below the intersection of said first horizontal cross-hair and said first vertical cross-hair, wherein two or more of said second horizontal cross-hairs are interrupted (dotted) straight lines, and two or more said second horizontal cross-hairs are uninterrupted straight lines, at least one second horizontal cross-hair on said first vertical cross-hair above the intersection of said first horizontal cross-hair and said first vertical cross-hair, and range finder markings replicated to the user's left and to the user's right of said first horizontal cross-hair.
Figure 6:
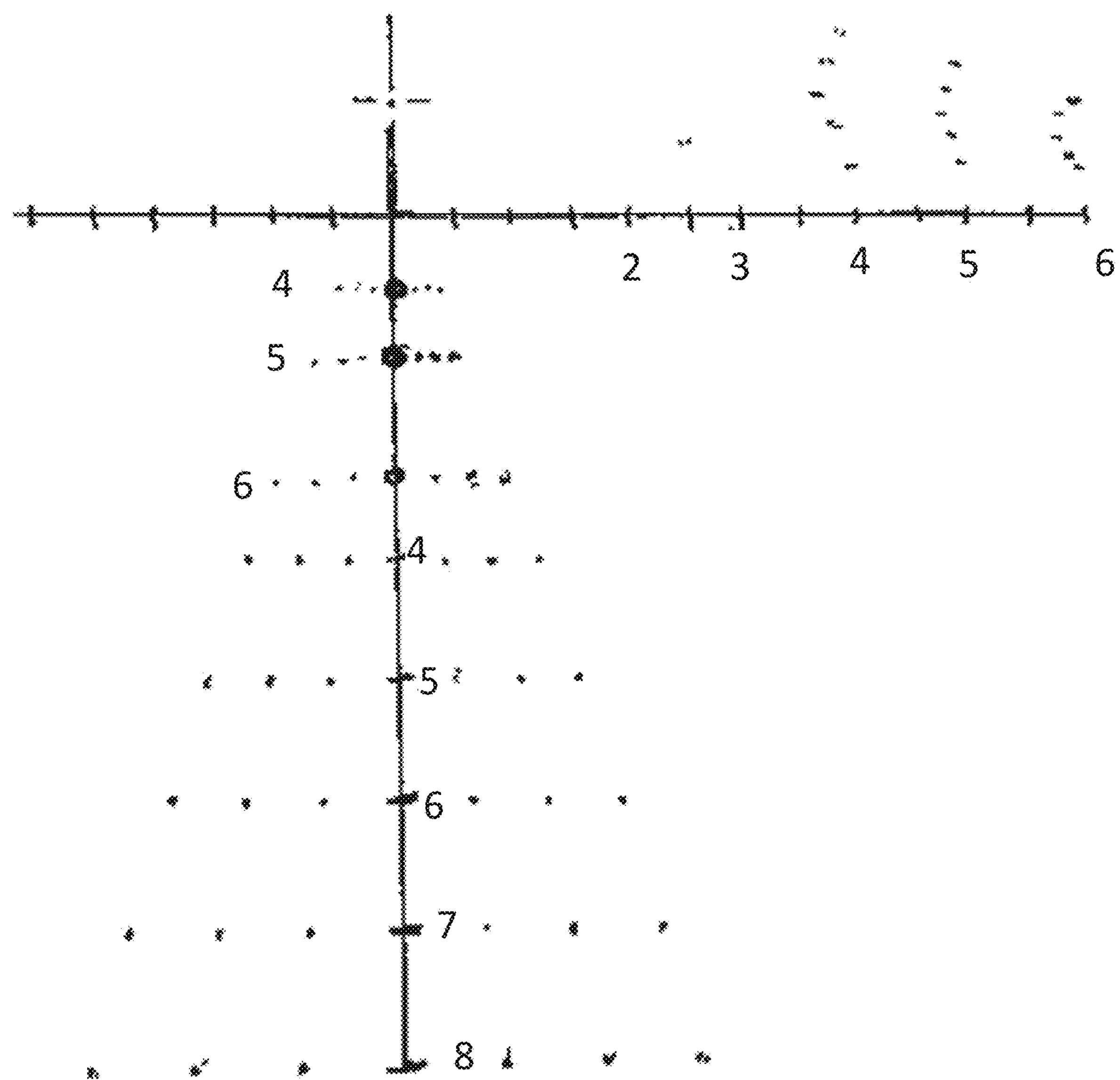
FIG. 6 is a user's view of a reticle of an embodiment of the present invention comprising a first horizontal cross-hair, a first vertical cross-hair, two or more evenly spaced second vertical cross-hairs that intersect said first horizontal cross-hair, two or more unevenly spaced (eight shown) second horizontal cross-hairs on said first vertical cross-hair below the intersection of said first horizontal cross-hair and said first vertical cross-hair, wherein two or more of said second horizontal cross-hairs are interrupted (dotted) straight lines, at least one second horizontal cross-hair on said first vertical cross-hair above the intersection of said first horizontal cross-hair and said first vertical cross-hair, and range finder markings to the user's right of said first horizontal cross-hair in a chevron pattern.
Figure 7:
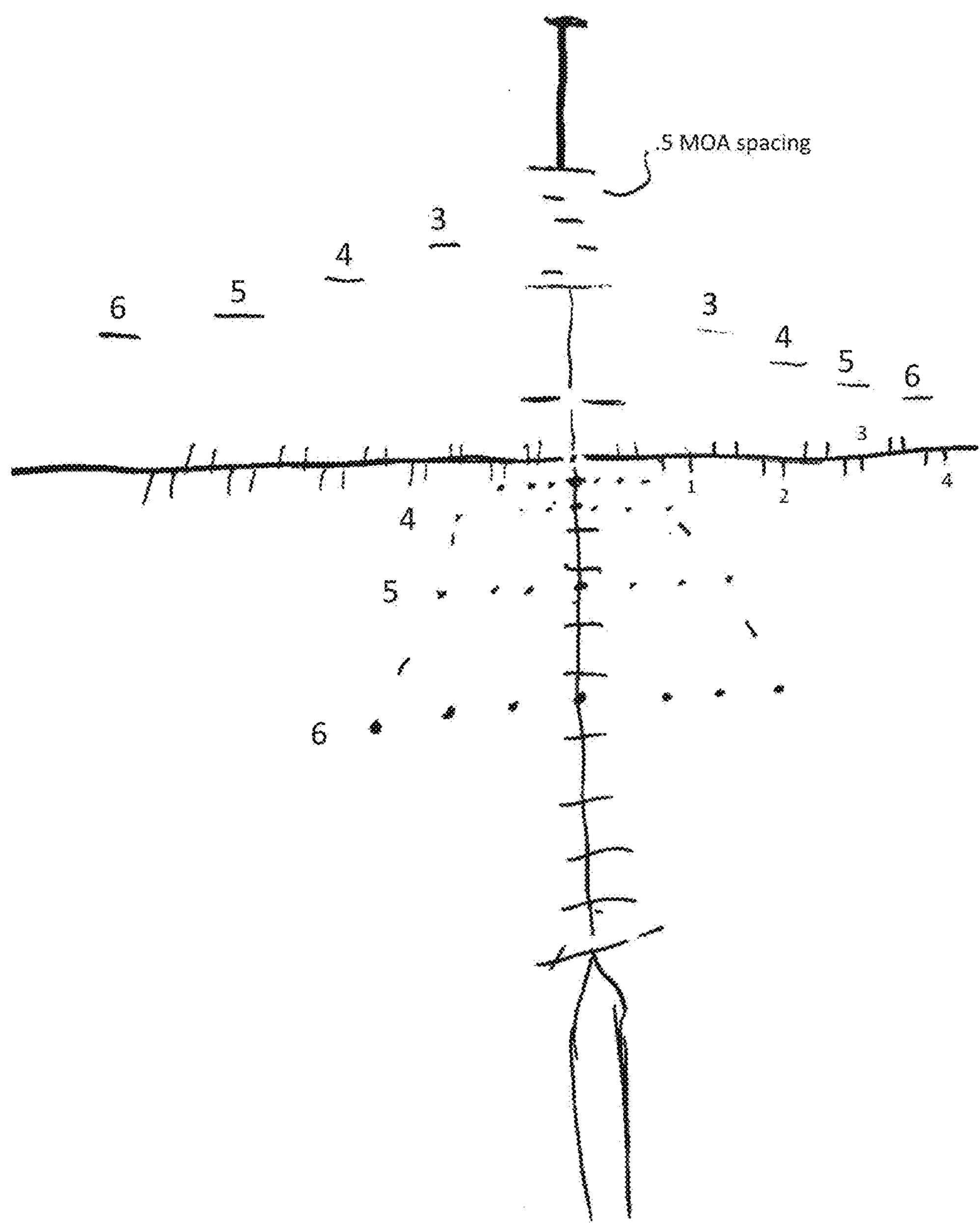
FIG. 7 is a user's view of a reticle of an embodiment of the present invention comprising a first horizontal cross-hair, a first vertical cross-hair, two or more evenly spaced second vertical cross-hairs that contact said first horizontal cross-hair (shown as alternating sets of two markings contacting above and below the first horizontal), two or more (four shown) unevenly spaced second horizontal cross-hairs on said first vertical cross-hair below the intersection of said first horizontal cross-hair and said first vertical cross-hair, wherein two or more of said second horizontal cross-hairs are interrupted (dotted) straight lines, and two or more of said second horizontal cross-hairs are uninterrupted straight lines, at least two second horizontal cross-hairs on said first vertical cross-hair above the intersection of said first horizontal cross-hair and said first vertical cross-hair wherein a gap between two of said two or more second horizontal cross-hairs above the intersection of said first horizontal cross-hair and said first vertical cross-hair comprises three or more mil lines offset in a V-shape, and numbered horizontal line range finder markings above the first horizontal cross-hair.
Figure 8:
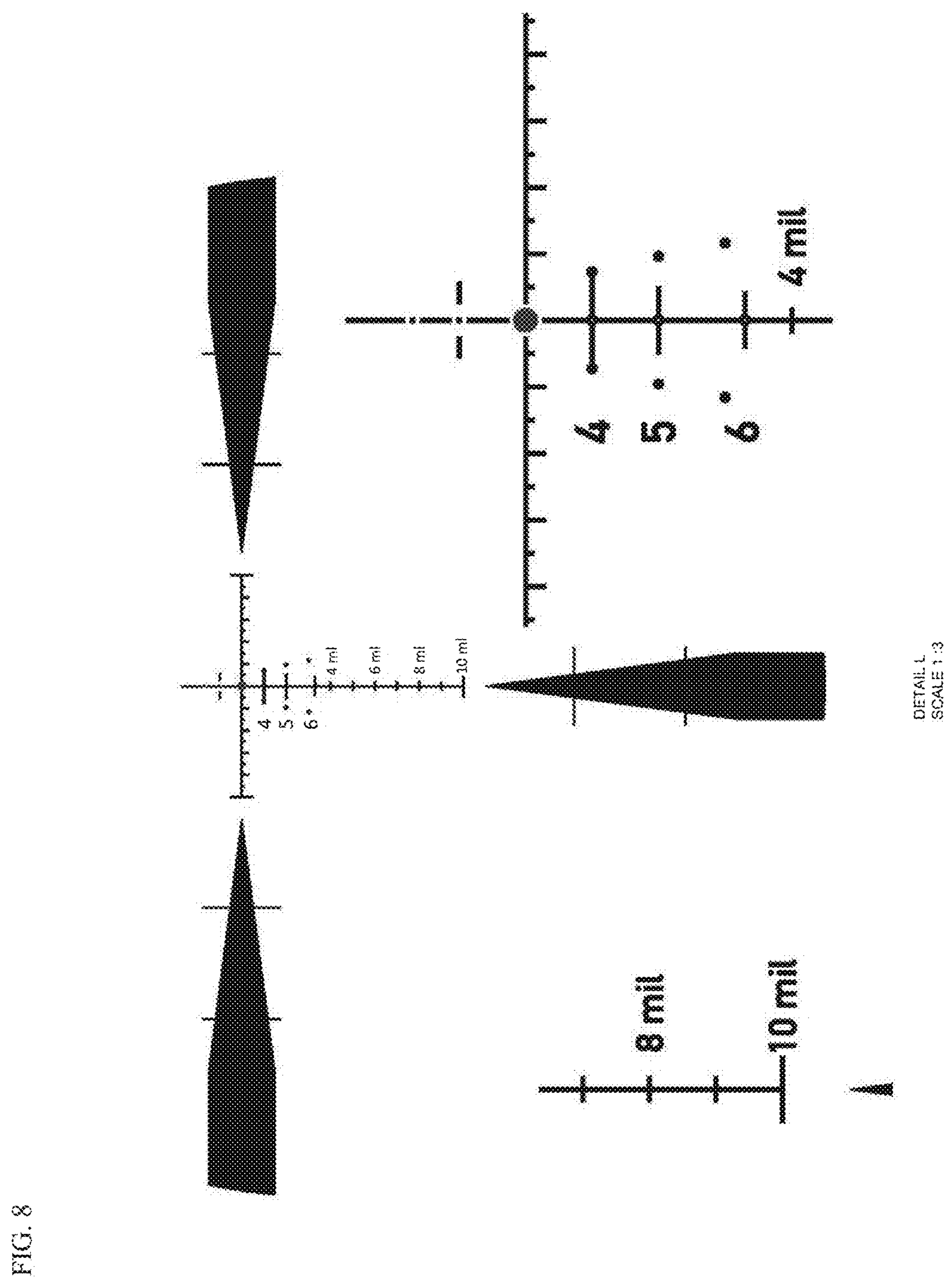
FIG. 8 is a user's view of a reticle of an embodiment of the present invention comprising a first horizontal cross-hair, a first vertical cross-hair, two or more evenly spaced second vertical cross-hairs of alternating length that contact said first horizontal cross-hair, two or more unevenly spaced second horizontal cross-hairs on said first vertical cross-hair at predetermined distances below the intersection of said first horizontal cross-hair and said first vertical cross-hair, wind dots at the end of said second horizontal cross-hairs, a plurality of evenly spaced secondary horizontal cross-hairs (numbered 4 mil to 10 mil) below the unevenly spaced horizontal crosshairs, at least one second horizontal cross-hair on said first vertical cross-hair above the intersection of said first horizontal cross-hair and said first vertical cross-hair, and range finder markings to the user's left and to the user's right of said second horizontal cross-hair. A dot is positioned in an open gap at the intersection of the first vertical and first horizontal cross-hairs.
Figure 9:
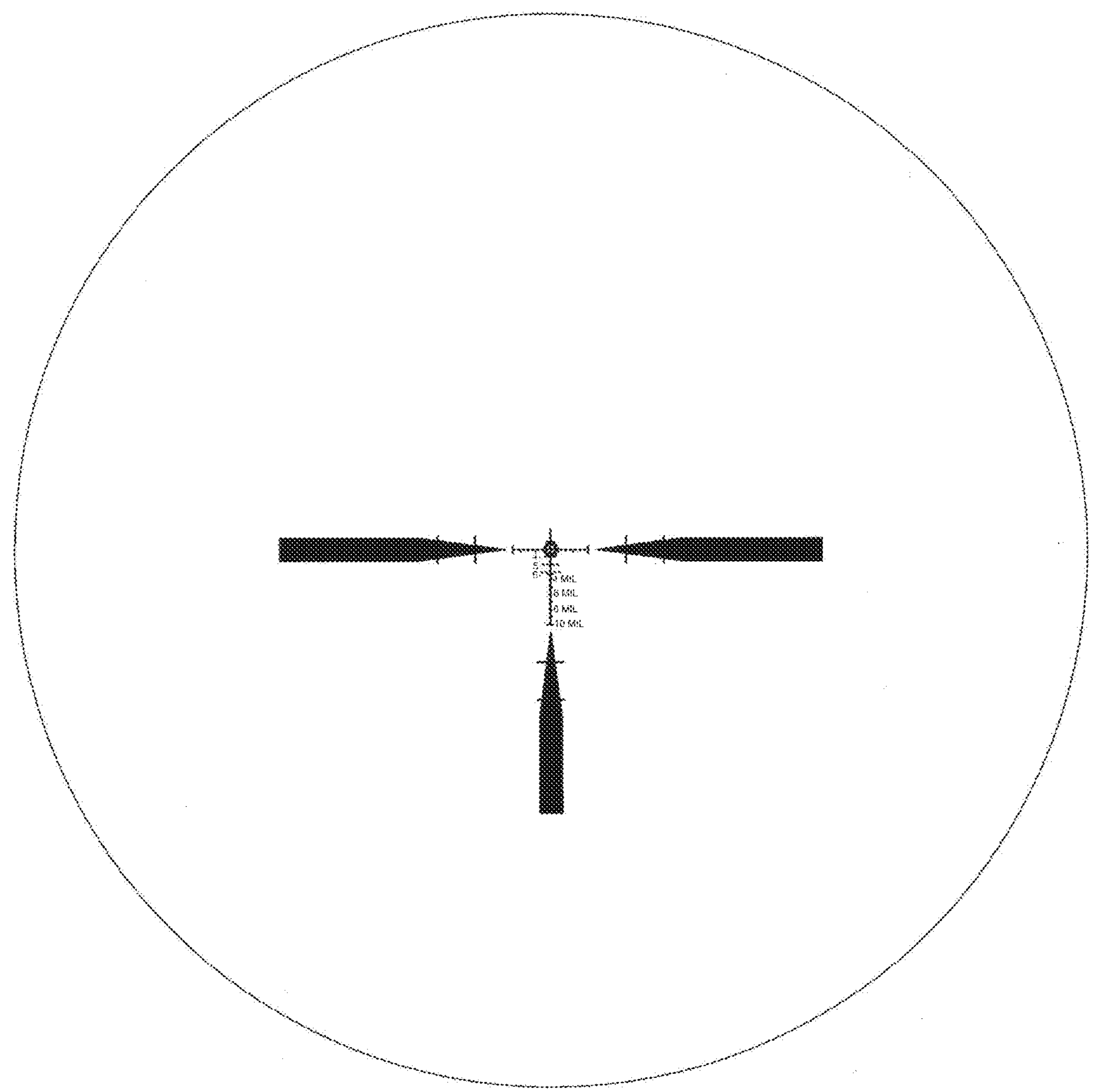
FIG. 9 is a user's view of a reticle of an embodiment of the present invention comprising a first horizontal cross-hair, a first vertical cross-hair, two or more evenly spaced second vertical cross-hairs that contact said first horizontal cross-hair, two or more second horizontal cross-hairs on said first vertical cross-hair below the intersection of said first horizontal cross-hair and said first vertical cross-hair, wherein two or more of said second horizontal cross-hairs are interrupted straight lines, and two or more said second horizontal cross-hairs are uninterrupted straight lines, at least one second horizontal cross-hair on said first vertical cross-hair above the intersection of said first horizontal cross-hair and said first vertical cross-hair, range finder markings the user's left and to the user's right of said first vertical cross-hair below said intersection, and an aiming ring at the center of said intersection of said first horizontal cross-hair and said first vertical cross-hair.
Figure 10:
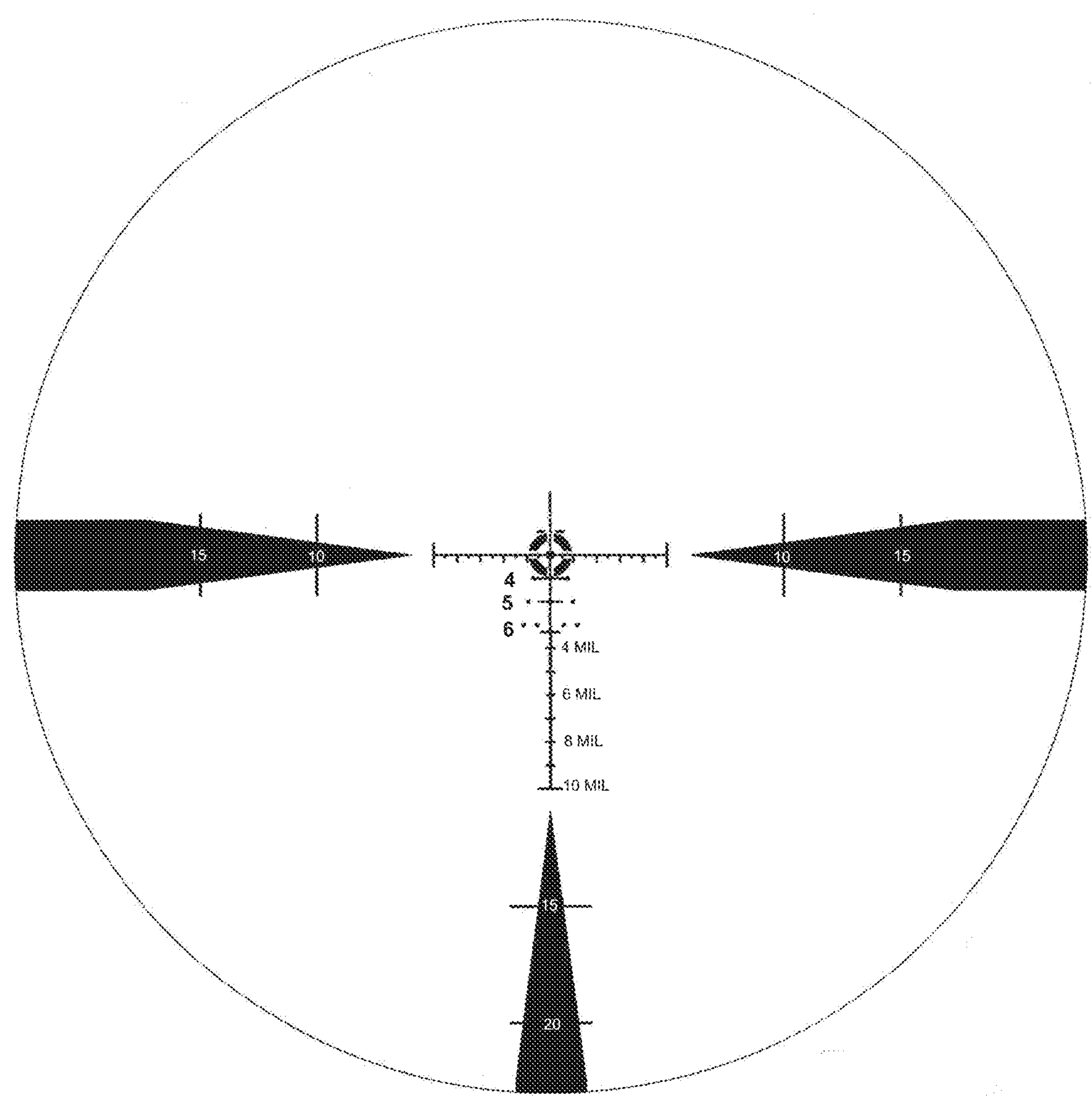
FIG. 10 is a user's view of a reticle of an embodiment of the present invention comprising a higher power magnification of the reticle of FIG. 9.
Figure 11:
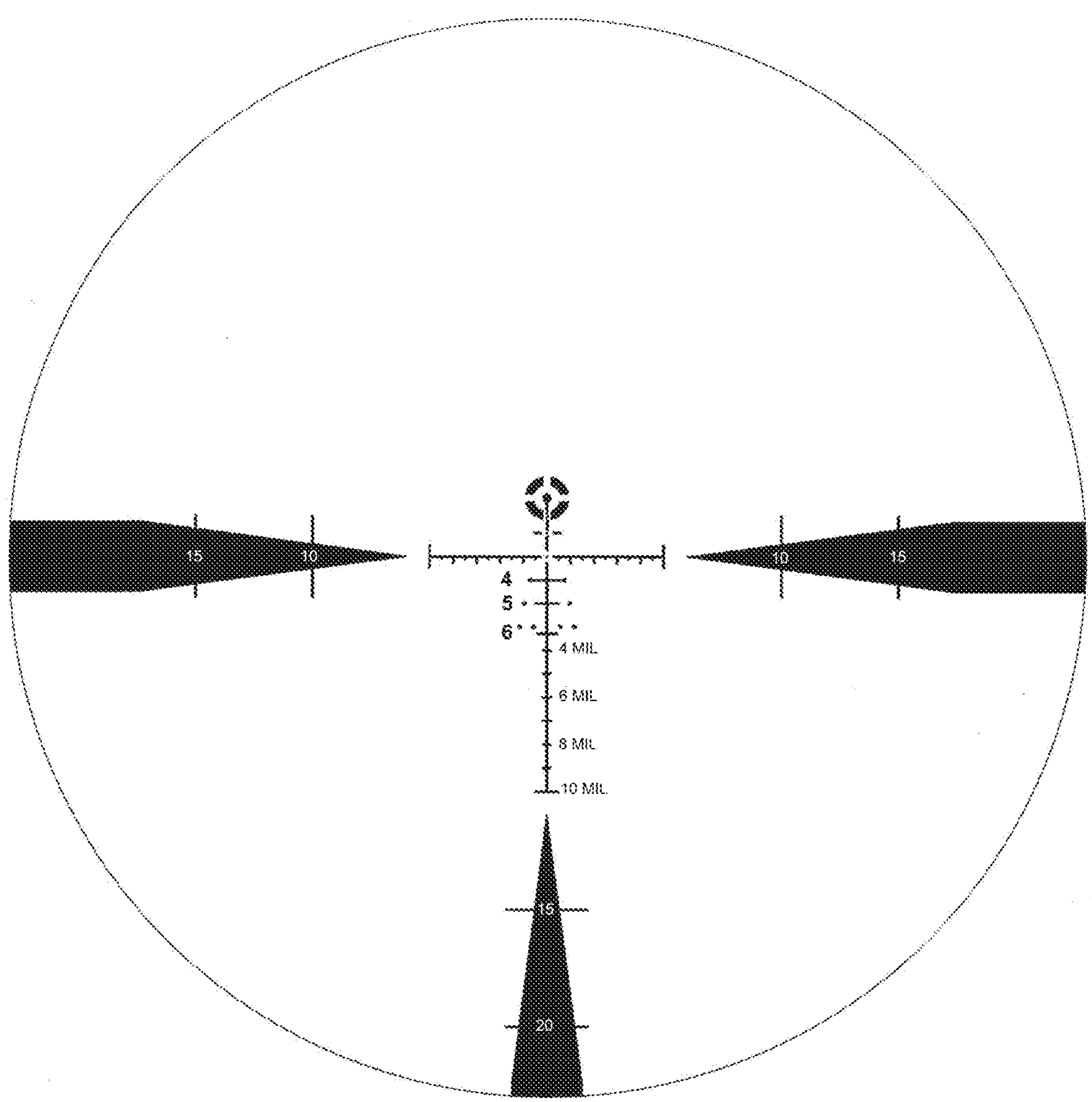
FIG. 11 is a user's view of a reticle of an embodiment of the present invention comprising a first horizontal cross-hair, a first vertical cross-hair, two or more evenly spaced second vertical cross-hairs that contact said first horizontal cross-hair, two or more unevenly spaced second horizontal cross-hairs on said first vertical cross-hair below the intersection of said first horizontal cross-hair and said first vertical cross-hair (lines labeled 4, 5, and 6); wind dots positioned below the first horizontal cross-hair, a plurality of evenly spaced secondary crosshairs (labeled 4 mil to 10 mil) intersecting the first vertical cross-hair below the unevenly spaced secondary horizontal cross-hairs, range finder markings to the user's left and to the user's right of said first vertical cross-hair below said intersection, and an aiming ring at the upper end of said first vertical cross-hair.
Figure 12:
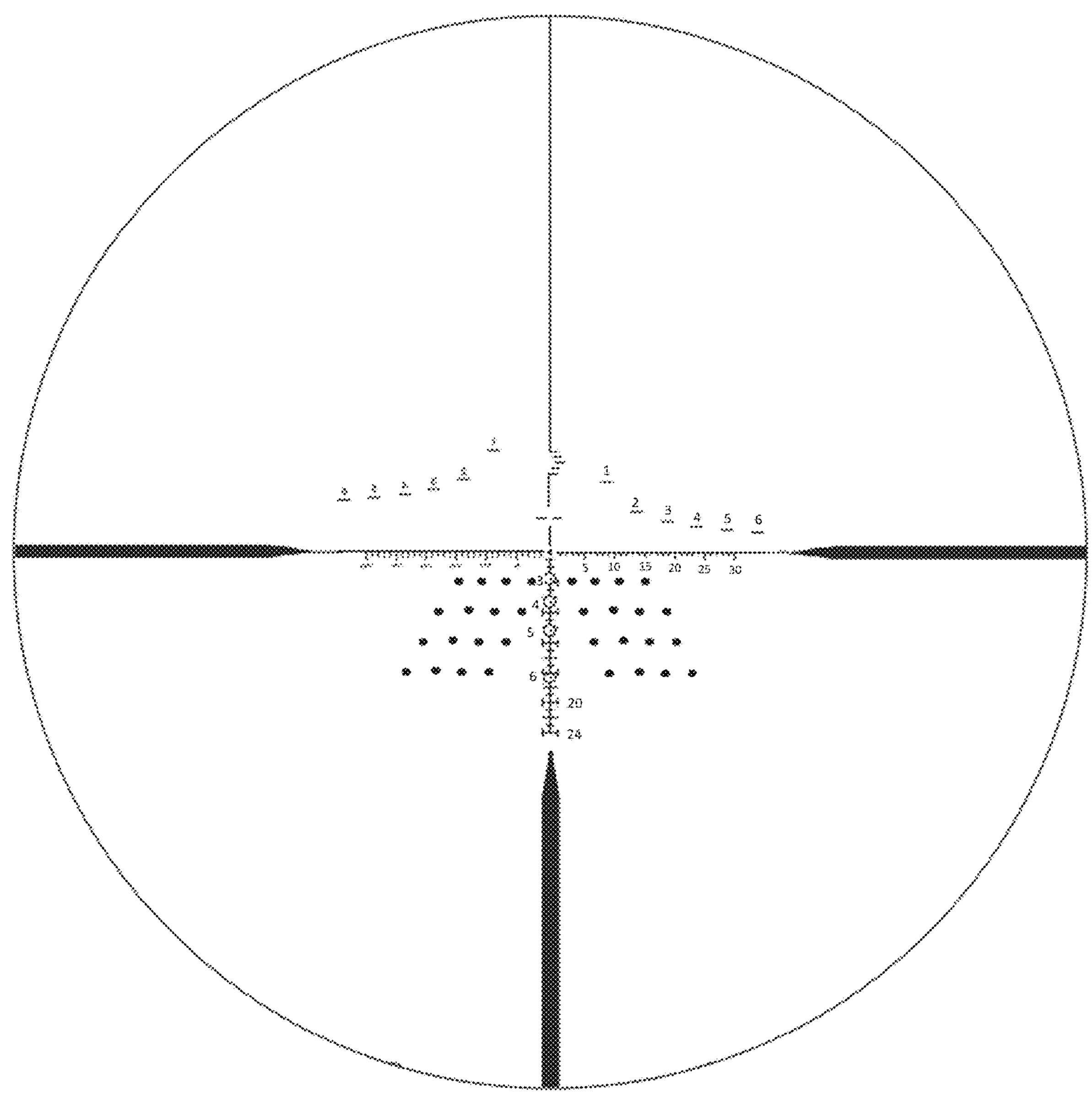
FIG. 12 is a user's view of a reticle of an embodiment of the present invention comprising a first horizontal cross-hair, a first vertical cross-hair, two or more evenly spaced second vertical cross-hairs that contact said first horizontal cross-hair, two or more second horizontal cross-hairs on said first vertical cross-hair below the intersection of said first horizontal cross-hair and said first vertical cross-hair, wherein two or more of said second horizontal cross-hairs are interrupted (dotted) straight lines, two or more of said second horizontal cross-hairs are uninterrupted straight lines, at least one second horizontal cross-hair on said first vertical cross-hair above the intersection of said first horizontal cross-hair and said first vertical cross-hair wherein a gap between two of said two or more second horizontal cross-hairs above the intersection of said first horizontal cross-hair and said first vertical cross-hair comprises three or more mil lines offset in a V-shape, and numbered horizontal line range finder markings above said first horizontal cross-hair.
Figure 13:
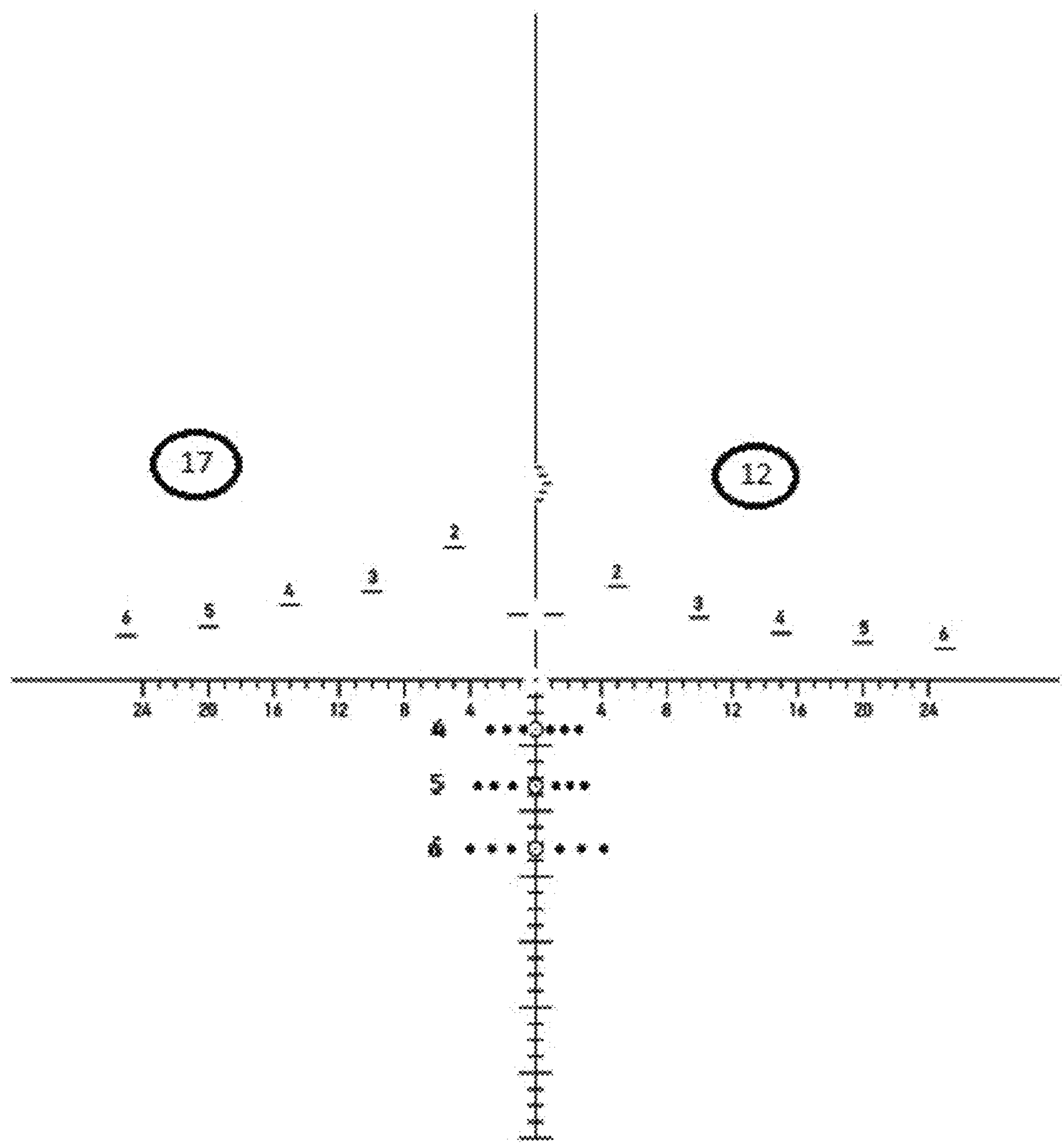
FIG. 13 is a user's view of a reticle of an embodiment of the present invention comprising a first horizontal cross-hair, a first vertical cross-hair, two or more evenly spaced second vertical cross-hairs that contact said first horizontal cross-hair, two or more second horizontal cross-hairs on said first vertical cross-hair below the intersection of said first horizontal cross-hair and said first vertical cross-hair, wherein two or more of said second horizontal cross-hairs are interrupted (dotted) straight lines, two or more of said second horizontal cross-hairs are uninterrupted straight lines, at least one second horizontal cross-hair on said first vertical cross-hair above the intersection of said first horizontal cross-hair and said first vertical cross-hair wherein a gap on said first vertical cross-hair above said intersection comprises three or more mil lines offset in a V-shape, and numbered horizontal line range finder markings above said first horizontal cross-hair. The ovals containing the numbers 12 and 17 designate the scale of the range bars (labeled 2, 3, 4, 5, and 6 on either side of the first vertical crosshair, above the first horizontal crosshair). If a 12-inch target fits under the range bar with a 4 above it (using the range bars to the right of the first vertical cross-hair), the target is 400 yards away and the user can move to the 4-drop line and to accurately shoot the target. Likewise, if a 17-inch target fits under the range bar with the 5 above it (using the range bars to the left of the first vertical cross-hair), the target is 500 yards away and the use shoots with the 5-drop line. Using this type of rapid range bar, the time of flight wind dots, and ballistics software to change the zero, the user has a BDC reticle that works as a range finder, ballistic calculator, and weather meter all built into the reticle.
Figure 14:
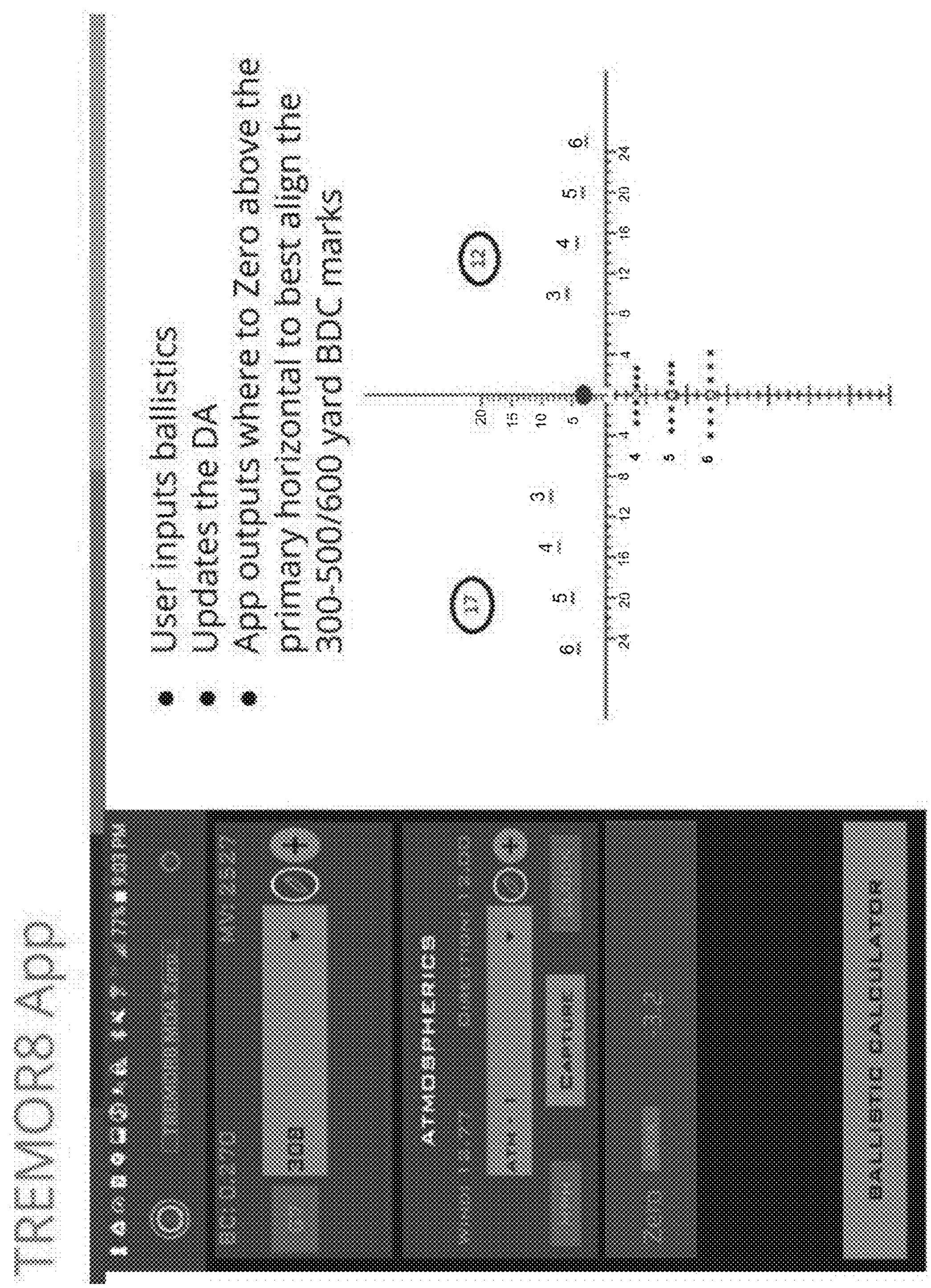
FIG. 14 shows a user's view of a reticle of an embodiment of the present invention, similar to that in FIG. 13, but including range markings on the first vertical cross-hair above the first horizontal cross-hair. A black circle on the first vertical cross hair above the intersection of the first vertical cross-hair with the first horizontal cross-hair on the reticle provided as by a ballistics calculator provides an aiming point to zero the elevation of a target acquisition device.
Figure 15:
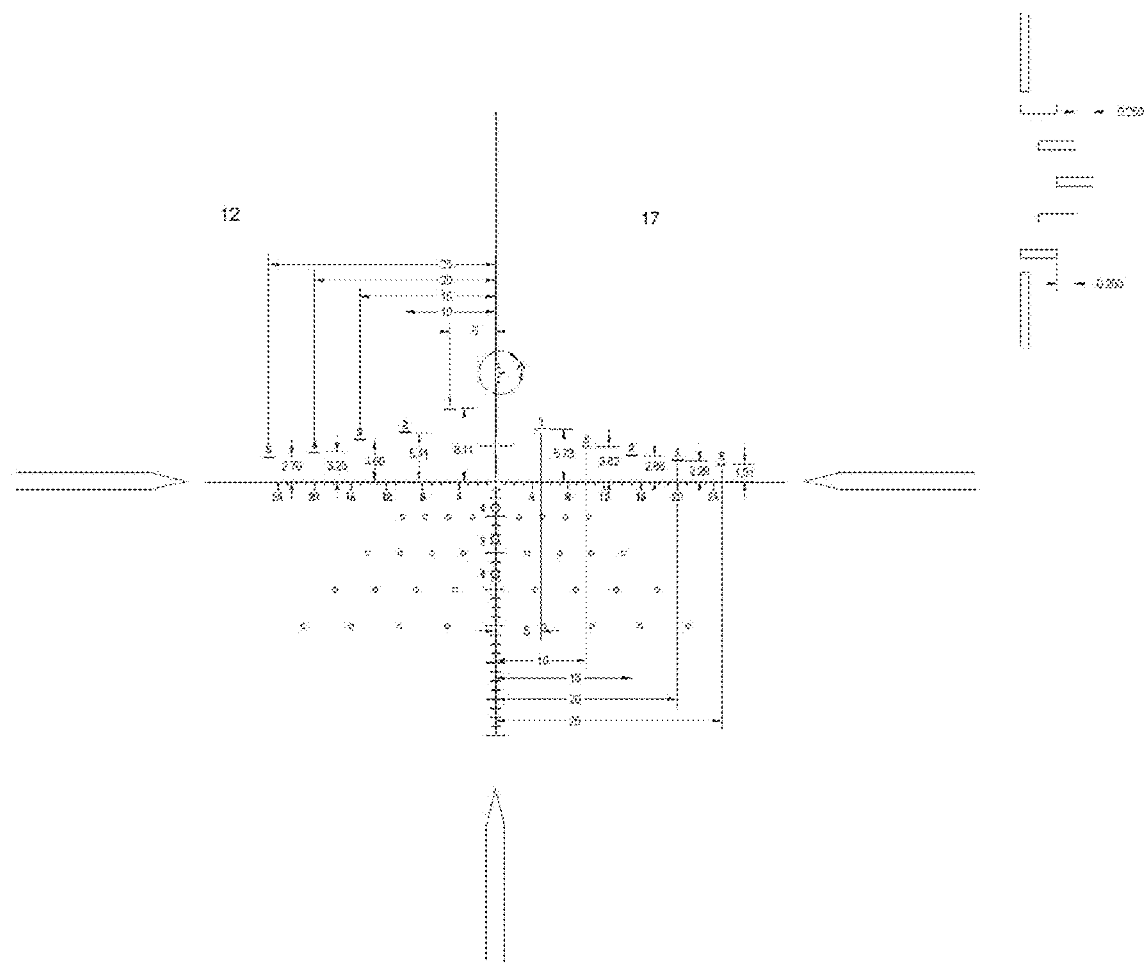
FIG. 15 is a user's view of a reticle of an embodiment of the present invention comprising a first horizontal cross-hair, a first vertical cross-hair, two or more evenly spaced second vertical cross-hairs that contact said first horizontal cross-hair, two or more second horizontal cross-hairs on said first vertical cross-hair below the intersection of said first horizontal cross-hair and said first vertical cross-hair, wherein two or more of said second horizontal cross-hairs are interrupted (dotted) straight lines, at least one second horizontal cross-hair on said first vertical cross-hair above the intersection of said first horizontal cross-hair and said first vertical cross-hair, wherein a gap on said first vertical cross-hair comprises three or more mil lines offset in a V-shape, and numbered horizontal line range finder markings above said first horizontal cross-hair. Representative dimensions are shown.
Figure 16:
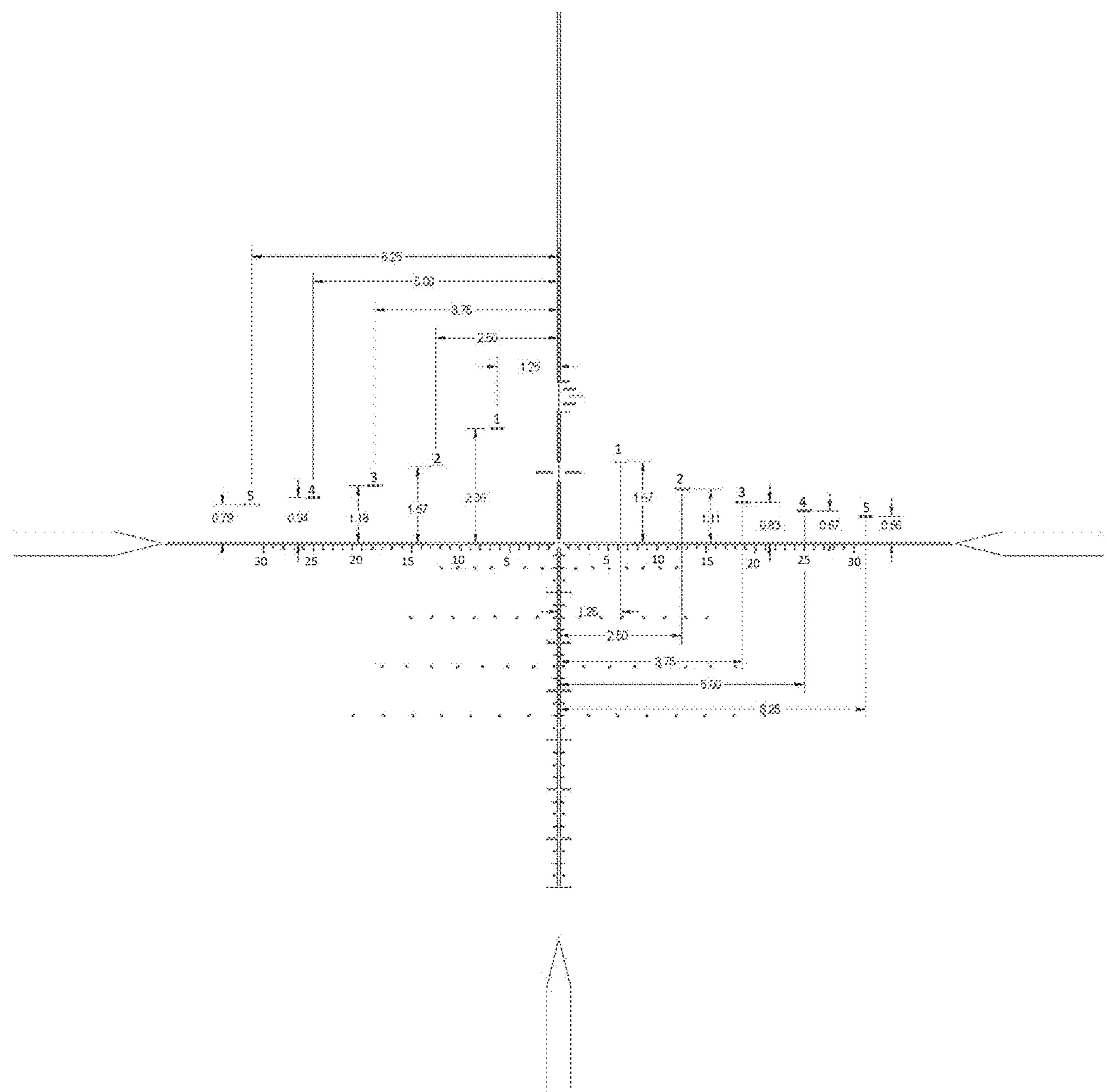
FIG. 16 is a user's view of a reticle of an embodiment of the present invention comprising a first horizontal cross-hair, a first vertical cross-hair, two or more evenly spaced second vertical cross-hairs that contact said first horizontal cross-hair, two or more second horizontal cross-hairs on said first vertical cross-hair below the intersection of said first horizontal cross-hair and said first vertical cross-hair, wherein two or more of said second horizontal cross-hairs are interrupted (dotted) straight lines, at least one second horizontal cross-hair on said first vertical cross-hair above the intersection of said first horizontal cross-hair and said first vertical cross-hair, wherein a gap on said first vertical cross-hair comprises two or more mil lines offset in a V-shape, and numbered horizontal line range finder markings above said first horizontal cross-hair. Representative dimensions are shown.
Figure 17:
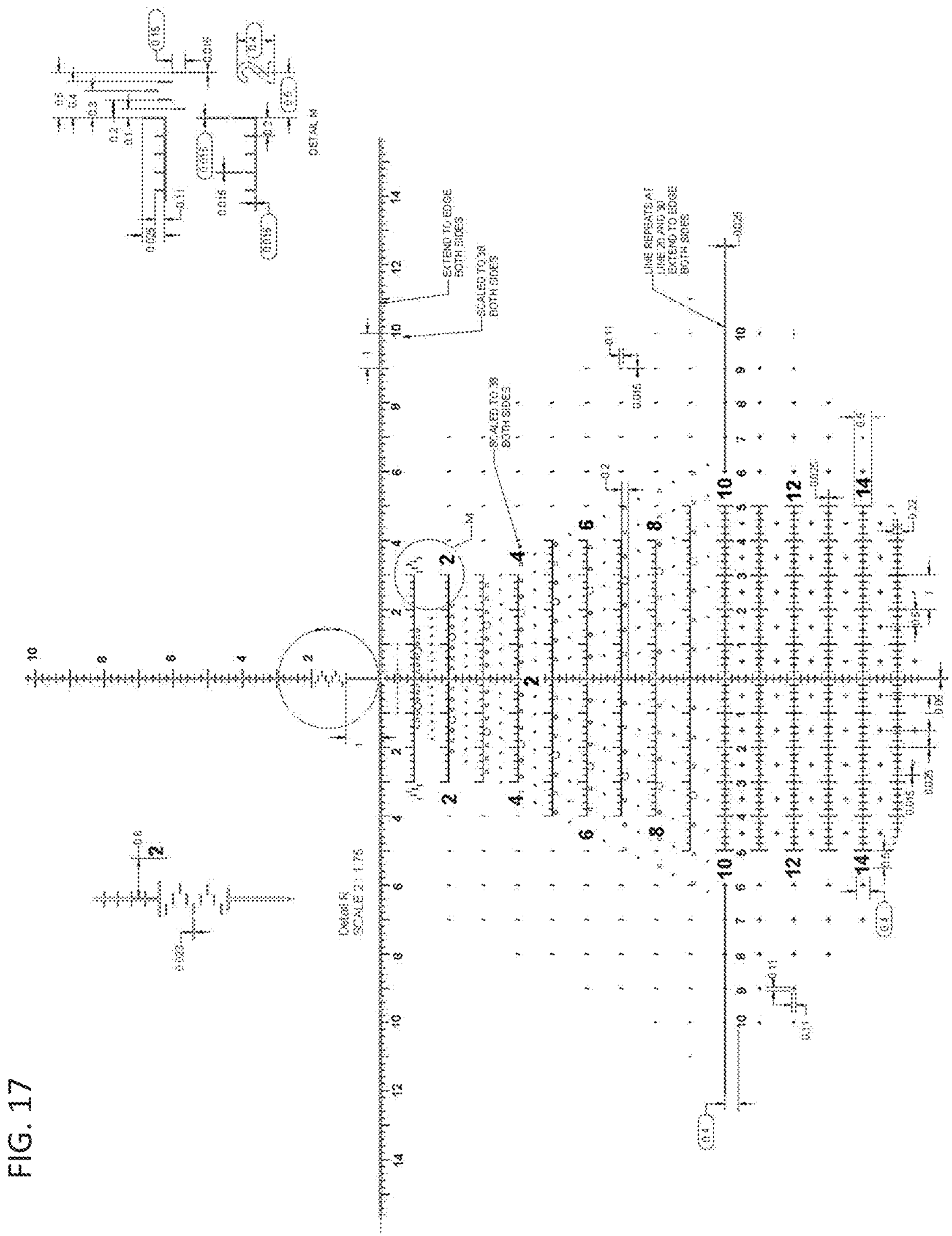
FIG. 17 is a user's view of a reticle of an embodiment of the present invention comprising a first horizontal cross-hair, a first vertical cross-hair, two or more evenly spaced second vertical cross-hairs that contact said first horizontal cross-hair, two or more second horizontal cross-hairs at predetermined distances on said first vertical cross-hair below the intersection of said first horizontal cross-hair and said first vertical cross-hair, wherein two or more of said second horizontal cross-hairs are interrupted (dotted) straight lines, wherein two or more said second horizontal cross-hairs are uninterrupted straight lines, wherein said interrupted straight line second horizontal cross-hairs alternate with said uninterrupted straight line second horizontal cross-hairs, wherein at least four second horizontal cross-hairs graduate in length below said intersection, and at least four second horizontal cross-hairs are of identical length below said intersection, at least one second horizontal cross-hair on said first vertical cross-hair above the intersection of said first horizontal cross-hair and said first vertical cross-hair wherein a gap on said first vertical cross-hair comprises three or more mil lines in at least one V-shape, and offset V-shaped mil lines to the user's left and to the user's right of the second horizontal cross-hair below said intersection.
Figure 18:
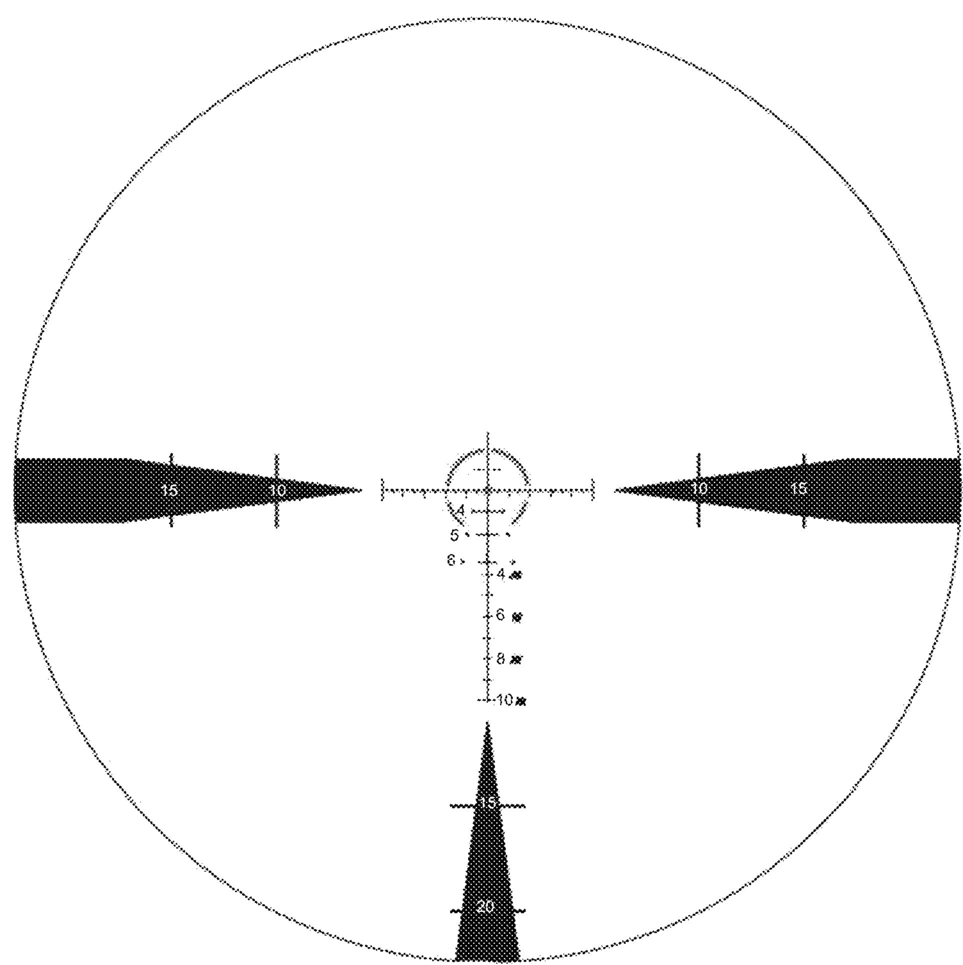
FIG. 18 is a user's view of a reticle of an embodiment of the present invention.
Figure 19:
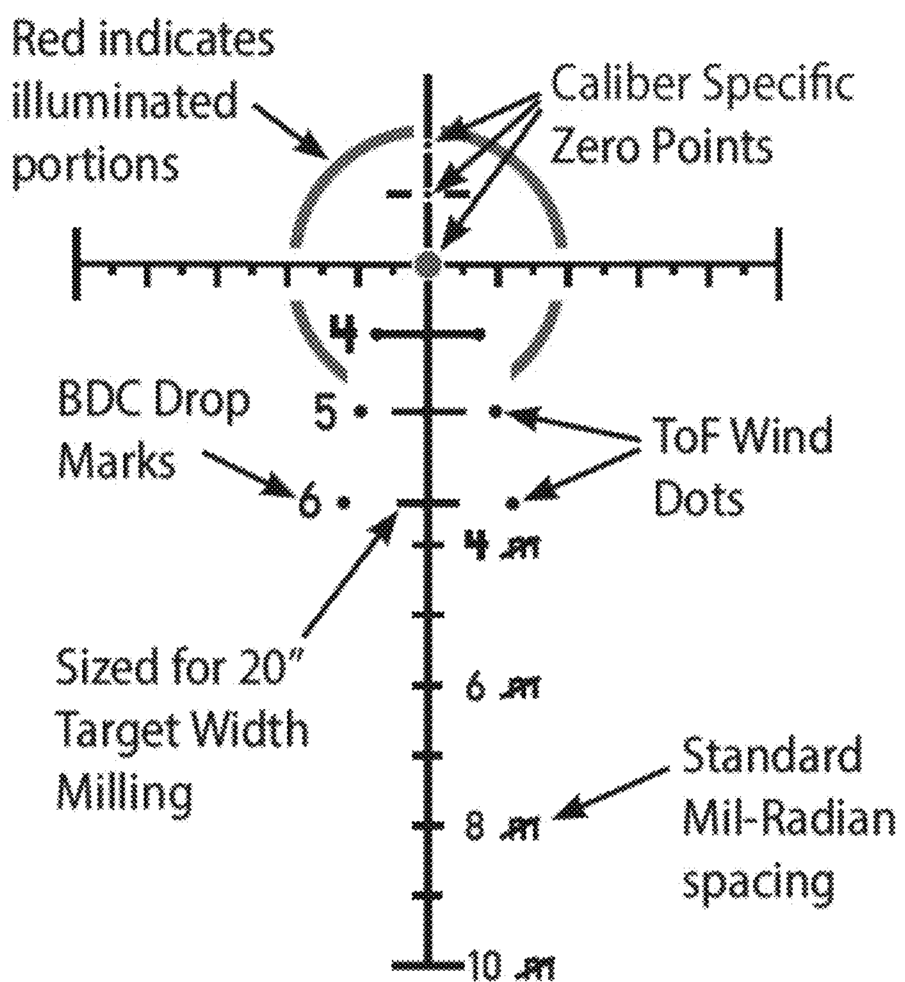
FIG. 19 is a user's view of a reticle of an embodiment of the present invention that incorporates time-of-flight wind dots, a 20 inch wide target ranging brackets, and a multi-zero ballistic drop compensating system. The central dot and aiming ring are shown in red to represented illuminated elements.
Figure 20:
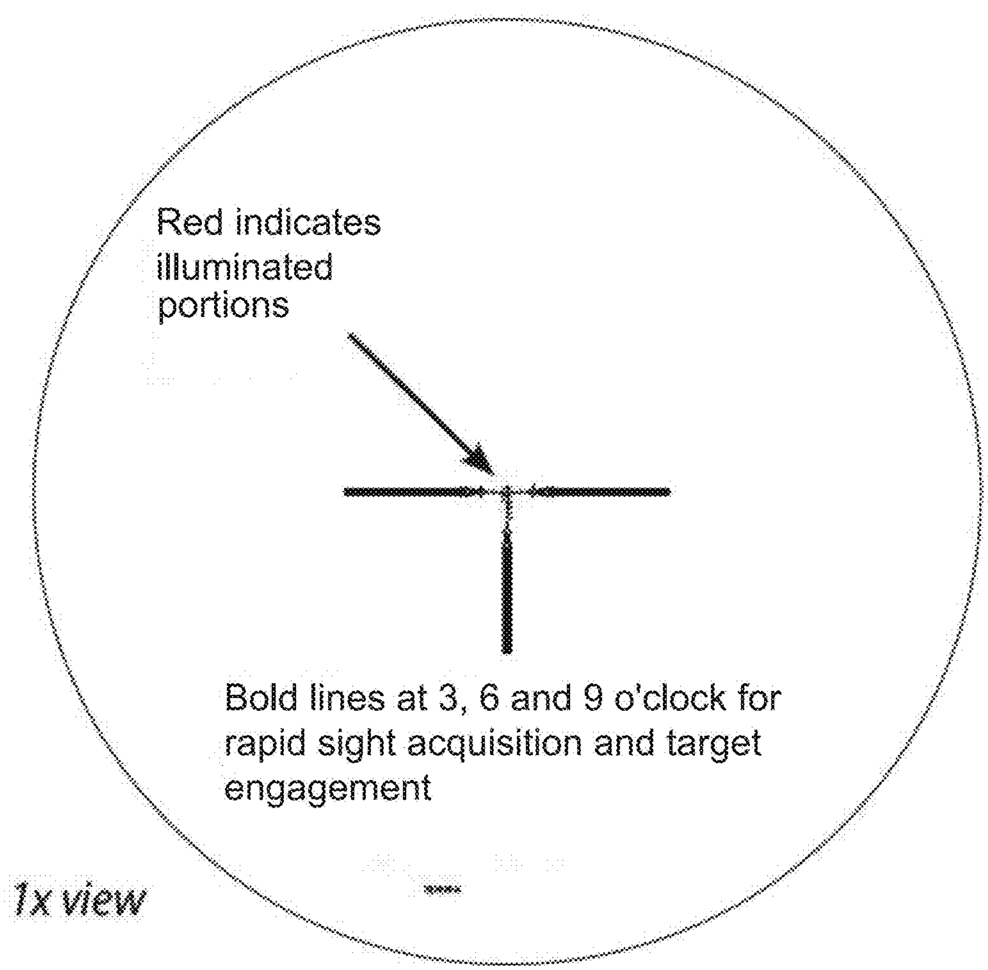
FIG. 20 is a user's view of a reticle of an embodiment of the present invention that provides for both-eyes-open operation comprising a target focus, and aligning an illuminated center dot on a target. A black reticle pattern centers a target within the bars of the reticle thereby enabling rapid shooting.
Figure 21:
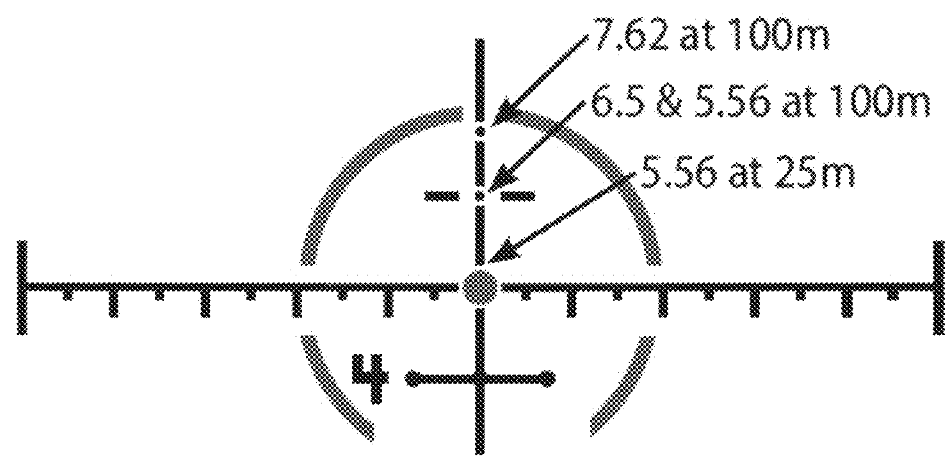
FIG. 21 is a user's view of a reticle of an embodiment of the present invention with 3 zero points, two above a first horizontal cross-hair that enable zeroing of multiple projectile calibers with accurate ballistic drop compensating markings for the respective caliber. For a specific caliber, the specific aiming point of the reticle is used to match the point of aim (POA) to the point of impact (POI) at a specific distance. In the alternative, the POA and POI are matched with the center aiming dot, and telescopic target acquisition device turrets are dialed to a specific height above the reticle center.
Figure 22:
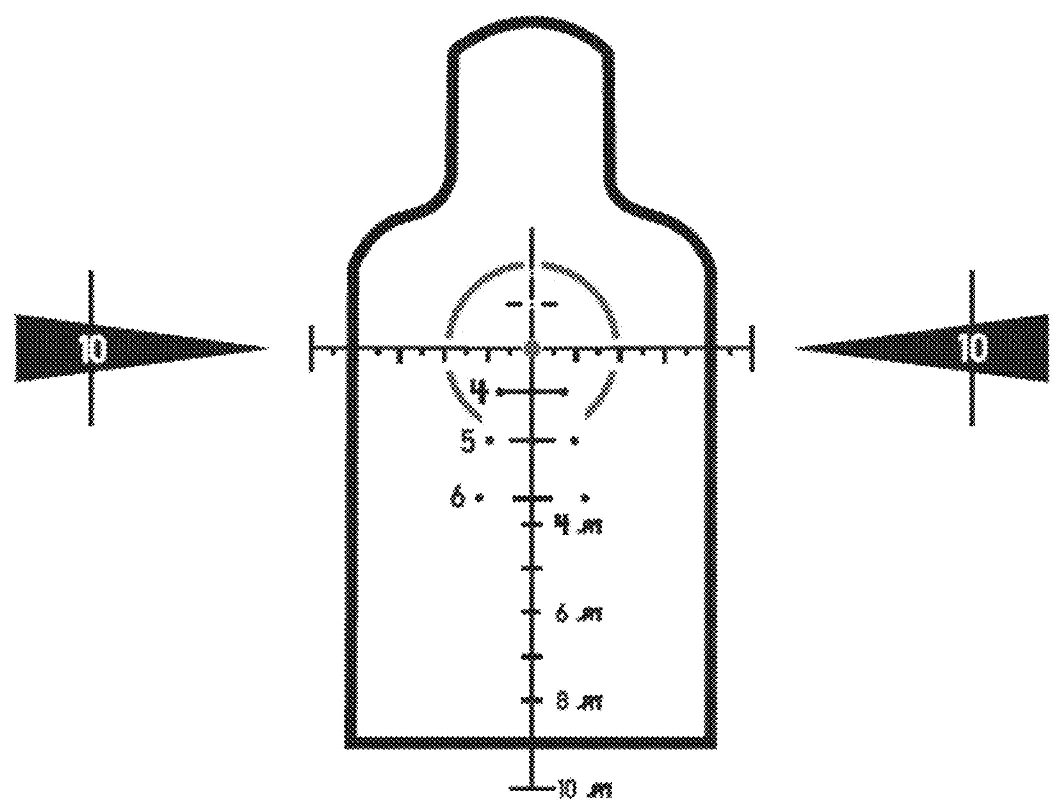
FIG. 22 is a user's view of a reticle of an embodiment of the present invention wherein the reticle provides maximum point-blank range capability for targets nearer than 400 meters.
Figure 23:
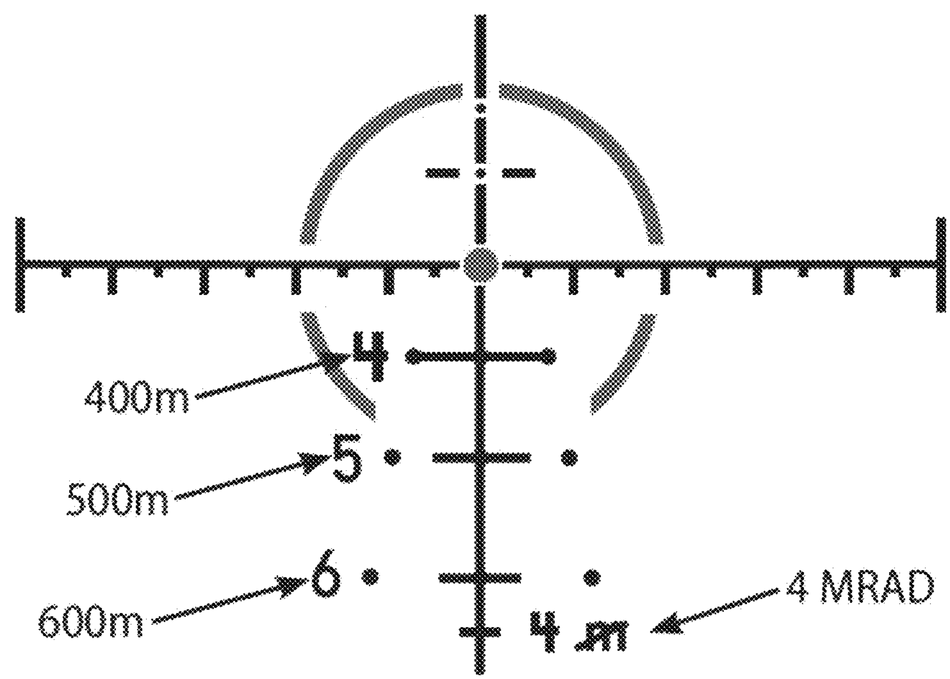
FIG. 23 is a user's view of a reticle of an embodiment of the present invention wherein second horizontal cross-hairs below a first horizontal cross-hair are labeled "4", "5" and "6" to the user's left of a first vertical cross-hair below an intersection of a first horizontal cross-hair and a vertical cross-hair that correspond to 400 meters, 500 meters and 600 meters, respectively, that provide projectile drop for 3 zeroed calibers at these ranges. The reticle provides maximum point-blank capability for targets closer than 400 meters. The "4", "8" and "8" and "10" markings on to the opposite side i.e., to the user's right of a first vertical cross hair below an intersection of a first horizontal cross-hair and first vertical cross-hair (see, for example, FIG. 19) correspond to mils below a first horizontal cross-hair, not ranges.
Figure 24:
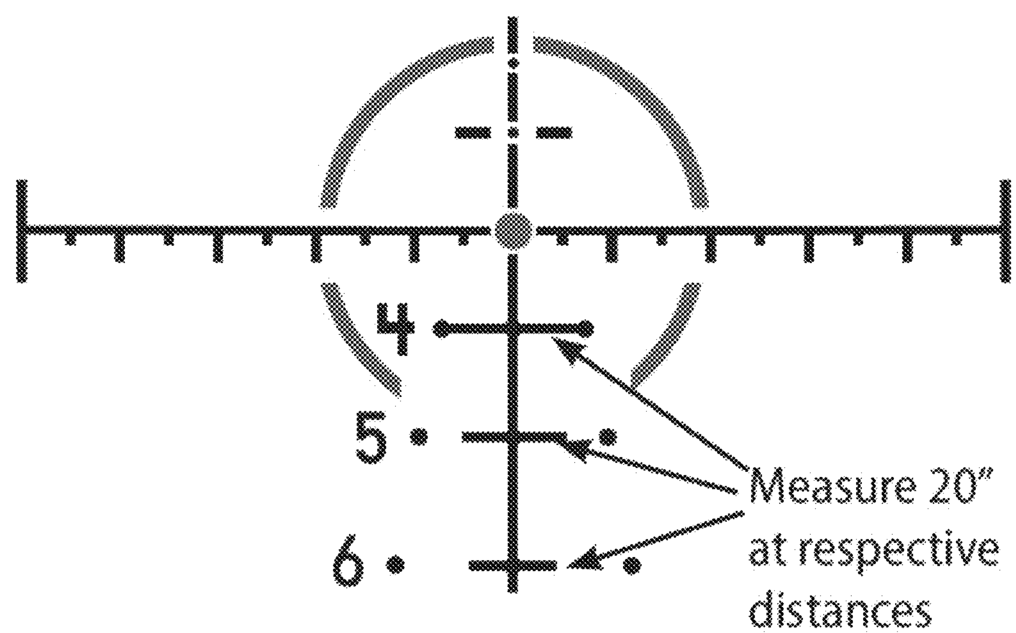
FIG. 24 is a user's view of a reticle of an embodiment of the present invention wherein second horizontal cross-hairs below an intersection of a first horizontal cross-hair and a first vertical cross-hair at the 400, 500 and 600 meter ballistics drop compensating drop points enable estimation of range to a 20 inch target at each respective distance, by matching a distance between two second cross-hairs to the 20 inch wide target to determine the indicated range.
Figure 26:
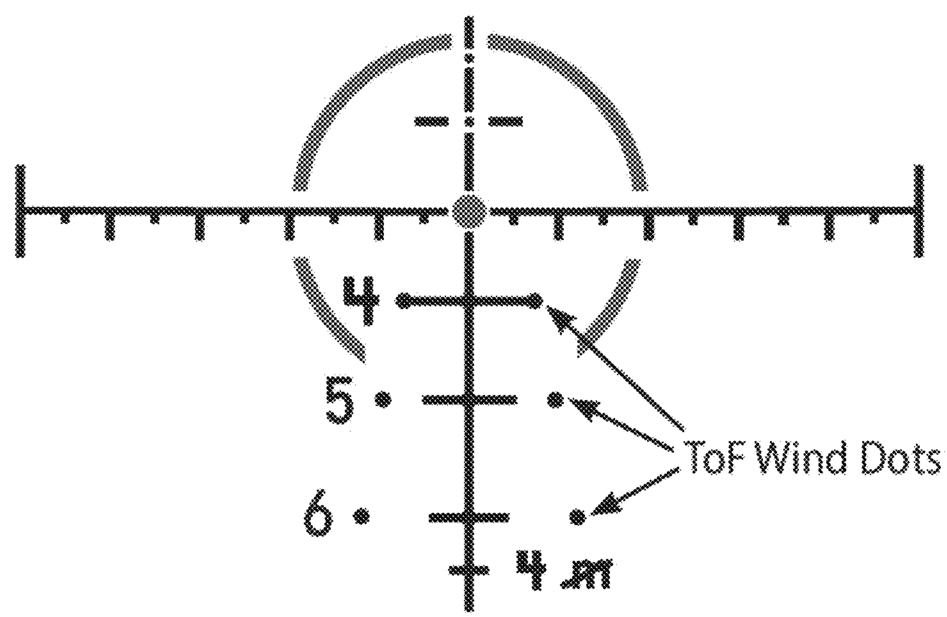
FIG. 26 is a user's view of a reticle of an embodiment of the present invention with wind dot values calibrated for accurate wind compensation per projectile caliber.
Figure 27:
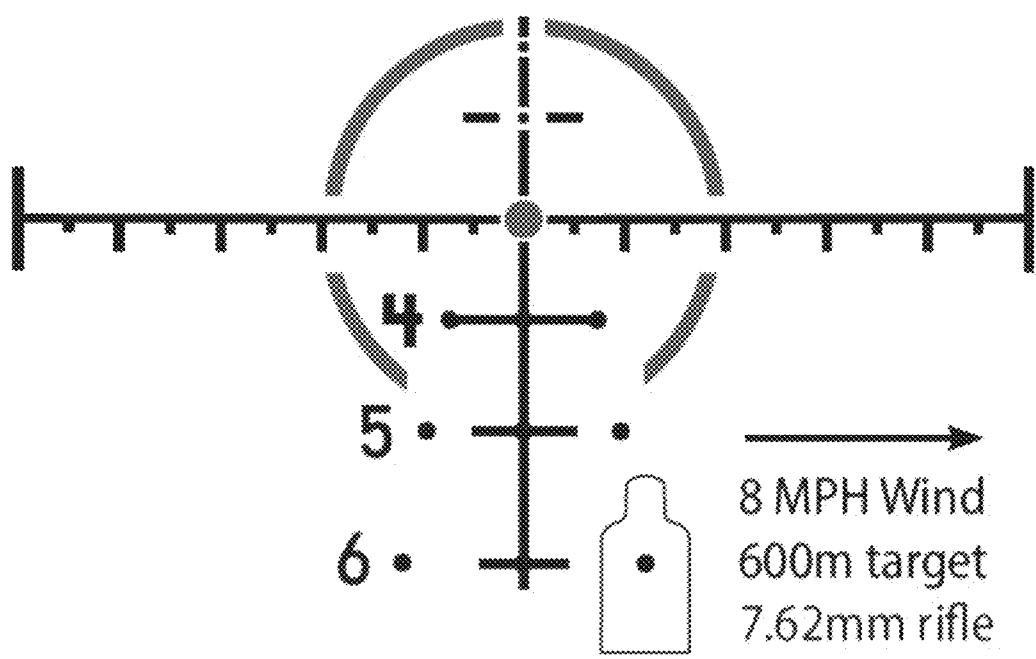
FIG. 27 is a user's view of a reticle of an embodiment of the present invention showing use of time-of-flight wind dots to strike a target with a 7.62 mm projectile at 600 meters with an 8 mph left to right wind.

FIGS. 1 and 2 show two different reticles, each for two different pairs of projectiles. Each projectile in each pair differs from the other projectile in caliber. Using the reticle of FIG. 1 the user adjusts the elevation and windage of a telescopic gunsight such that a 6.5 Creed projectile strikes a target at 100 yards using the reticle's designated zero mark for a 6.5 Creed projectile. After zeroing the reticle for the 6.5 Creed projectile, the reticle of FIG. 1 provides the aiming points to strike a target at 300 yards, 400 yards 500 yards and 600 yards at and below the intersection of the first horizontal and first vertical cross-hairs. By adjusting the elevation and windage of the telescopic gunsight such that a .308 caliber projectile strikes a target at 100 yards using the reticle's designated zero mark for a .308 caliber projectile, the user is able to use the same aiming points to strike a target at 300 yards, 400 yards, 500 yards and 600 yards with a .308 caliber projectile as those used for the 6.5 Creed projectile.

FIG. 2 shows a reticle configured for a second pair of projectiles i.e., a 7 mm-08 caliber projectile and a .17 Remington projectile, in which the zero aiming points for telescopic gunsight adjustment at 100 yards differ between the 2 calibers, but with shared aiming points to strike a target 300 yards, 400 yards, 500 yards and 600 yards for both calibers.

The exemplary reticles shown in FIGS. 2 and 3 are shown with optional features including: a plurality of evenly spaced second horizontal crosshairs on the first vertical crosshair.

Wind dots are provided to the left and right of three of these second horizontal crosshairs. A plurality of second vertical crosshairs are provided alone the first horizontal crosshair. Using the reticles and telescopic gunsights of the present invention, a user is able to purchase and use a single telescopic gunsight with markings that are shared between 2 projectiles with different properties, for example, projectiles that differ between one or more of caliber, ballistic coefficient, muzzle velocity, weight, manufacturer and construction. In some embodiments, a telescopic gunsight comprising a dual caliber ballistic compensating reticle of the present invention is removed and remounted between different firearms. In other embodiments, a telescopic gunsight of the present invention is used with a shared stock and firearm action, and a firearm barrel is exchanged. In certain embodiments, a reticle of the present invention is configured for use when ranges to a target are measured in yards. In other embodiments, a reticle of the present invention is configured for use when ranges to a target are measured in meters. In some embodiments, a reticle of the present invention provides a combination of embodiments of the present invention. For example a dual caliber ballistic compensating reticle is combined with a reticle that provides one or more of the features described in one or more of U.S. Pat. Nos. 9,869,530, 9,612,086, 9,574,850, 9,500,444, 9,459,07, 9,335,123, 9,255,771, 9,250,038, 9,068,794, 8,991,702, 8,966,806, 8,959,824, 8,905,307, 8,893,971, 8,707,608, 8,656,630, 8,353,454, 8,230,635, 8,109,029, 7,946,048, 7,937,878, 7,856,750, 7,832,137, 7,712,225, 6,681,512, 6,516,699, 6,453,595, 6,032,374, and 5,920,995, each of which is herein incorporated by reference in its entirety.

FIGS. 4-27 show additional features and options that may be employed on dual caliber reticles or on single caliber reticles, as shown in the figures and the associated figure descriptions above.

Figure 28:
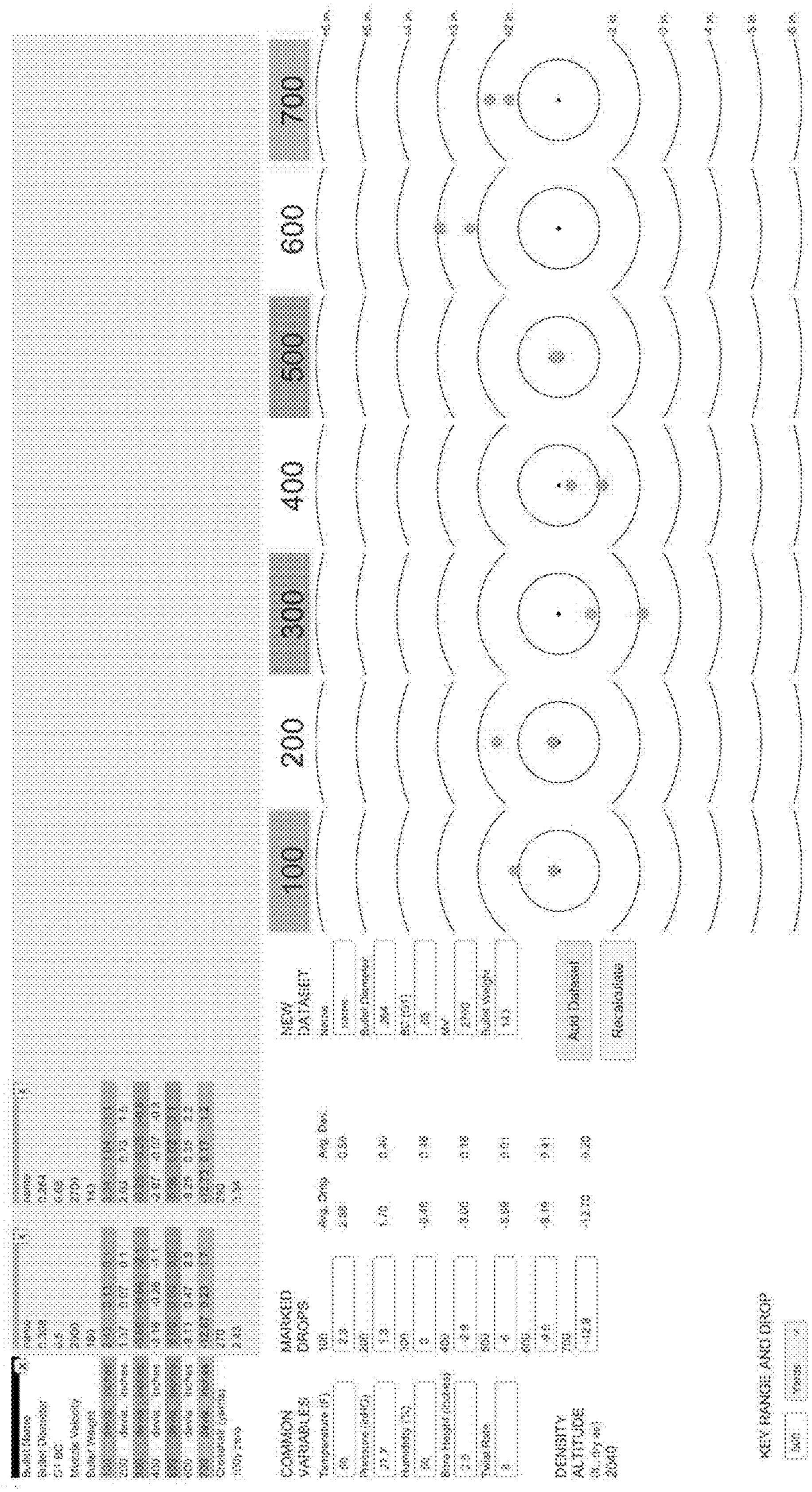
FIG. 28 shows a user interface for a software application that identifies locations of "hits" using a shared aiming point used for multiple calibers (here using a .308 and .264 dual caliber reticle of the present invention).

FIG. 28 shows a user interface for a computer software program used to design, analyze, and/or train for use of dual caliber reticles. Inputs are provided to allow the specific calibers desired. A user may also select a particular distance at which both calibers most accurately hit the center of the target: the "key range." The program uses data in a look-up table of caliber shooting results and displays for the user the distance in which hits deviate from target center at distances other than the key range.

The example shown in FIG. 28 shows projectile performance using a .308 and .264 dual caliber reticle. When a .308 projectile is zeroed at 100 yards using the specified .308 zero aiming point on the first vertical cross-hair above the intersection of the first horizontal cross-hair and first vertical cross-hair of the .308/.264 dual caliber reticle, the .308 projectile will strike the bull's eye at 500 yards using the 500 yard ballistics drop compensation aiming point (i.e., the "key range" for the .308/.264 dual caliber reticle). As shown, the .308 projectile will strike within 1 inch to 3 inches above or below the bull's eye using the reticle's ballistics drop compensation aiming points at 100 yards, 200 yards, 300 yards, 400 yards, 600 yards and 700 yards. Similarly, when a .264 projectile is zeroed at 100 yards using the specified .264 zero aiming point on the first vertical cross-hair above the intersection of the first horizontal cross-hair and first vertical cross-hair of the .308/.264 dual caliber reticle (i.e., a different specified zero aiming point from the .308 specified zero aiming point on the same reticle), the .264 projectile will strike the bull's eye at 500 yards using the 500 yard ballistics drop compensation aiming point (i.e., the "key range" for the .308/.264 dual caliber reticle). As shown, .264 projectile will strike within 1 inch to 3 inches above or below the bull's eye using the reticle's ballistics drop compensation aiming points at 100 yards, 200 yards, 300 yards, 400 yards, 600 yards and 700 yards. Whereas both the .308 projectile and the .264 projectile will strike within 1 inch to 3 inches of the bull's eye using the ballistics drop compensation aiming point at 100 yards, 200 yards, 300 yards, 400 yards, 600 yards and 700 yards, the two calibers zeroed at 100 yards using different specified zero aiming points of the .308/.264 reticle do not strike at identical points within the 1 inch to 3 inches distance from the bull's eye for both calibers. In this fashion, the .308/.264 dual caliber reticle, and other dual caliber reticles of the present invention, provide the user with a single telescopic gunsight with a single reticle of use with projectiles with 2 different calibers with sufficient precision to strike within 1 inch to 3 inches or less of an aiming point on a target to 700 yards and beyond.

In some embodiments of the present invention, a ballistics calculator enables the user to match projectile shape to standard or custom drag models. In some embodiments, the user selects an exterior ballistic calculation method from a menu, including, for example, the Siacci analytical method of solution, numerical integration solutions using the drag models developed by Maievski, Ingalls, the Gavr s Commission and the British 1909 Commission, point-mass numerical integration using standard reference projectiles, point-mass numerical integration using Robert L. McCoy's McDrag algorithm, modified point-mass models, and 6-Degrees-Of-Freedom (6DOF) models. In other embodiments, the ballistics calculator of the present invention calculates the adjusted coefficient of drag for a projectile that may or may not be different from the standard sea-level ballistics coefficient. The ballistics calculator of the present invention is able, as an option, to convert the coefficient of drag to custom drag models and ballistics coefficients for any drag model using velocity or bullet dimension. In further embodiments, the ballistics calculator of the present invention calculates vertical and horizontal cant error at zero range for the entire projectile path. In some embodiments, for high elevation firing, the user selects, for example, one coefficient of drag for a range of less than or equal to, for example, 1000 yards, a second coefficient of drag for 1000 to 1500 yards, a third for greater than 1500 yards, and an optional fourth coefficient of drag for use at very high altitudes. In a preferred embodiment, the target is hit by holding the aiming point on the target. Conventional ballistic calculators and ballistic calculator devices require the user to hand input parameters gathered from other instruments manually. In some embodiments, devices, software, processors, controllers and computer readable media of the present invention connect to other instruments via, for example, direct wire, BlueTooth, optical, radio, infrared or other communication channels and hardware, thereby automatically accessing information needed to derive ballistics solutions. For example, devices of the present invention may take, atmospheric and wind data from weather meters and anemometers or web or radio, distance information from Laser Range Finders (LRF), etc., cant and angle of fire information from inclinometers, direction of fire or compass heading information from compasses, or astral-orientation, current position information from GPS or other location means, or projectile properties and speeds from measuring and tracking instruments (for example, Doppler data, chronographic data, etc.). As well, conventional ballistic calculators and ballistic calculator devices presume a static shooting position.

In some embodiments, devices, software, processors, controllers and computer readable media of the present invention provide tracking of shooters and targets via geo-location data (for example, GPS, lat-long data, etc). In this fashion, the user may "tag" and track multiple targets 360.degree. around the shooting position producing, for example, a shooting solution to each target. the user moves or changes position, relative locations to the target, and shooting solutions to each target, are recalculated to reflect current position of shooter. Third parties, for example, spotters and second shooters, may input locations other than a given target's current solution and have all targets/solutions adjust relative to the input position. Thus, a user can calculate solutions for another shooter in a different location using the devices of the present invention. Conventional ballistic calculators and ballistic calculator devices derive aiming solutions for stationary shooters and targets. Devices of the present invention take data for moving targets and calculate solutions thereof, and provide further solutions when the shooter is also moving. In this fashion, devices of the present invention provide real-time aiming solutions for a dynamic environment. In some embodiments, devices of the present invention are configured to be communications "black box" hubs that assemble, accumulate and constantly update all data available and transmit the data in any format to any receiver via any means. The receiver can therefore obtain information pertaining to atmospherics, target(s) location and movement, and shooting solutions to targets particularly in relation to a relative shooter's position.

All publications and patents mentioned in the above specification are herein incorporated by reference. Various modifications and variations of the described compositions and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific further embodiments, it should be understood that the invention should not be unduly limited to such specific embodiments. While the further embodiments have been described in detail, and shown in the accompanying drawings, it will be evident that various further modification are possible without departing from the scope of the invention as set forth in the appended claims. Indeed, various modifications of the described modes for carrying out the invention which are obvious to those skilled in marksmanship, computers or related fields are intended to be within the scope of the following claims.

We claim:

1. A computer system for selecting shooting solutions for two different projectiles of different caliber with a single reticle, said system comprising a processor running ballistics software stored on non-transitory computer readable media, said software configured to:

a) select a reticle comprising a first vertical crosshair and a first horizontal crosshair and a plurality of horizontal crosshairs below said first horizontal crosshair spaced apart by ballistics drop compensation (BDC) spacing;

b) select one of said plurality of horizontal crosshairs below said first horizontal crosshair as a key range;

c) determine and display a first elevation for a first of said two different projectiles for which a user can zero a firearm shooting said first projectile at a selected zeroing distance such that said first projectile accurately hits a target at said zeroing distance when using said first elevation and accurately hits a target at said key range distance when using an aiming point on said horizontal crosshair selected as said key range horizontal crosshair; and d) determine and display a second elevation for a second of said two different projectiles for which a user can zero a firearm shooting said second projectile at said selected zeroing distance such that said second projectile accurately hits a target at said zeroing distance when using said second elevation and accurately hits a target at said key range distance when using an aiming point on said horizontal crosshair selected as said key range horizontal crosshair.

2. The system of claim 1, wherein said zeroing distance is 100 yards or meters.

3. The system of claim 2, wherein said key range is from 300 to 600 yards or meters.

4. The system of claim 1, wherein said software is further configured to receive a user input via a user interface of said computer that selects said reticle.

5. The system of claim 1, wherein said reticle is selected from a database of reticles.

6. The system of claim 1, wherein said software is further configured to receive user input via a user interface of said computer that selects said key range.

7. The system of claim 1, wherein said software is further configured to display one or more of said plurality of horizontal crosshairs below said first horizontal crosshair, that are not said selected key range horizontal crosshair, that provide one or more aiming points within an accuracy distance of an expected impact point for both said first projectile and said second projectile.

8. The system of claim 7, wherein said accuracy distance is within three inches of said expected impact point.

9. The system of claim 1, wherein said software displays said first elevation by identifying a marking on said first vertical crosshair above said first horizontal crosshair that corresponds to said first elevation.

10. The system of claim 1, wherein said software displays said second elevation by identifying a marking on said first vertical crosshair above said first horizontal crosshair that corresponds to said second elevation.

11. The system of claim 1, wherein said software accounts for one or more environmental properties in determining said first elevation and/or said second elevation.

12. The system of claim 11, wherein said one or more environmental properties comprises density altitude.

13. The system of claim 11, wherein said one or more environmental properties comprises altitude, wind speed, wind direction, wind angle, date, time, temperature, relative humidity, target image resolution, barometric pressure, hemisphere, latitude and longitude.

14. A method of zeroing a riflescope using the computer system of claim 1, said method comprising:

a) inputting into said computer system an identity of said two different projectiles of different caliber;

b) inputting into said computer system said key range;

c) zeroing said riflescope with said first projectile at said zeroing distance using said first displayed elevation; and d) zeroing said riflescope with said second projectile at said zeroing distance using said second displayed elevation.

* * * * *